United States Patent
Hattori et al.

(10) Patent No.: US 11,218,710 B2
(45) Date of Patent: Jan. 4, 2022

(54) IMAGE DECODING DEVICE AND METHOD

(71) Applicant: SONY CORPORATION, Tokyo (JP)

(72) Inventors: Shinobu Hattori, Tokyo (JP); Ohji Nakagami, Tokyo (JP); Mitsuhiro Hirabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 822 days.

(21) Appl. No.: 14/902,761

(22) PCT Filed: Jul. 9, 2014

(86) PCT No.: PCT/JP2014/068259
§ 371 (c)(1),
(2) Date: Jan. 4, 2016

(87) PCT Pub. No.: WO2015/005367
PCT Pub. Date: Jan. 15, 2015

(65) Prior Publication Data
US 2016/0173890 A1    Jun. 16, 2016

(30) Foreign Application Priority Data

Jul. 12, 2013   (JP) .............. JP2013-147088
Jul. 24, 2013   (JP) .............. JP2013-153479
Oct. 11, 2013   (JP) .............. JP2013-214206

(51) Int. Cl.
*H04N 19/33*    (2014.01)
*H04N 19/43*    (2014.01)
(Continued)

(52) U.S. Cl.
CPC ............. *H04N 19/33* (2014.11); *H04N 19/43* (2014.11); *H04N 19/70* (2014.11); *H04N 21/4621* (2013.01); *H04N 21/6125* (2013.01)

(58) Field of Classification Search
None
See application file for complete search history.

(56) References Cited

U.S. PATENT DOCUMENTS

2004/0151385 A1* 8/2004 Oneda ............... H04N 19/70
                                                382/232
2007/0189735 A1* 8/2007 Kawashima ....... H04N 19/159
                                                386/329

(Continued)

FOREIGN PATENT DOCUMENTS

CA      2400496 A1   4/1999
CN    101656885 A    2/2010

(Continued)

OTHER PUBLICATIONS

Bross, et al., High Efficiency Video Coding (HEVC) text specification draft 10 (for FDIS & Consent), Joint Collaborative Team on Video Coding (JCT-VC) of ITU-T SG16 WP3 and ISO/IEC JTC1/SC29/WG11, Jan. 14-23, 2013, pp. i-300, 12th Meeting: Geneva, CH.

(Continued)

*Primary Examiner* — Chikaodilie Anyikire
(74) *Attorney, Agent, or Firm* — Paratus Law Group, PLLC

(57) ABSTRACT

The present disclosure relates to an image decoding device capable of recognizing performance necessary for decoding more accurately and a method. Coded data of image data and decoding load definition information for defining a magnitude of a load of a decoding process of a partial region of an image of the image data are acquired; decoding of the acquired coded data is controlled based on the acquired decoding load definition information; and the acquired coded data is decoded according to the controlling. The present disclosure can be applied to an information processing device such as an image coding device that scalably codes image data or an image decoding device that decodes encoded data obtained by scalably coding image data.

18 Claims, 56 Drawing Sheets

(51) Int. Cl.
*H04N 19/70* (2014.01)
*H04N 21/462* (2011.01)
*H04N 21/61* (2011.01)

(56) References Cited

U.S. PATENT DOCUMENTS

| | | | |
|---|---|---|---|
| 2008/0031356 A1 | 2/2008 | Uchida et al. | |
| 2013/0028318 A1* | 1/2013 | Maruyama | H04N 19/00103 375/240.12 |
| 2013/0028525 A1* | 1/2013 | Schoenblum | G06T 5/002 382/199 |

FOREIGN PATENT DOCUMENTS

| | | |
|---|---|---|
| JP | 2001-285865 | 10/2001 |
| JP | 2003-224846 A | 8/2003 |
| JP | 2006-033507 | 2/2006 |
| JP | 2007-537639 A | 12/2007 |
| JP | 2009-124209 | 6/2009 |
| JP | 2013-102298 | 5/2013 |
| WO | WO2013/069512 A1 | 5/2013 |
| WO | WO 2013/069512 A1 | 5/2013 |

OTHER PUBLICATIONS

Fuldseth, et al., Tiles, Joint Collaborative Team on Video Coding (JCT-VC) of ITU-T SG16 WP3 and ISO/IEC JTC1/SC29/WG11, Jul. 14-22, 2011, pp. 1-15, 6$^{th}$ Meeting: Torino, IT.

Nov. 21, 2016, EP communication issued for related EP application No. 14823047.7.

Chong, et al., Efficient Parallelization of H.264 Decoding With Macro Block Level Scheduling, Multimedia and Expo, 2007 IEEE International Conference, Jul. 1, 2007, pp. 1874-1877.

Hattori, et al., HLS: Extensions to Motion-constrained tile sets SEI message, Joint Collaborative Team on Video Coding (JCT-VC) of ITU-T SG 16 WP 3 and ISO/IEC JTC 1/SC 29/WG 11, 14$^{th}$ Meeting, Vienna, Austria, Jul. 29-Aug. 2, 2013, pp. 1-4.

Wang, AHG9: Indication of Interlaced and frame-packed video in HEVC, Joint Collaborative Team on Video Coding (JCT-VC) of ITU-T SG 16 WP 3 and ISO/IEC JTC 1/SC 29/WG 11, 12$^{th}$ Meeting, Geneva, CH, Jan. 14-23, 2013, pp. 1-4.

Mar. 8, 2018, Japanese Office Action issued for related JP Application No. 2015-526366.

Wang et al., Revised signaling of scalability information, Joint Video Team (JVT) of ISO/IEC MPEG & ITU-T VCEG (ISO/IEC JTC1/SC29/WG11 and ITU-T SG16 Q.6), 16$^{th}$ meeting, Jul. 24-29, 2005, pp. 1-6, Poznan, Poland.

Wu et al., Motion-constrained tile sets SEI message, Joint Collaborative Team on Video Coding (JCT-VC) of ITU-T SG 16 WP 3 and ISO/IEC JTC 1/SC 29/WG 11, 13$^{th}$ meeting, Apr. 18-26, 2013, pp. 1-4, Incheon, KR.

Hattori et al., HLS: Extensions to Temporal Motion-constrained tile sets SEI message, Joint Collaborative Team on Video Coding (JCT-VC) of ITU-T SG 16 WP 3 and ISO/IEC JTC 1/SC 29/WG 11, 16$^{th}$ meeting, Jan. 9-17, 2014, pp. 1-9, San Jose, US.

Hattori et al., HLS: Extensions to Temporal Motion-constrained tile sets SEI message, Joint Collaborative Team on Video Coding (JCT-VC) of ITU-T SG 16 WP 3 and ISO/IEC JTC 1/SC 29/WG 11, 15$^{th}$ meeting, Oct. 23-Nov. 1, 2013, pp. 1-3, Geneva, CH.

Apr. 4, 2018, Chinese Office Action issue for related CN Application No. 201480038636.3.

Aug. 3, 2018, Chinese Office Action issued for related CN Application No. 201480038636.3.

Sep. 29, 2018, Chinese Office Action issued for related CN Application No. 201610548139.9.

Jun. 16, 2020, European Communication issued for related EP application No. 14823047.7.

Xiaofeng Yang et al., 2D compatible frame packing stereo 3D video, Joint Collaborative Team on Video Coding (JCT-VC) of ITU-T SG 16 WP 3 and ISO/IEC JTC 1/SC 29/WG 11, Oct. 10-19, 2012, pp. 1-3, 11$^{th}$ Meeting: Shanghai, CN.

Nov. 22, 2019, Singaporean Search Report issued for related SG Application No. 10201604902P.

Aug. 13, 2019, Japanese Office Action issued for related JP Application No. 2018-117833.

Oct. 1, 2019, Japanese Office Action issued for related JP Application No. 2018-117833.

Information technology—Coding of audio-visual objects—Part 10: Advanced Video Coding, International Standard, ISO/IEC 14496-10, Feb. 2, 2012, pp. i-699.

Mar. 15, 2017, SG communication issued for related SG application No. 11201600044Q.

Bross, et al., "High Efficiency Video Coding (HEVC) text specification draft 10 (for FDIS & Consent)", Joint Collaborative Team on Video Coding (JCT-VC) of ITU-T SG 16 WP 3 and ISO/IEC JTC 1/SC 29/WG 11, Jan. 14-23, 2013, p. i-299, Geneva, Switzerland.

Fuldseth, et al., "Tiles", Joint Collaborative Team on Video Coding (JCT-VC) of ITU-T SG 16 WP3 and ISO/IEC JTC1/SC29/WG11, Jul. 14-22, 2011, p. 1-15, Torino, Italy.

* cited by examiner

| | Descriptor |
|---|---|
| motion_constrained_tile_sets(payloadSize) { | |
|   num_sets_in_message_minus1 | ue(v) |
|   for(i=0;i<=num_sets_in_message_minus1;i++) { | |
|     mcts_id[i] | ue(v) |
|     num_tile_rects_in_set_minus1[i] | ue(v) |
|     for(j=0;j<=num_tile_rects_in_set_minus1[i];j++) { | |
|       top_left_tile_index[i][j] | ue(v) |
|       bottom_right_tile_index[i][j] | ue(v) |
|     } | |
|     exact_sample_value_match_flag[i] | u(1) |
|     mcts_level_idc[i] | ue(v) |
|   } | |
| } | |

B

The semantics of the syntax element mcts_level_idc[i] is the same as the syntax element general_level_idc but apply to the i-th identified motion-constrained tile FIG. 10
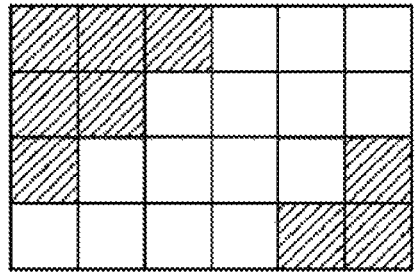
A
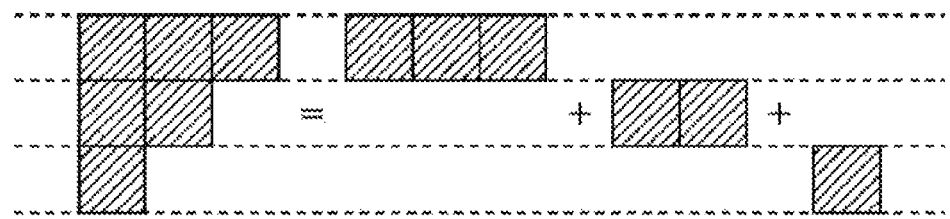
B
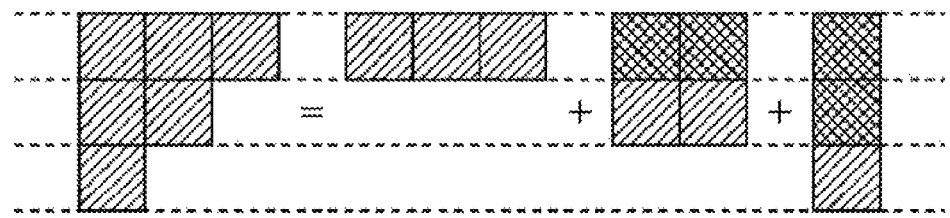
C
```
CtbAddrTsToRs[top_left_tile_index]
CtbAddrTsToRs[bottom_right_tile_index]
```
$S_i = (X_{right,i} - X_{left,i}) * (Y_{top,i} - Y_{btm,i})$
$S_{sum} = \Sigma\ S_i - Overwrap$
$NumOfPixelToDecode = S_{sum} * CTUSize$
D

FIG. 11

| | Descriptor |
|---|---|
| motion_constrained_tile_sets(payloadSize) { | |
|   num_sets_in_message_minus1 | ue(v) |
|   for(i=0;i<=num_sets_in_message_minus1;i++) { | |
|     mcts_id[i] | ue(v) |
|     num_tile_rects_in_set_minus1[i] | ue(v) |
|     for(j=0;j<=num_tile_rects_in_set_minus1[i];j++) { | |
|       top_left_tile_index[i][j] | ue(v) |
|       bottom_right_tile_index[i][j] | ue(v) |
|     } | |
|     exact_sample_value_match_flag[i] | u(1) |
|     for(j=0;j<=vps_num_layer_sets_minus1;j++) { | |
|       mcts_level_idc[i][j] | ue(v) |
|     } | |
|   } | |
| } | |

A

The semantics of the syntax element mcts_level_idc[i][j] is the same as the syntax element general_level_idc but apply to the i-th identified motion-constrained tile of the j-th layer and lower.

| | Descriptor |
|---|---|
| motion_constrained_tile_sets(payloadSize) { | |
|   num_sets_in_message_minus1 | ue(v) |
|   for(i=0;i<=num_sets_in_message_minus1;i++) { | |
|     mcts_id[i] | ue(v) |
|     num_tile_rects_in_set_minus1[i] | ue(v) |
|     for(j=0;j<=num_tile_rects_in_set_minus1[i];j++) { | |
|       top_left_tile_index[i][j] | ue(v) |
|       bottom_right_tile_index[i][j] | ue(v) |
|     } | |
|     exact_sample_value_match_flag[i] | u(1) |
|     maxLumaPs_in_set [i] | ue(v) |
|   } | |
| } | |

A maxLumaPs_in_set specifies the maximum luma picture size in the rectangular regions of tiles in the i-th identified motion-constrained tile set. The value of maxLumaPs_in_set[i] shall not be equal to 0 and shall be less than or equal to PicSizeInSamplesY.

| | Descriptor |
|---|---|
| motion_constrained_tile_sets(payloadSize) { | |
| num_sets_in_message_minus1 | ue(v) |
| for(i=0;i<=num_sets_in_message_minus1;i++) { | |
| mcts_id[i] | ue(v) |
| num_tile_rects_in_set_minus1[i] | ue(v) |
| for(j=0;j<=num_tile_rects_in_set_minus1[i];j++) { | |
| top_left_tile_index[i][j] | ue(v) |
| bottom_right_tile_index[i][j] | ue(v) |
| } | |
| exact_sample_value_match_flag[i] | u(1) |
| mcts_width_in_luma_samples[i] | ue(v) |
| mcts_height_in_luma_samples[i] | ue(v) |
| } | |
| } | |

B mcts_width_in_luma_samples specifies the total width of rectangular regions of tiles in the i-th identified motion-constrained tile set. The value of mcts_width_in_luma_samples[i] shall not be equal to 0 and shall be less than or equal pic_width_in_luma_samples in active SPS.
mcts_height_in_luma_samples specifies the total height of rectangular regions of tiles in the i-th identified motion-constrained tile set. The value of mcts_height_in_luma_samples[i] shall not be equal to 0 and shall be less than or equal to pic_height_in_luma_samples in active SPS.

FIG. 14

| | Descriptor |
|---|---|
| motion_constrained_tile_sets(payloadSize) { | |
|   num_sets_in_message_minus1 | ue(v) |
|   for(i=0;i<=num_sets_in_message_minus1;i++) { | |
|     mcts_id[i] | ue(v) |
|     num_tile_rects_in_set_minus1[i] | ue(v) |
|     for(j=0;j<=num_tile_rects_in_set_minus1[i];j++) { | |
|       top_left_tile_index[i][j] | ue(v) |
|       bottom_right_tile_index[i][j] | ue(v) |
|     } | |
|     exact_sample_value_match_flag[i] | u(1) |
|     if(nal_hrd_parameters_present_flag) | |
|       mcts_hrd_parameters() | |
|     if(vcl_hrd_parameters_present_flag) | |
|       mcts_hrd_parameters() | |
|   } | |
| } | |

FIG. 15

| mcts_hrd_parameters( ) { | Descriptor |
|---|---|
| mcts_bit_rate_value_minus1 | ue(v) |
| mcts_cpb_size_value_minus1 | ue(v) |
| } | |

A mcts_bit_rate_value_minus1(together with bit_rate_scale)specifies the maximum input bitrate for the CPB when the CPB operates the identified motion-constrained tile set. mcts_bit_rate_value_minus1[i]shall be in the range of 0 to $2^{32}-2$, inclusive.
The bit rate in bits per second is given by:
    mctsBitRate=(mcts_bit_rate_value_minus1+1)*$2^{(6+bit\_rate\_scale)}$ mcts_cpb_size_value_minus1 is used together with cpb_size_scale to specify the CPB size when the CPB operates the identified motion-constrained tile set. mcts_cpb_size_value_minus1 shall be in the range of 0 to $2^{32}-2$, inclusive.
The CPB size in bits is given by:
    mctsCpbSize[i]=(mcts_cpb_size_value_minus1[i]+1)*$2^{(4+cpb\_size\_scale)}$

| | Descriptor |
|---|---|
| sps_extension() { | |
|   inter_view_mv_vert_constraint_flag | u(1) |
|   scaled_ref_layer_offset_present_flag | |
|   if(scaled_ref_layer_offset_present_flag) { | |
|     scaled_ref_layer_left_offset | se(v) |
|     scaled_ref_layer_top_offset | se(v) |
|     scaled_ref_layer_right_offset | se(v) |
|     scaled_ref_layer_bottom_offset | se(v) |
|   } | |
|   ...snip... | |
|   mcts_present_flag | u(1) |
|   ...snip... | |
| } | |

A mcts_present_flag specifies whether the motion constrained tile set SEI is present.

| | Descriptor |
|---|---|
| sps_extension() { | |
| ...snip... | |
| mcts_level_present_flag | u(1) |
| if(mcts_level_present_flag) { | |
| num_sets_in_message_minus1 | ue(v) |
| for(i=0;i<=num_sets_in_message_minus1;i++) { | |
| mcts_level_idc[i] | ue(v) |
| } | |
| } | |
| } | |

B mcts_level_present_flag equal to 1 specifies that level information is present for the representation of motion constrained tile sets.

num_sets_in_message_minus1 plus 1 specifies the number of motion-constrained tile sets identified in the SEI message. The value of num_sets_in_message_minus1 shall be in the range of 0 to 255, inclusive.

The semantics of the syntax element mcts_level_idc[i] is the same as the syntax element general_level_idc but apply to the i-th identified motion-constrained tile

FIG. 19

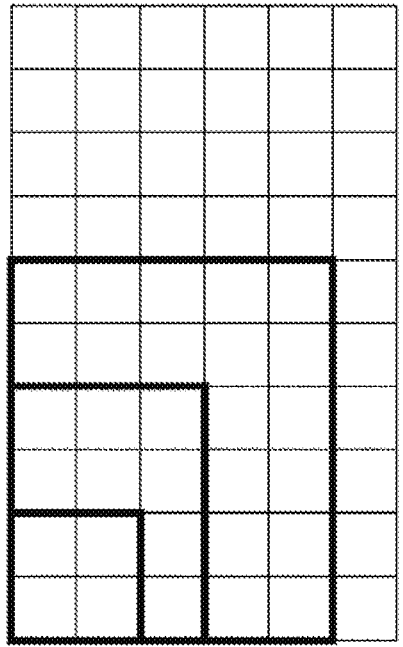

DASH MODE
AS ASSUMPTION, SCREEN IS UNIFORMLY DIVIDED INTO TILES (uniform_spacing_flag=1@PPS).
IN ADDITION, IT IS UNDERSTOOD THAT INDIVIDUAL TILE IS INDEPENDENTLY DECODABLE.
IN THIS CASE, A. NUMBER OF TILES TO BE DECODED AT TIME, AND B. LEVEL INFORMATION
CORRESPONDING THERETO ARE DESCRIBED.

DESCRIBE LEVEL INFORMATION OF RESOLUTION
CORRESPONDING TO SIZE OF FRAME

AS num_sets_in_message_minus1
=3 - 1
=2,
num_of_tiles_minus[0] = 3, mcts_level_idc[0] = 2.0
num_of_tiles_minus[1] = 11, mcts_level_idc[1] = 3.0
num_of_tiles_minus[2] = 29, mcts_level_idc[2] = 4.0
ARE DESCRIBED.

FIG. 20

| | Descriptor |
|---|---|
| motion_constrained_tile_sets(payloadSize) { | |
|   mcts_mode | ue(v) |
|   num_sets_in_message_minus1 | ue(v) |
|   if(mcts_mode == 0) { // mode for current ROI application | |
|     for(i=0;i<=num_sets_in_message_minus1;i++) { | |
|       mcts_id[i] | ue(v) |
|       num_tile_rects_in_set_minus1[i] | ue(v) |
|       for(j=0;j<=num_tile_rects_in_set_minus1[i];j++) { | |
|         top_left_tile_index[i][j] | ue(v) |
|         bottom_right_tile_index[i][j] | ue(v) |
|       } | |
|       exact_sample_value_match_flag[i] | u(1) |
|       mcts_level_idc[i] | ue(v) |
|     } | |
|   } else if(mcts_mode == 1) { // mode for DASH application | |
|     for(i=0;i<=num_sets_in_message_minus1;i++) { | |
|       mcts_id[i] | ue(v) |
|       num_of_tiles_minus1[i] | ue(v) |
|       mcts_level_idc[i] | ue(v) |
|     } | |
|   } | |
| } | |

FIG. 21

| temporal_motion_constrained_tile_sets(payloadSize) { | Descriptor |
|---|---|
| mc_all_tiles_exact_sample_value_match_flag | u(1) |
| each_tile_one_tile_set_flag | u(1) |
| mcts_level_idc_present_flag | u(1) |
| if(!each_tile_one_tile_set_flag) { | |
| num_sets_in_message_minus1 | ue(v) |
| for (i=0; i<=num_sets_in_message_minus1; i++) { | |
| mcts_id[i] | ue(v) |
| num_tile_rects_in_set_minus1[i] | ue(v) |
| for (j=0; j<=num_tile_rects_in_set_minus1[i]; j++) { | |
| top_left_tile_index[i][j] | ue(v) |
| bottom_right_tile_index[i][j] | ue(v) |
| } | |
| if(! mc_all_tiles_exact_sample_value_match_flag) | |
| exact_sample_value_match_flag[i] | u(1) |
| } | |
| if(mcts_level_idc_present_flag) | |
| mcts_level_idc | u(8) |
| else { | |
| if(mcts_level_idc_present_flag) { | |
| num_mcts_level_idc_minus1 | ue(v) |
| for (i=0; i<=num_mcts_level_idc_minus1; i++) { | |
| mcts_level_id[i] | ue(v) |
| num_mc_tile_columns_minus1[i] | ue(v) |
| num_mc_tile_rows_minus1[i] | ue(v) |
| mcts_level_idc[i] | u(8) |
| } | |
| } | |
| } | |

A mcts_level_idc is same as the syntax element general_level_idc, but applied to the representation of motion-constrained tile sets. mcts_level_idc indicates a level to which the motion-constrained tile sets conforms as specified in Annex A with the following additions.

num_mc_tile_columns_minus1[i] plus 1 specifies the number of tile columns partitioning the i-th identified motion-constrained tile sets. The value of num_mc_tile_columns_minus1 shall be in the range of 0 to num_tile_columns_minus1, inclusive.

num_mc_tile_rows_minus1[i] plus 1 specifies the number of tile rows partitioning the i-th identified motion-constrained tile sets. The value of num_tile_rows_minus1 shall be in the range of 0 to num_tile_rows_minus1, inclusive.

| temporal_motion_constrained_tile_sets(payloadSize) { | Descriptor |
|---|---|
| mc_all_tiles_exact_sample_value_match_flag | u(1) |
| each_tile_one_tile_set_flag | u(1) |
| mcts_level_idc_present_flag | u(1) |
| if(!each_tile_one_tile_set_flag) { | |
| num_sets_in_message_minus1 | ue(v) |
| for(i=0;i<=num_sets_in_message_minus1;i++) { | |
| mcts_id[i] | ue(v) |
| num_tile_rects_in_set_minus1[i] | ue(v) |
| for (j=0;j<=num_tile_rects_in_set_minus1[i];j++) { | |
| top_left_tile_index[i][j] | ue(v) |
| bottom_right_tile_index[i][j] | ue(v) |
| } | |
| if(!mc_all_tiles_exact_sample_value_match_flag) | |
| exact_sample_value_match_flag[i] | u(1) |
| if(mcts_level_idc_present_flag) | |
| mcts_level_idc[i] | u(8) |
| } | |
| } else { | |
| if(mcts_level_idc_present_flag) | |
| max_mcts_level_idc | ue(v) |
| } | |
| } | |

A mcts_level_idc[i] is same as the syntax element general_level_idc, but applied to the representation of the i-th identified motion-constrained tile sets. The value of mcts_level_idc indicates a level to which the motion-constrained tile sets conforms as specified in Annex A with the following additions.
- The variables PicSizeInSamplesY should be inferred as total number of luma samples in motion-constrained tile sets.
- The value of pic_width_in_luma_samples and pic_height_in_luma_samples should be inferred as width and height of overall decoded region of motion-constrained tile sets in units of luma samples, respectively. In case the region of motion-constrained tile sets is not in rectangular shape(e.g. L/U shaped, apart from each other etc), the width and height should be inferred as value of a rectangle which covers the entire tile sets horizontally and vertically.
- The value of num_tile_columns_minus1 plus 1 and num_tile_rows_minus1 plus 1 should be inferred as total number of tile columns and rows in motion-constrained tile sets which the defined mcts_level_idc.
- For the VCL HRD parameters and NAL HRD parameters, the values should be inferred as values when the HRD parameters are not present.

max_mcts_level_idc is same as the syntax element mcts_level_idc[i] for i-th identified motion-constrained tile set but applied to the representation of motion-constrained tile sets which is composed of one tile per one tile set. The value of max_mcts_level_idc should be the maximum level_idc value of tiles in the picture.

B

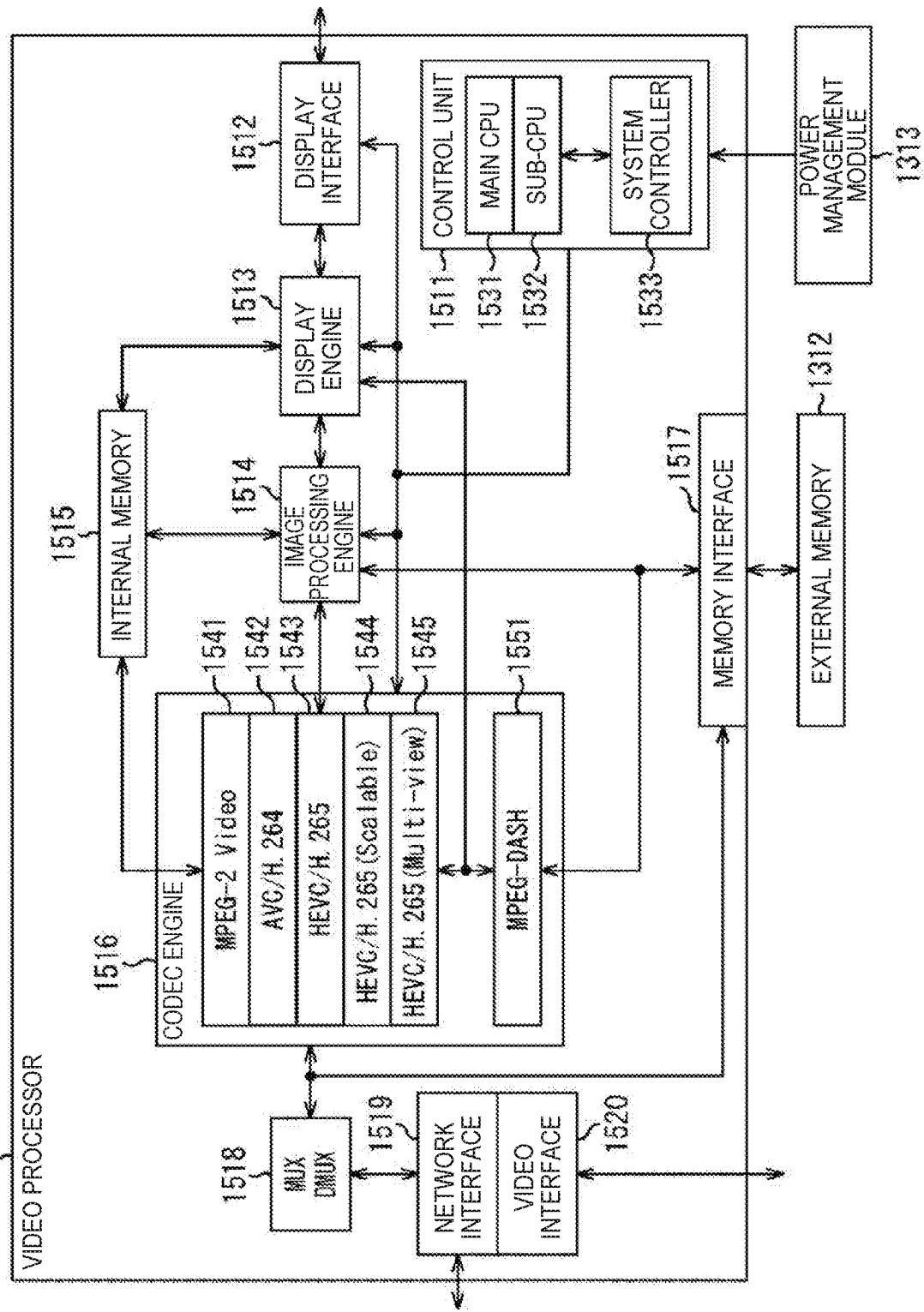

IMAGE DECODING DEVICE AND METHOD

CROSS REFERENCE TO PRIOR APPLICATION

This application is a National Stage Patent Application of PCT International Patent Application No. PCT/JP2014/068259 (filed on Jul. 9, 2014) under 35 U.S.C. § 371, which claims priority to Japanese Patent Application Nos. 2013-214206 (filed on Oct. 11, 2013), 2013-153479 (filed on Jul. 24, 2013), and 2013-147088 (filed on Jul. 12, 2013), which are all hereby incorporated by reference in their entirety.

TECHNICAL FIELD

The present disclosure relates to an image decoding device and method, and particularly, relates to an image decoding device capable of recognizing performance necessary for decoding more accurately and a method.

BACKGROUND ART

In recent years, in order to further improve coding efficiency over MPEG-4 Part10 (Advanced Video Coding, hereinafter referred to as "AVC"), Joint Collaboration Team-Video Coding (JCTVC), which is a joint standardization organization of International Telecommunication Union Telecommunication Standardization Sector (ITU-T) and International Organization for Standardization/International Electrotechnical Commission (ISO/IEC), has proceeded with standardization of a coding scheme called High Efficiency Video Coding (HEVC) (for example, refer to Non-Patent Literature 1).

In HEVC, it is possible to decode only a region whose decoding is necessary by an application using a tile structure. In order to indicate the fact that a tile region is independently decodable, second and later versions (including MV-HEVC, SHVC, Range Ext. and the like) of HEVC are supported by motion-constrained tile sets SEI.

CITATION LIST

Patent Literature

Non-Patent Literature

[Non-Patent Literature 1] Benjamin Bross, Woo-Jin Han, Jens-Rainer Ohm, Gary J. Sullivan, Ye-Kui Wang, Thomas Wiegand, "High Efficiency Video Coding (HEVC) text specification draft 10 (for FDIS & Last Call)", JCTVC-L1003_v34, Joint Collaborative Team on Video Coding (JCT-VC) of ITU-T SG 16 WP 3 and ISO/IEC JTC 1/SC 29/WG 11 12th Meeting: Geneva, CH, 14-23 Jan. 2013.

SUMMARY OF INVENTION

Technical Problem

However, as information on a level, which serves as a reference for determining whether a decoder can decode a stream, and a buffer capacity, only a value of the entire stream or a value of a layer unit is defined.

Therefore, even in an application that decodes only a part of an entire image, determination of whether decoding is possible is performed by assuming a load when an entire screen is decoded. Accordingly, there is concern of an unnecessarily high level decoder being necessary. In addition, there is concern of applications to be delivered being unnecessarily limited accordingly.

The present disclosure has been made in view of the above-mentioned problems and can recognize performance necessary for decoding more accurately.

Solution to Problem

An aspect of the present technology is an image decoding device including: an acquisition unit configured to acquire coded data of image data and decoding load definition information for defining a magnitude of a load of a decoding process of a partial region of an image of the image data; a control unit configured to control decoding of the coded data acquired by the acquisition unit based on the decoding load definition information acquired by the acquisition unit; and a decoding unit configured to decode the coded data acquired by the acquisition unit under control of the control unit.

The partial region may be independently decodable.

The decoding load definition information may include information for defining a magnitude of a load of a decoding process of the partial region according to a level indicating a magnitude of a load of the decoding process.

The decoding load definition information may include information for defining a magnitude of a load of a decoding process of the partial region according to information indicating a size of the partial region.

The decoding load definition information may include information for defining a magnitude of a load of a decoding process of the partial region according to information indicating a length in a vertical direction and information indicating a length in a horizontal direction of the partial region.

The decoding load definition information may be included in supplemental enhancement information (SEI) of an independently decodable partial region.

The image data may include a plurality of layers, and the decoding load definition information of the plurality of layers may be included in the SEI.

The decoding load definition information may include information indicating a size of the partial region serving as a reference, and a level indicating a magnitude of a load of a decoding process of the partial region.

The partial region may be a tile.

The partial region may be a set of a plurality of tiles.

The decoding load definition information may include information for defining a maximum magnitude of a load of a decoding process among a plurality of partial regions included in a picture of the image data according to a level indicating a magnitude of a load of the decoding process.

The decoding load definition information may include information for defining a magnitude of a load common in a plurality of partial regions included in a picture of the image data according to a level indicating a magnitude of a load of the decoding process.

When the plurality of partial regions included in the picture have an L shape, a magnitude of the load may be defined for a rectangular region including the L shape.

The acquisition unit may further acquire information indicating whether the decoding load definition information is set, and when the acquired information indicates that the decoding load definition information is set, acquires the the decoding load definition information.

An aspect of the present technology is an image decoding method including: acquiring coded data of image data and decoding load definition information for defining a magnitude of a load of a decoding process of a partial region of an image of the image data; controlling decoding of the acquired coded data based on the acquired decoding load definition information; and decoding the acquired coded data according to the controlling.

In an aspect of the present technology, coded data of image data and decoding load definition information for defining a magnitude of a load of a decoding process of a partial region of an image of the image data are acquired; decoding of the acquired coded data is controlled based on the acquired decoding load definition information; and the acquired coded data is decoded according to the controlling.

Advantageous Effects of Invention

According to the present disclosure, it is possible to code and decode an image. In particular, it is possible to recognize performance necessary for decoding more accurately.

BRIEF DESCRIPTION OF DRAWINGS

FIG. 9 is a diagram illustrating an extension example of MCTS SEI.
FIG. 10 is a diagram describing an overview of MCTS SEI.
FIG. 11 is a diagram describing an overview of MCTS SEI.
FIG. 12 is a diagram describing an overview of MCTS SEI.
FIG. 13 is a diagram describing an overview of MCTS SEI.
FIG. 14 is a diagram describing an overview of MCTS SEI.
FIG. 15 is a diagram describing an overview of MCTS SEI.
FIG. 16 is a diagram describing an overview of MCTS SEI.
FIG. 17 is a diagram describing an overview of MCTS SEI.
FIG. 19 is a diagram illustrating an extension example of MCTS SEI.
FIG. 20 is a diagram illustrating an exemplary syntax of MCTS SEI.
FIG. 21 is a diagram illustrating an extension example of MCTS SEI.
FIG. 24 is a diagram illustrating an extension example of MCTS SEI.

FIG. 56 is a block diagram illustrating another example of the schematic configuration of the video processor.

DESCRIPTION OF EMBODIMENTS

Figure 1:
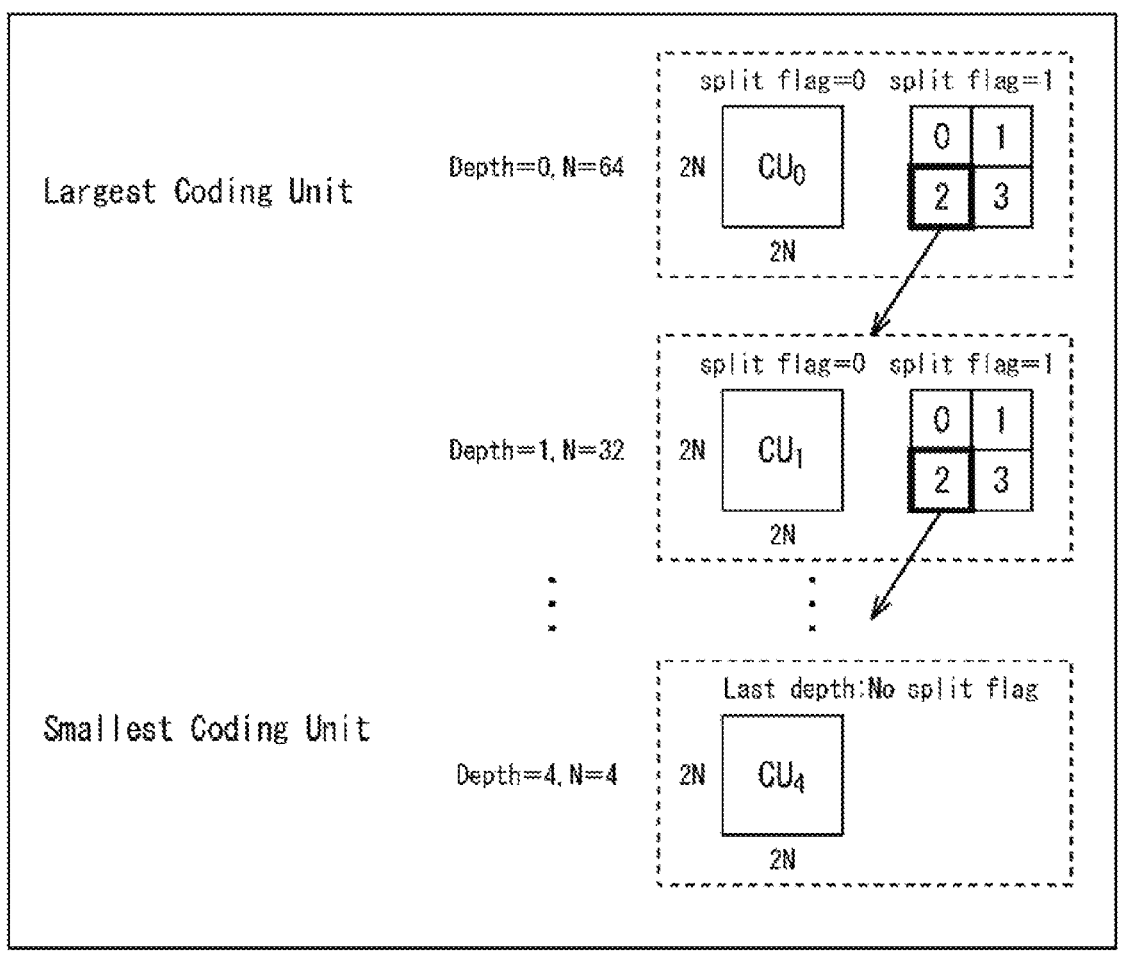
FIG. 1 is a diagram describing an exemplary configuration of a coding unit.

Hereinafter, aspects (hereinafter referred to as "embodiments") for implementing the present disclosure will be described. The descriptions will proceed in the following order.
1. First embodiment (decoding load definition of partial image)
2. Second embodiment (image coding device)
3. Third embodiment (image decoding device)
4. Fourth embodiment (multi-view image coding and multi-view image decoding device)
5. Fifth embodiment (computer)
6. Sixth embodiment (application example)
7. Seventh embodiment (application example of scalable coding)
8. Eighth embodiment (set, unit, module, and processor)

1. First Embodiment

<Flow of Standardization of Image Coding>

In recent years, devices in which image information is digitally handled, and in this case, in order to transmit and accumulate information with high efficiency, image information-specific redundancy is used, and an image is compression-coded employing a coding scheme in which an orthogonal transform such as a discrete cosine transform and motion compensation are used for compression have proliferated. As the coding scheme, Moving Picture Experts Group (MPEG) is exemplified.

In particular, MPEG2 (ISO/IEC 13818-2) is a standard that is defined as a general-purpose image coding scheme, and generally supports both an interlaced scanning image and a progressive scanning image as well as a standard resolution image and a high-definition image. For example, MPEG2 is currently being widely used for a wide range of applications including professional applications and consumer applications. When an MPEG2 compression scheme is used, for example, an interlaced scanning image having a standard resolution of 720×480 pixels may be assigned a code amount (bit rate) of 4 to 8 Mbps. In addition, when the MPEG2 compression scheme is used, for example, an interlaced scanning image having a high resolution of 1920× 1088 pixels may be assigned a code amount (bit rate) of 18 to 22 Mbps, Therefore, it is possible to implement a high compression rate and good image quality.

MPEG2 is mainly designed for high image quality coding suitable for broadcast, but does not correspond to a lower code amount (bit rate) than that of MPEG1, that is, a coding scheme of a higher compression rate. With the proliferation of mobile terminals, it is assumed that needs for such a coding scheme will increase in the future. Accordingly, MPEG4 coding schemes have been standardized. A standard of image coding schemes was approved as an international standard ISO/IEC 14496-2 in December 1998.

Further, in recent years, for the initial purpose of image coding for television conferencing, a standard called H.26L, (ITU-T (International Telecommunication Union Telecommunication Standardization Sector) Q6/16 VCEG (Video Coding Expert Group)) has been standardized. It is known that H.26L, requests a greater amount of computation for coding and decoding than coding schemes of the related art such as MPEG2 or MPEG4, but has a higher coding efficiency. In addition, currently, as a part of MPEG4 activities, based on H.26L, standardization in which functions that are not supported in H.26L, are also incorporated to implement higher coding efficiency is being performed as Joint Model of Enhanced-Compression Video Coding.

As schedules of standardization, H.264 and MPEG-4 Part10 (Advanced Video Coding, hereinafter referred to as "AVC") became international standards in March 2003.

Further, as extensions of H.264/AVC, standardization of Fidelity Range Extension (FRExt) including coding tools necessary for professional use such as RGB, 4:2:2, or 4:4:4, and 8×8 DCT or a quantization matrix defined in MPEG-2 was completed in February 2005. Therefore, when H.264/AVC is used, the coding scheme is also able to appropriately represent film noise included in a movie and is used for a wide range of applications such as a Blu-Ray Disc™.

However, in recent years, needs for higher compression rate coding including compression of an image of about 4000×2000 pixels, four times that of a high definition image, or delivery of a high definition image in an environment having a limited transmission capacity such as the Internet, are increasing. Therefore, in previously described VCEG under ITU-T, study for increasing coding efficiency continues.

Therefore, currently, in order to further increase coding efficiency over that of AVC, Joint Collaboration Team-Video Coding (JCTVC), which is a joint standardization organization of ITU-T and International Organization for Standardization/International Electrotechnical Commission (ISO/IEC), proceeding with a standardization of a coding scheme called High Efficiency Video Coding (HEVC). As a standard of HEVC, a committee draft, which is a draft specification, has been issued in January 2013 (for example, refer to Non-Patent Literature 1).

<Coding Scheme>

Hereinafter, the present technology will be described with application examples of image coding and decoding of a High Efficiency Video Coding (HEVC) scheme.

<Coding Unit>

In the Advanced Video Coding (AVC) scheme, a layered structure of macroblocks and sub-macroblocks is defined. However, a macroblock of 16×16 pixels is not optimal for a large image frame provided in the next generation coding scheme Ultra High Definition (UHD, 4000 pixels×2000 pixels).

On the other hand, in the HEVC scheme, as illustrated in FIG. 1, a coding unit (CU) is defined.

The CU is also called a coding tree block (CTB) and is a partial region of an image of a picture unit, which similarly serves as the macroblock in the AVC scheme. The latter is fixed to a size of 16×16 pixels. On the other hand, the former has a size that is not fixed, but is designated in image compression information in respective sequences.

For example, in the sequence parameter set (SPS) included in coded data to be output, a maximum size (largest coding unit (LCU)) and a minimum size (smallest coding unit (SCU)) of the CU are defined.

In each LCU, in a range equal to or greater than a size of the SCU, when split-flag=1 is set, the unit may be divided into CUs having a smaller size. In an example of FIG. 1, the LCU has a size of 128 and a maximum level depth of 5. When a value of split_flag is set to "1," a CU having a size of 2N×2N is divided into the next lowest level of CUs having a size of N×N.

Further, the CU is divided into a prediction unit (PU) that is a region partial region of an image of a picture unit serving as a processing unit of intra or inter prediction, and is divided into a transform unit (TU)) that is a region (a partial region of an image of a picture unit) serving as a processing unit of an orthogonal transform. Currently, in the HEVC scheme, it is possible to use 16×16 and 32×32 orthogonal transform in addition to 4×4 and 8×8.

In a coding scheme in which the CU is defined and various processes are performed in units of CUs as in the HEVC scheme described above, the macroblock in the AVC scheme may be considered to correspond to the LCU and the block (sub-block) may be considered to correspond to the CU. In addition, a motion compensation block in the AVC scheme may be considered to correspond to the PU. However, since the CU has a layered structure, the LCU of the topmost level has a size that is generally set to be greater than a macroblock of the AVC scheme, for example, 128×128 pixels.

Accordingly, hereinafter, the LCU may include the macroblock in the AVC scheme, and the CU may include the block (sub-block) in the AVC scheme. That is, the term "block" used in the following description refers to any partial region in the picture and has a size, a shape, a characteristic and the like that are not limited. In other words, the "block" includes any region (processing unit), for example, a TU, a PU, an SCU, a CU, an LCU, a sub-block, a macroblock, or a slice. It is needless to say that a partial region (processing unit) other than these is included. When there is a need to limit a size, a processing unit or the like, it will be appropriately described.

In addition, in this specification, a coding tree unit (CTU) is a unit including a parameter when processing is performed in the coding tree block (CTB) of the LCU (a maximum number of the CU) and an LCU base (level) thereof. In addition, the coding unit (CU) of the CTU is aunt including a parameter when processing is performed in a coding block (CB) and a CU base (level) thereof.

<Mode Selection>

Meanwhile, in the AVC and HEVC coding schemes, in order to achieve higher coding efficiency, it is important to select an appropriate prediction mode.

As an example of such a selection scheme, a method implemented in reference software (disclosed in http://iphome.hhi.de/suehring/tml/index.htm) of H.264/MPEG-4 AVC called Joint Model (JM) may be exemplified.

In JM, it is possible to select a method of determining two modes, a high complexity mode and a low complexity mode, to be described below. In both, a cost function value for each prediction mode Mode is calculated, and a prediction mode minimizing the value is selected as an optimal mode for the block or the macroblock.

A cost function in the high complexity mode is represented as the following Equation (1).

[Math. 1]

$$\text{Cost}(\text{Mode} \in \Omega) = D + \lambda * R \quad (1)$$

Here, Ω denotes an entire set of candidate modes for coding the block or the macroblock, and D denotes difference energy between a decoded image and an input image when coding is performed in the prediction mode. λ denotes a Lagrange undetermined multiplier provided as a function of a quantization parameter. R denotes a total amount of codes when coding is performed in the mode including an orthogonal transform coefficient.

That is, when coding is performed in the high complexity mode, in order to calculate the parameters. D and R, it is necessary to perform a provisional encoding process once in all candidate modes. Therefore, a higher amount of computation is necessary.

A cost function in the low complexity mode is represented as the following Equation (2).

[Math. 2]

$$\text{Cost}(\text{Mode} \in \Omega) = D + QP2\text{Quant}(QP) * \text{HeaderBit} \quad (2)$$

Here, D denotes difference energy between a prediction image and an input image unlike the high complexity mode. QP2Quant (QP) is provided as a function of a quantization parameter QP. HeaderBit denotes a code amount of information belonging to a header in a motion vector or a mode having no orthogonal transform coefficient.

That is, in the low complexity mode, it is necessary to perform a prediction process in respective candidate modes, but is not necessary for the decoded image. Therefore, it is not necessary to perform a coding process. For this reason, a lower amount of computation than that in the high complexity mode may be implemented.

<Layered Coding>

Figure 2:
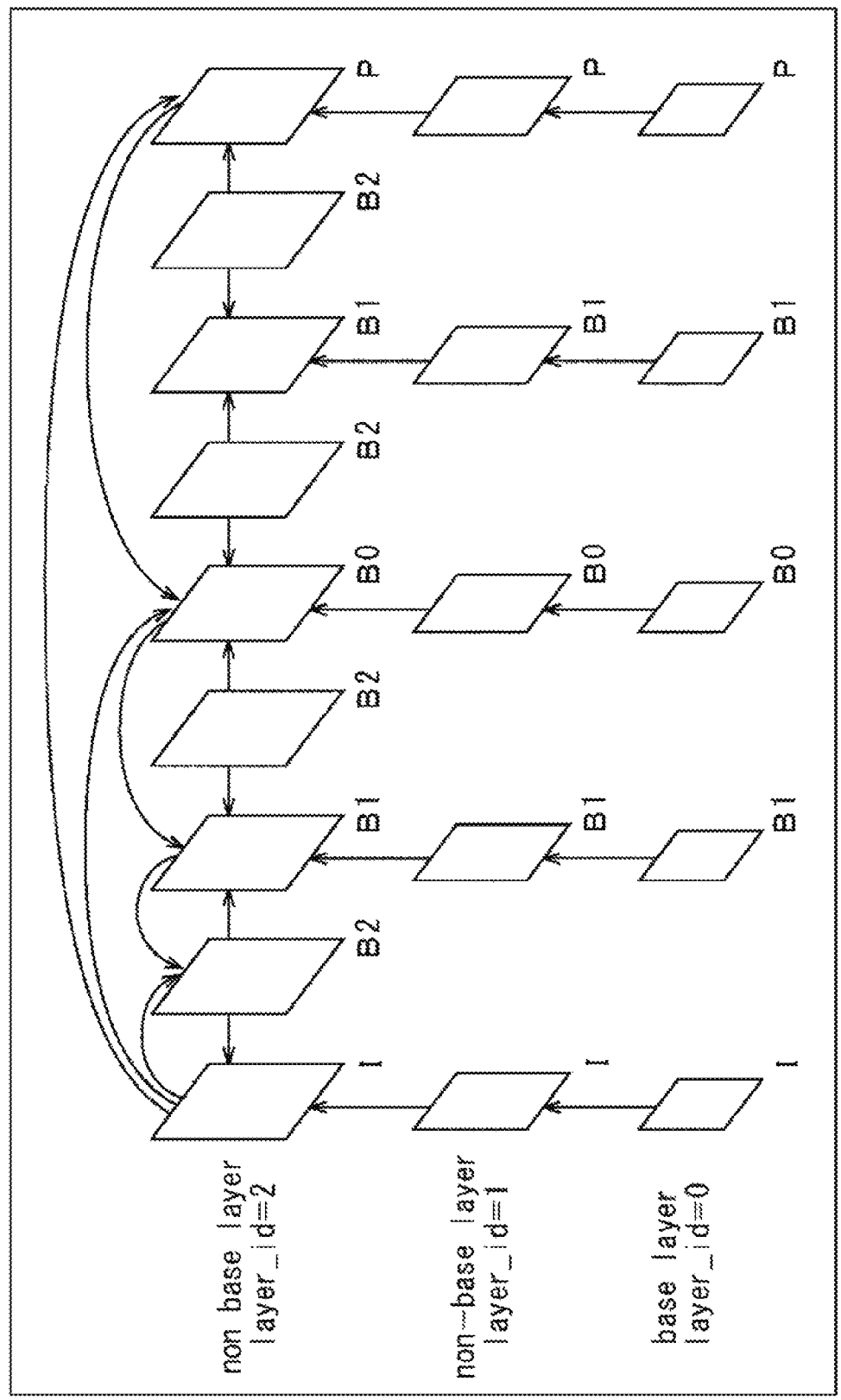
FIG. 2 is a diagram illustrating an example of a layered image encoding scheme.

Incidentally, the image coding schemes such as MPEG2 and AVC described above have a scalability function. Scalable coding (layered coding) refers to a scheme in which an image is divided into a plurality of layers (layered), and coding is performed for each layer. FIG. 2 is a diagram illustrating an example of a layered image coding scheme.

As illustrated in FIG. 2, in layering of the image, using a predetermined parameter having a scalability function as a reference, one image is divided into a plurality of levels (layers). That is, the layered image (hierarchical image) includes an image of a plurality of layers whose predetermined parameter values are different from each other. The plurality of layers of the layered image include a base layer in which coding and decoding are performed using only an image of its own layer without using an image of another layer, and a non-base layer (also referred to as an "enhancement layer") in which coding and decoding are performed using an image of another layer. The non-base layer may use an image of the base layer or use an image of another non-base layer.

In general, the non-base layer includes data (difference data) of a difference image between its own image and an image of another layer so that redundancy is reduced. For example, when one image is divided into two layers, the base layer and the non-base layer (also referred to as an "enhancement layer"), an image having lower quality than an original image may be obtained when only data of the base layer is used. Therefore, when data of the base layer and data of the non-base layer are synthesized, the original image (that is, a high quality image) may be obtained.

When the image is layered in this manner, it is possible to easily obtain an image of a variety of levels of quality according to circumstances. For example, in terminals having a low processing capacity such as a mobile telephone, image compression information of only the base layer is transmitted, and a moving image having a low spatial and temporal resolution or having low image quality is played and in terminals having a high processing capacity such as a television or a personal computer, image compression information of the enhancement layer in addition to the base layer is transmitted, and a moving image having a high spatial and temporal resolution or high image quality is played, so that a transcoding process is not performed and image compression information may be transmitted from a server according to a capability of a terminal or a network.

<Scalable Parameter>

Figure 3:
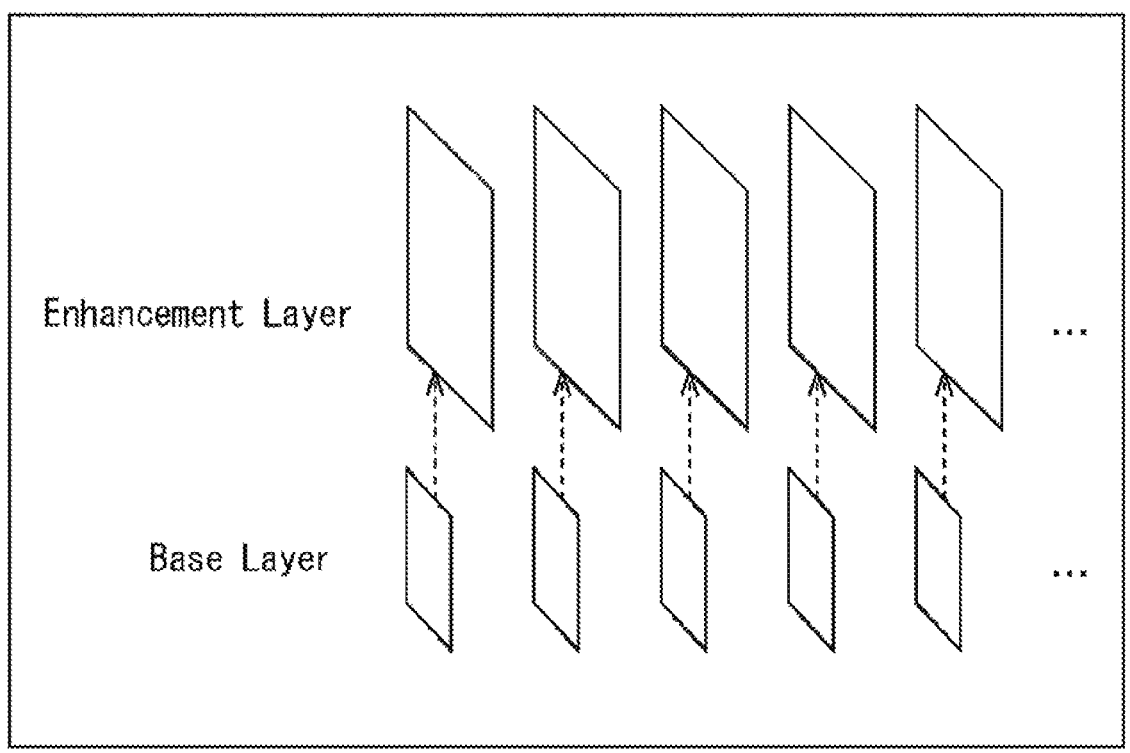
FIG. 3 is a diagram for describing an example of spatial scalable coding.

In such layered image coding and layered image decoding (scalable coding and scalable decoding), a parameter having a scalability function is arbitrary. For example, a spatial resolution illustrated in FIG. 3 may be used as a parameter thereof (spatial scalability). In the spatial scalability, a resolution of an image is different for each layer. That is, as illustrated in FIG. 3, each picture is divided into two layers, and the base layer having a lower spatial resolution than the original image and the enhancement layer in which synthesizing with the image of the base layer is performed and the original image (original spatial resolution) may be obtained. It is needless to say that the number of levels is only an example, and the image may be layered into any number of levels.

Figure 4:
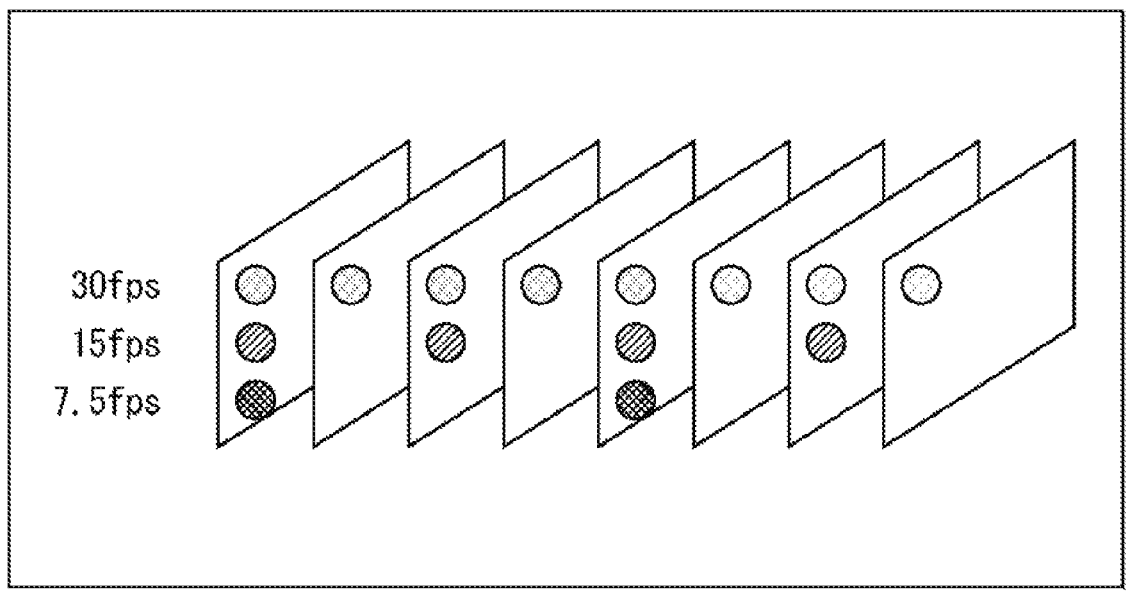
FIG. 4 is a diagram for describing an example of temporal scalable coding.

In addition, as a parameter enabling such a scalable property, another example, for example, a temporal resolution may also be applied (temporal scalability) as illustrated in FIG. 4. In the temporal scalability, a frame rate is different for each layer. That is, in this case, as illustrated in FIG. 4, the image is divided into layers having different frame rates, and when a layer having a high frame rate is added to a layer having a low frame rate, a moving image having a higher frame rate may be obtained, and when all layers are added, an original moving image (original frame rate) may be obtained. The number of levels is only an example, and the image may be layered into any number of levels.

Figure 5:
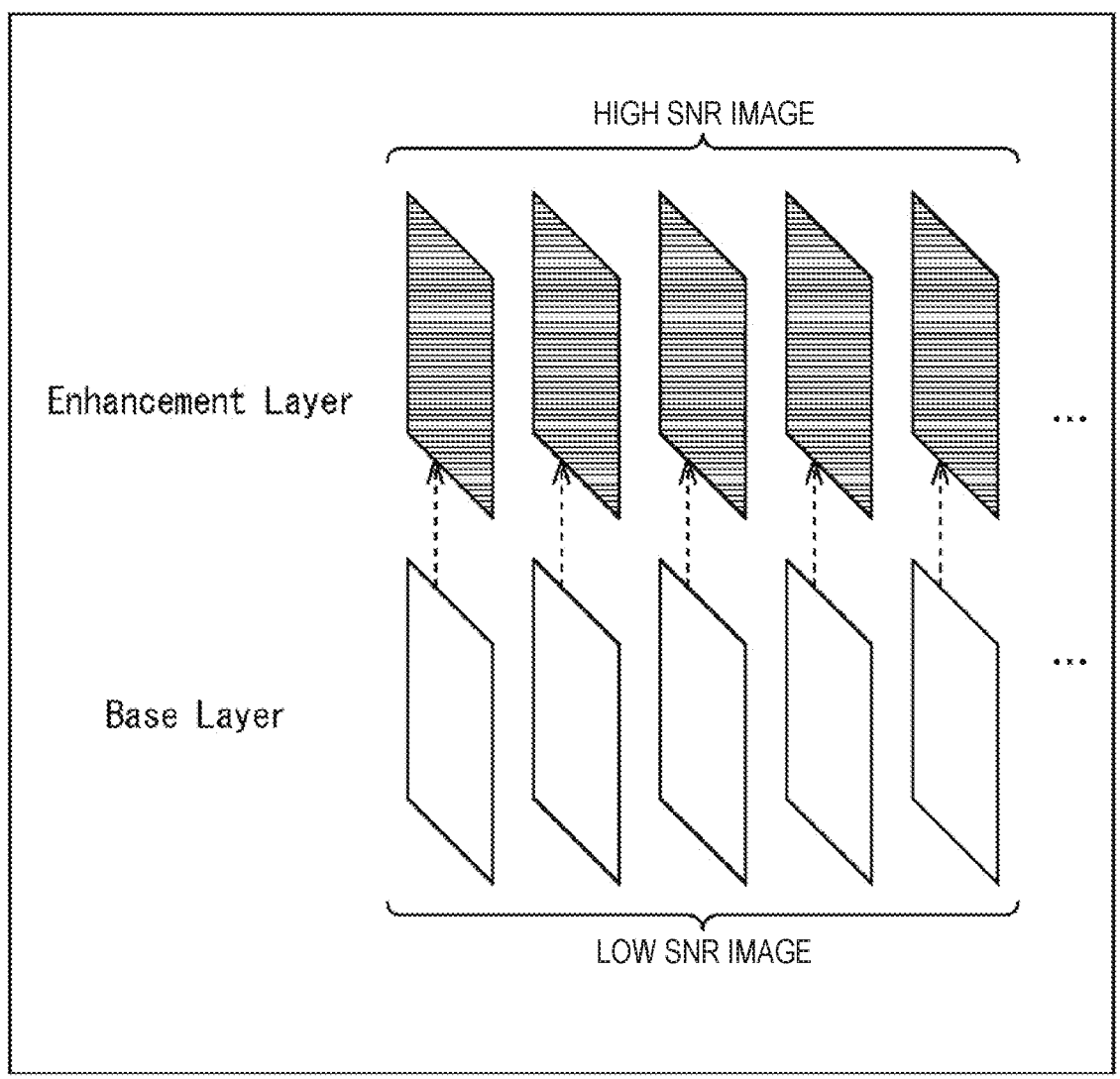
FIG. 5 is a diagram for describing an example of scalable coding of a signal-to-noise ratio.

Further, as a parameter enabling such a scalable property, in another example, for example, as illustrated in FIG. 5, a signal to noise ratio (SNR) may be applied (SNR scalability). In the SNR scalability, the SNR is different for each layer. That is, in this case, as illustrated in FIG. 5, each picture is layered into two levels, a base layer having a lower SNR than the original image and an enhancement layer that may be synthesized with an image of the base layer to obtain the original image (original SNR). That is, in base layer image compression information, information on an image of a low PSNR is transmitted, and enhancement layer image compression information is added thereto. Therefore, it is possible to reconstruct a high PSNR image. It is needless to say that the number of levels is only an example and the image may be layered into any number of levels.

It is needless to say that the parameter enabling such a scalable property may be a parameter other than the above-described example. For example, in bit-depth scalability, the base layer is an image of 8 bits, the enhancement layer is added thereto, and thus an image of 10 bits is obtained.

In addition, in chroma scalability, the base layer is a component image of a 4:2:0 format, the enhancement layer is added thereto, and thus a component image of a 4:2:2 format is obtained.

<Definition of Tile Structure and Layer>

In HEVC, it is possible to decode only a region whose decoding is necessary by an application using a tile structure. In order to indicate the fact that a tile region is independently decodable, second and later versions (including MV-HEVC, SHVC, Range Ext. and the like) of HEVC are supported by motion-constrained tile sets SEI.

<Application Examples>

Application examples to which the present technology is applied will be described.

Figure 6:
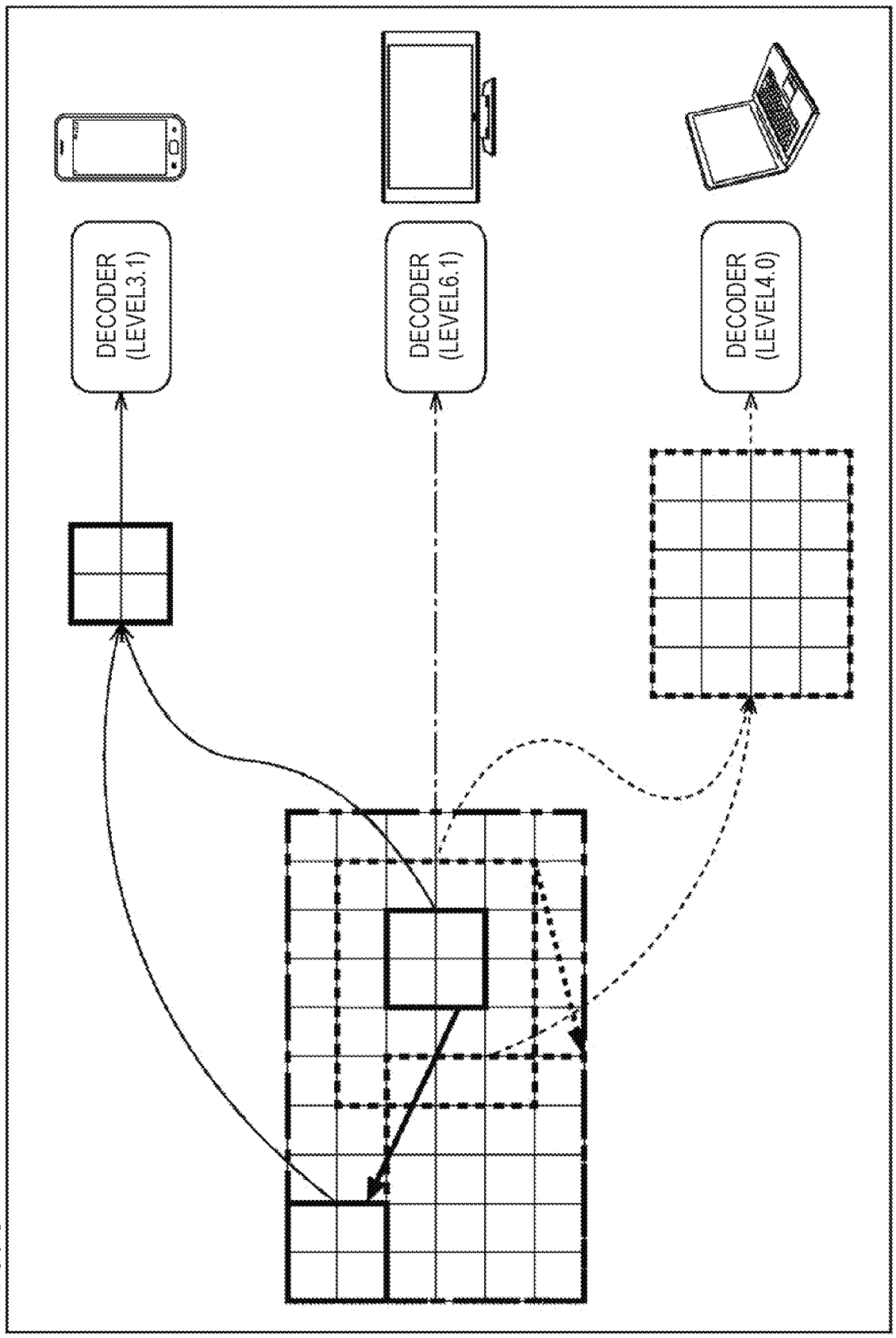
FIG. 6 is a diagram describing an exemplary application that performs partial display.

In a system configured to deliver an image from a server to a terminal, for example, as exemplified in FIG. 6, there is an application in which a single screen is divided into a plurality of screens and delivery is performed while a display region is switched. In addition, for example, as exemplified in FIG. 7, there is an application in which a partial region to be displayed (delivered) is selected in order to select an aspect ratio or a resolution of an image.

In the application of FIG. 6, partial images are segmented from an entire image using a tile as a unit in coding and decoding of the image, and delivered to terminals. Positions of the segmented partial images in the entire image may be designated by, for example, a user of the terminal. Therefore, in the terminal, it is possible to display a partial image of a desired position of the entire image. For example, in a service such as sports broadcast, in a wide angle image that is provided from a server or the like and obtained by capturing an image of an entire venue, an entire field or the like, focusing on a desired part (for example, a favorite player, a coach, in front of a goal, a bench, and an audience seat) of the user, the partial image may be segmented and downloaded (or streamed), and displayed on the terminal. That is, the user of the terminal can focus on the desired part of the entire image.

Figure 7:
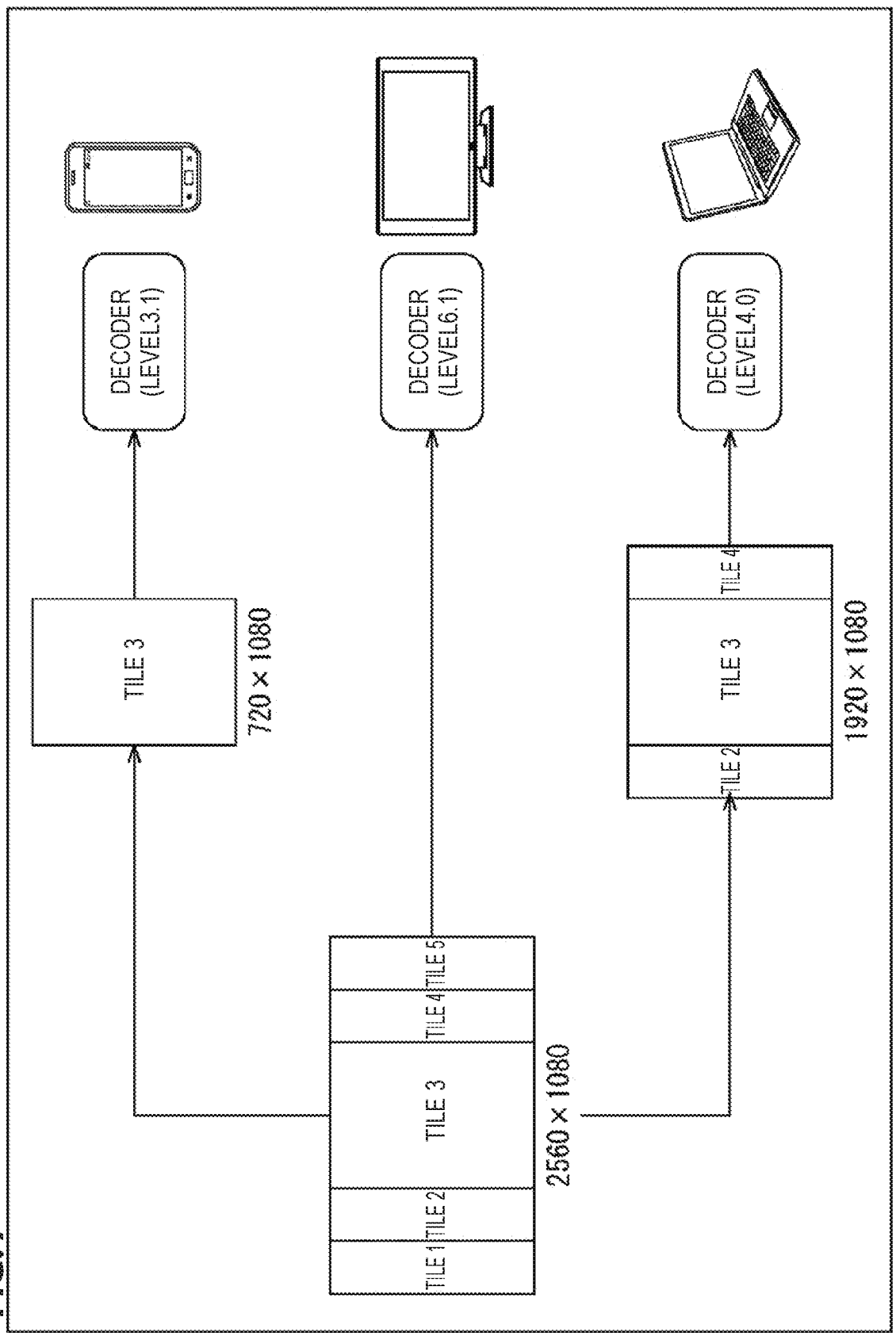
FIG. 7 is a diagram describing another exemplary application that performs partial display.

In the application of FIG. 7, by simply selecting a tile, a resolution of a display image may be set to HD or a cinema size.

However, as information on a level, which serves as a reference for determining whether a decoder can decode a stream, and a buffer capacity, only a value of the entire stream or a value of a layer unit is defined.

Therefore, even in an application that decodes only a part of an entire image, determination of whether decoding is possible is performed by assuming a load when an entire screen is decoded. Accordingly, there is concern of an unnecessarily high level decoder being necessary. In addition, there is concern of applications to be delivered being unnecessarily limited accordingly.

Therefore, decoding load definition information for defining a magnitude of a load of a decoding process of an independently decodable partial region of an image of image data to be coded is set, and the decoding load definition information is transmitted. For example, the decoding load definition information is transmitted from a coding side to a decoding side together with coded data of image data.

In this manner, the decoder may recognize performance necessary for decoding the partial region according to the decoding load definition information, and determine whether decoding is possible. That is, it is possible to recognize performance necessary for decoding more accurately. Therefore, it is possible to select the decoder having appropriate performance for the image data. Therefore, it is possible to suppress a situation of applying the decoder having an unnecessarily high level with respect to a decoding load of image data from occurring. In addition, it is possible to suppress applications to be delivered from being unnecessarily limited accordingly.

<Setting of Decoding Load Definition Information>

Figure 8:
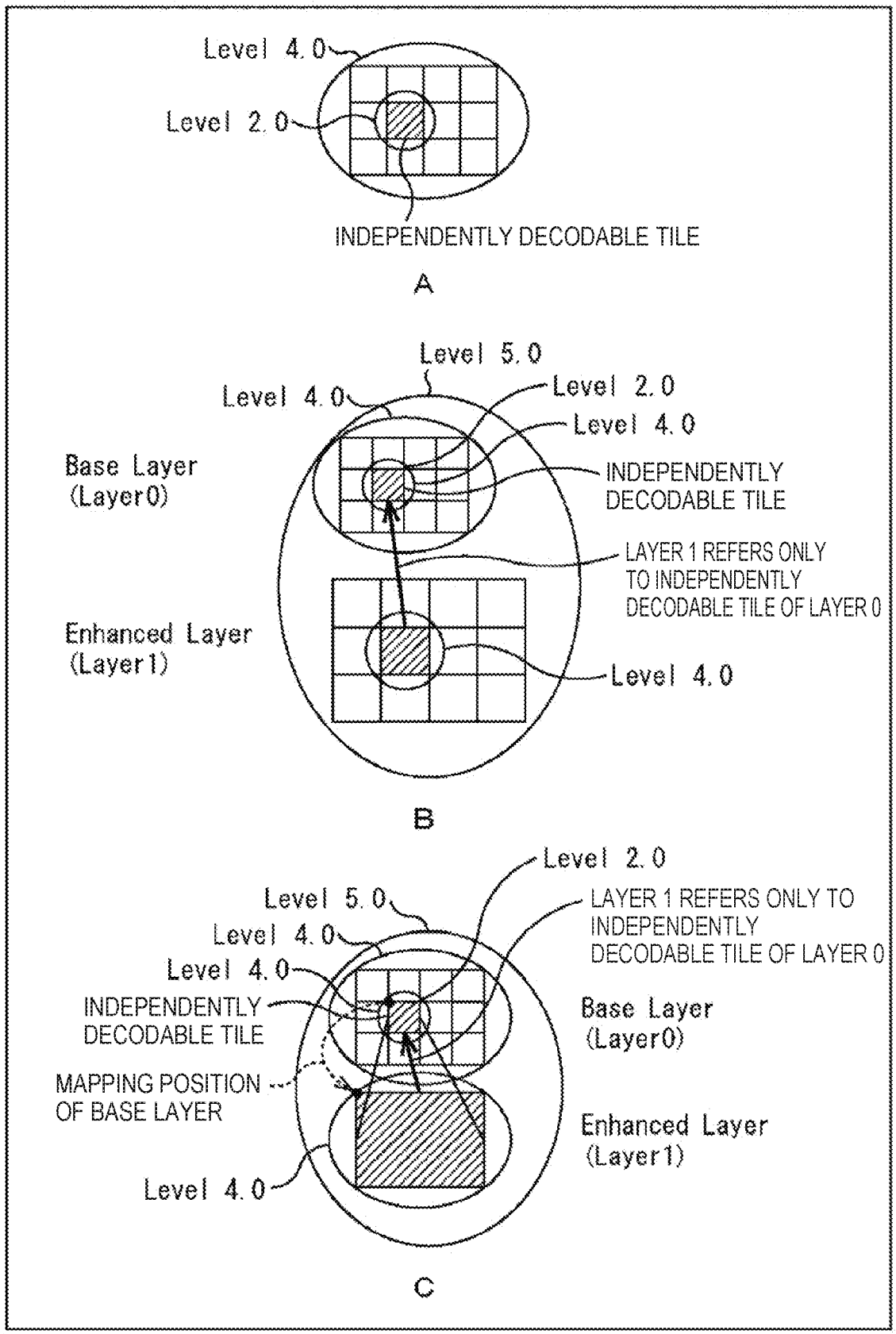
FIG. 8 is a diagram describing an exemplary method of defining a decoding load to which the present technology is applied.

The decoding load definition information is defined according to, for example, FIG. 8, For example, as exemplified in A of FIG. 8, the decoding load definition information for defining a magnitude of a load of a decoding process of the partial region may be set for an independently decodable partial region of a single layer. In the example of A of FIG. 8, level 4.0 is set for decoding an entire image of a single layer, and level 2.0 is set for decoding an independently decodable the (partial region) of the image.

In addition, for example, as exemplified in B of FIG. 8, the decoding load definition information may be set for an independently decodable partial region of each layer of an image including a plurality of layers. In the example of B of FIG. 8, level 5.0 is set for decoding an image of all layers, and level 4.0 is set for decoding an entire image of the base layer (layer 0). Further, level 2.0 is set for decoding an independently decodable tile (partial region) of the image of the base layer (layer 0). Further, level 4.0 is set for decoding (that is, decoding of a tile of the base layer (layer 0) to be referred to and a tile of the enhancement layer (layer 1) referring thereto) a tile that refers to only an independently decodable tile of an image of the base layer (layer 0) of an image of an enhancement layer (layer 1).

Further, for example, as exemplified in C of FIG. 8, the decoding load definition information may be set for the entire image of the layer referring to only the independently decodable partial region and the referred partial region. That is, a side that refers to the independently decodable tile (partial region) may be the entire image rather than the partial region. In the example of C of FIG. 8, basically, the same level as in the example of B of FIG. 8 is set. However, in the example of B of FIG. 8, the level is set for decoding a tile referring to only an independently decodable tile of the image of the base layer (layer 0) in the image of the enhancement layer (layer 1). However, in the example of C of FIG. 8, alternatively, level 4.0 is set for decoding (that is, decoding the tile of the base layer (layer 0) to be referred to and the entire image of the enhancement layer (layer 1) referring thereto) the entire image of the enhancement layer (layer 1) referring to only the independently decodable tile of the image of the base layer (layer 0).

Also, in this case, in order to identify a partial region (tile) (a position thereof) referenced by the entire image of the enhancement layer (layer 1), position information of the tile of the base layer (layer 0) serving as a reference source may be associated with (mapped with) the entire image of the enhancement layer (layer 1) serving as a reference source. In the example of C of FIG. 8, coordinates of the same position in the tile of the base layer (layer 0) are mapped with upper-left corner coordinates in the entire image of the enhancement layer (layer 1).

<Parameter Defined by Level>

Note that, a parameter defined by a level includes a maximum pixel number (MaxLumaPs), a maximum buffer capacity (MaxCPB Size), a maximum number of pixels (MaxLumaSr) of an image per second, a maximum bit rate (MaxBR) of an image or the like.

<Decoding Load Definition Information>

Definition of a magnitude of a load necessary for decoding is performed by extending, for example, motion constrained tile set supplemental enhancement information (MCTS SEI).

For example, as in a described syntax A of FIG. 9, in MCTS SEI, as the decoding load definition information for defining a magnitude of a load of a decoding process of the independently decodable partial region, a level (mcts_level_idc[i]) indicating a magnitude of a load of a decoding process of the partial region may be set. Here, "i" denotes a set (also referred to as a "tile set"), which is the partial region composed of a single tile or a plurality of tiles. That is, in the example of A of FIG. 9, a value of level information (mcts_level_idc) necessary for decoding is set for each set. In this case, semantics may be as described in, for example, B of FIG. 9.

In MCTS SEI, the independently decodable partial region is set for each rectangular set. For example, when an upper-left shaded part of A of FIG. 10 is the independently decodable partial region, the partial region is set for each set, in MCTS SEI, as illustrated in B of FIG. 10. Also, as exemplified in C of FIG. 10, a tile included in the set may overlap another set. The number of pixels of the partial region may be calculated from the number of pixels of each set, for example, as exemplified in D of FIG. 10.

In addition, for example, as in a described syntax A of FIG. 11, in MCTS SEI, as the decoding load definition information for defining a magnitude of a load of a decoding process of the independently decodable partial region of a plurality of layers, a level (mcts_level_idc[i][j]) indicating a magnitude of a load of a decoding process of the partial region of each layer may be set. Here, "i" denotes a set and "j" denotes a layer. That is, in the example of A of FIG. 11, a value of level information (mcts_level_idc) necessary for decoding is set for each set and for each layer. In this case, semantics may be as described in, for example, B of FIG. 11.

Further, for example, as in a described syntax A of FIG. 12, in MCTS as the decoding load definition information for defining a magnitude of a load of a decoding process of the independently decodable partial region, information (maxLumaP S_in_set[i]) indicating a size of the partial region may be set. Here, "i" denotes a set. That is, in the example of A of FIG. 12, a value of information (maxLumaP S_in_set) indicating a size of the set (partial region) is set for each set. In this case, semantics may be as described in, for example, B of FIG. 12.

In addition, for example, as in a described syntax A of FIG. 13, in MCTS SEI, as the decoding load definition information for defining a magnitude of a load of a decoding process of the independently decodable partial region, information (mcts_height_in_luma_samples[i]) indicating a length in a vertical direction and information (mcts_width_in_luma_samples[i]) indicating a length in a horizontal direction of the partial region may be set. Here, "i" denotes a set. That is, in the example of A of FIG. 13, a value of information (mcts_height_in_luma_samples) indicating a length in a vertical direction and a value of information (mcts_width_in_luma_samples) indicating a length in a horizontal direction of the set (partial region) are set for each set. In this case, semantics may be as described in, for example, B of FIG. 13.

Further, for example, as in a syntax described in FIG. 14, in MCTS SEI, as the decoding load definition information for defining a magnitude of a load of a decoding process of the independently decodable partial region, a parameter (mcts_hrd_parameters ( )) of a virtual reference decoder configured to decode the partial region may be set.

In this case, for example, as in a described syntax A of FIG. 15, as the parameter (mcts_hrd_parameters ( )) of the virtual reference decoder, a maximum input bit rate (mcts_bit_rate_value minus1) and a buffer capacity (mcts_cpb_size_value_minus1) of the virtual reference decoder may be set. In this case, semantics may be as described in, for example, B of FIG. 15.

In addition, for example, as illustrated in A of FIG. 16, in addition to the extension of MCTS SEI described above, in the sequence parameter set (SPS), information (mcts_present_flag) indicating whether the decoding load definition information described above is set in MCTS SEI may be set. In this case, semantics may be as described in, for example, B of FIG. 16.

Further, for example, as illustrated in A of FIG. 17, in the sequence parameter set (SPS), instead of the information indicating whether the decoding load definition information is set, the same decoding load definition information as the decoding load definition information set in MCTS SEI may be set. In this case, semantics may be as described in, for example, B of FIG. 17.

Also, information set in the sequence parameter set (SPS) may be set in a video parameter set (VPS), instead of the sequence parameter set (SPS).

It is needless to say that a method of setting the decoding load definition information is arbitrary, and is not limited to the above-described example. In addition, the above-described plurality of methods may be combined. Further, the above-described method may be combined with other methods.

As described above, when the decoding load definition information for defining a magnitude of a load of a decoding process of the independently decodable partial region is set, it is possible to recognize performance necessary for decoding more accurately based on the decoding load definition information. In addition, when the decoding load definition information is transmitted to the decoding side, it is possible to recognize performance necessary for decoding more accurately even on the decoding side.

<Adaptation to DASH>

For example, in a use case of DASH as illustrated in FIG. 6, it is preferable that a certain number of tile regions be moved and reproduced. However, when all partial images (a combination of tiles) to be reproduced are registered as a tile set (tile_set), and the decoding load definition information is set therefor, there is a possibility of an amount of information being increased when the number of tile sets is great.

Figure 18:
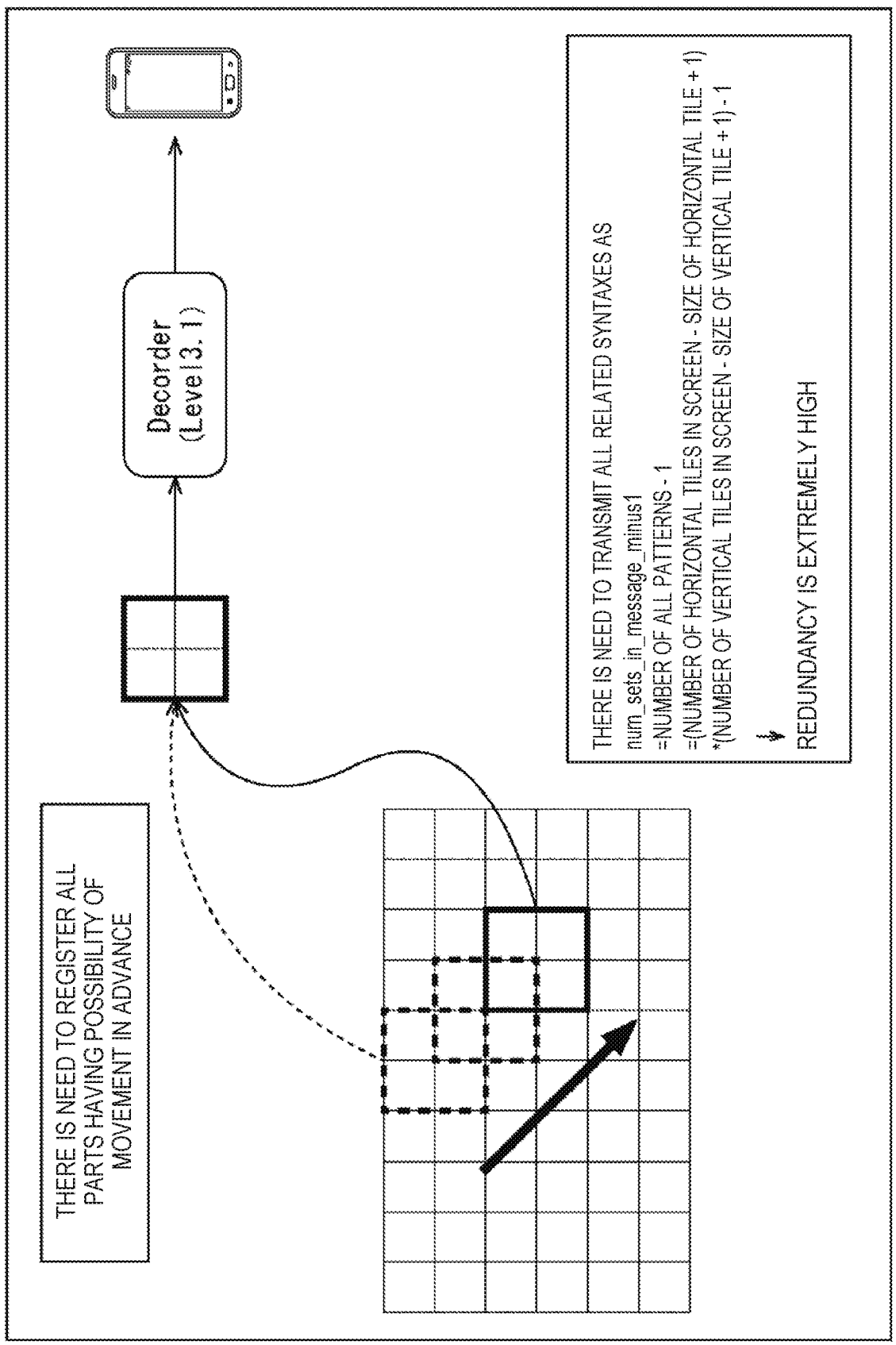
FIG. 18 is a diagram illustrating exemplary transmission of a syntax for each ROI.

For example, as exemplified in FIG. 18, when a partial image (tile set) of 2×2 tiles is reproduced (displayed), if a position of the partial image is moved (when a part to be displayed in the entire image is changed), all partial images (tile sets) during a movement thereof are displayed (reproduced). The number of such partial images may become enormous, as shown in the equation on the right side of the drawing. Accordingly, when the decoding load definition information is set for all such partial images, there is a possibility of an amount of information being impractically increased. In addition, there is a possibility of redundancy of decoding load information of each tile set in this case becoming extremely high. That is, there is a possibility of an amount of unnecessary information being increased.

Here, for example, MCTS SEI is extended, and as the decoding load information, information indicating a size of a partial image serving as a reference and a level indicating a magnitude of a load of a decoding process of the partial image are set. That is, information from which it is possible to estimate a magnitude of a load of a decoding process according to the size of the partial image is stored in MCTS SEI.

Therefore, for example, when such information is referred to (when a size of a region to be decoded is compared with a size of the partial image serving as a reference thereof), it is possible recognize to a magnitude of a load of a decoding process of the region more accurately.

Here, the size of the partial image serving as the reference may be indicated by any information, and may be indicated, for example, in units of tiles obtained by uniformly dividing the entire image. In addition, the number of sizes serving as a reference thereof may be arbitrary, but it is preferable that the number of sizes be plural in order for a magnitude of a load of a decoding process to be recognized more accurately. In addition, a magnitude of a load of a decoding process may be indicated by any information, and may be indicated by, for example, level information (level).

Incidentally, in an existing ROI, it is assumed that an application can designate any position, or in other words, it is absolutely necessary that some region (ROI) be defined. However, an application such as tiled streaming of DASH has a concept of segmenting and displaying a region selected by the user (also including switching to a stream having a different resolution), That is, since the user can arbitrarily determine a region to be selected, it is assumed that all tiles are independently decodable tiles and are further uniformly divided and the number of tiles to be selected differing according to a capability (level) of a device to be reproduced is assumed to correspond to operation of the most common service.

Therefore, assumption of an application for the existing ROI and assumption of an application for tiled streaming of DASH have slightly different directions.

Accordingly, a mode of an application is introduced such that a level of a region (tile) unit decoded by the application may be defined while both of the assumptions are satisfied in one SEI, and information to be defined may be changed for each mode for extension.

For example, a concept of a mode is defined for each application to change information to be defined as necessary. For example, a DASH mode is set. Therefore, it is defined that the DASH mode="uniform division and independence of all tiles." That is, in the DASH mode, the screen is assumed to be uniformly divided into tiles (uniform_spacing_flag=1@PPS). In addition, individual tiles are assumed to be independently decodable.

Therefore, in the DASH mode, the number of tiles to be decoded at a time and level information corresponding thereto are described (defined). For example, in FIG. 19, as the number of tiles to be decoded at a time, three cases, 4, 12, and 30, are set. Level information (decoding load information) is set for each of the three cases.

In this manner, it is possible to set the decoding load information more appropriately for both of the applications described above.

FIG. 20 illustrates an extension example (an exemplary syntax) of MCTS SEI in this case. In the example of FIG. 20, a mode (mcts_mode) of an application is set in a 2nd row from the top. Therefore, as described in a 4th row from the top, when the mode is a mode (mode for current ROI application) of an application for the existing ROI (mcts_mode==0), the decoding load information is set for each independently decodable partial image, similarly to each example described above. For example, level information (mcts_level_idc[i]) necessary for decoding is set in a 13th row from the top.

In addition, when the mode of the application is the DASH mode (mode for DASH application) (mcts_mode==1), the number of tiles of a region to be decoded at a time and level information corresponding thereto are set. For example, in the 17th row from the top, identification information (mcts_id[i]) of the region is set. In the next row, information (num_of_tiles_minus1[i]) indicating the number of tiles included in the region indicated by the identification information is set. Further, in the next row, level information (mcts_level_idc[i]) necessary for decoding the region is set.

Here. "i" denotes a set. That is, in the example of FIG. 20, a value of level information (mcts_idc) necessary for decoding, a value of identification information (mcts_id) and a value of information (num_of_tiles_minus1) indicating the number of tiles included in a region indicated by the identification information are set for each set.

When the decoding load information is set as described above, it is possible to recognize performance necessary for decoding more accurately according to a size (the number of tiles) of the region to be decoded based on the decoding load information. In addition, when the decoding load definition information is transmitted to the decoding side, it is possible to recognize performance necessary for decoding more accurately according to a size (the number of tiles) of the region to be decoded, even on the decoding side.

<Other Example 1 of Setting Decoding Load Definition Information>

A rectangular tile set has been described above. In this case, for example, when the MCTS (independently decodable tile group (partial region)) is assumed to have an "L" shape, it is necessary to define two sets, a tile set in which a vertical direction indicating a vertical line part of the letter "L" is defined as a longitudinal direction, and a tile set in which a horizontal direction indicating a horizontal line part of the letter "L" is defined as a longitudinal direction.

In addition, it has been described above that, as the decoding load definition information, a value of information (mcts_level_idc[i]) indicating a level (level necessary for decoding) indicating a magnitude of a load of a decoding process of the partial region is set for each rectangular set. That is, in this case, in the L-shaped partial region, it is necessary to set two pieces of information (mcts_level_idc[i]) indicating a level necessary for decoding. It is needless to say that it is possible to deal with a case in which levels necessary for decoding sets are different in this manner. However, when levels necessary for decoding sets are the same, it becomes redundant and there is a possibility of coding efficiency decreasing.

Therefore, one level may be set for the independently decodable partial region rather than for each set. An independently decodable set may be the independently decodable partial region. That is, a common level may be defined for a plurality of independently decodable partial regions. An exemplary syntax in this case is described in A of FIG. 21. In addition, an example of semantics in this case is described in B of FIG. 21.

In the example of A of FIG. 21, in a 3rd row from the top, information (each_tile_one_tile_set_flag) indicating whether all tiles form an independently decodable set is set. In a 4th row from the top, information (mcts_level_idc_present_flag) indicating whether information (mcts_level_idc) indicating a level necessary for decoding is included is set in motion-constrained tile sets defined in an SEI message.

Therefore, in a 5th row from the top, when it is determined that all tiles do not form a uniquely decodable set (!each_tile_one_tile_set_flag), in a loop of a 7th row to a 16th row from the top, settings are performed for each set, and a level (mcts_level_idc) necessary for decoding is set in an 18th row from the top other than the loop.

Figure 22:
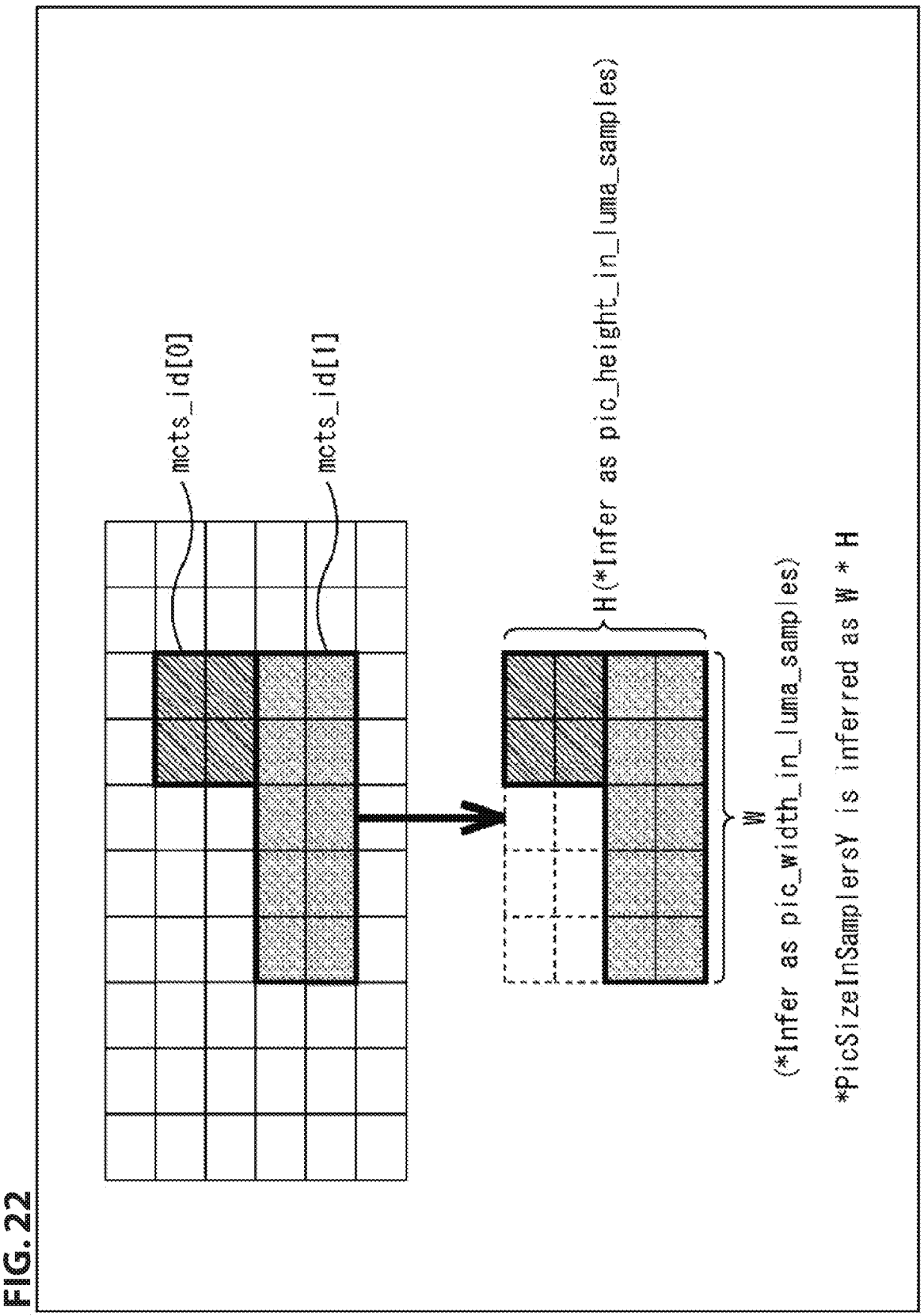
FIG. 22 is a diagram describing a state of parameter mapping.

That is, as exemplified in FIG. 22, when all tiles are independently decodable, a set in which "0"th identification information (mcts_id[0]) is assigned and a set in which "1"st identification information (mcts_id[1]) is assigned are adjacent to each other, and levels necessary for decoding sets are the same, level information (mcts_level_idc[i]) is not set for each set, but level information (mcts_level_idc) common to both sets may be set.

In this manner, only one (common) piece of level information may be set for a plurality of independently decodable partial regions (for example, partial regions necessary to be represented by a plurality of sets). Therefore, it is possible to reduce redundancy and increase coding efficiency.

Also, in HEVC described in Non-Patent Literature 1, it is assumed that the level is defined in an entire image (picture) unit, and definition of a parameter of the level is also performed in the entire image (picture) unit. Therefore, when the level is defined in a partial region unit described above, definition of the parameter of the level for the partial region is also performed, and the definition may be assigned (parameter mapping is performed) to definition of the level of the entire image (picture) unit.

For example, when the independently decodable partial region has a rectangular shape, the parameter of the level for the partial region is defined. The definition of the level of the entire image (picture) unit may be replaced with the definition. In addition, for example, when the independently decodable partial region has an "L" shape, a rectangle including the L-shaped partial region is set, the parameter of the level for the rectangular region is defined, and definition of the level of the entire image (picture) unit may be replaced with the definition.

For example, in FIG. 22, when the independently decodable partial region includes the set of identification information (mcts_id[0]) and the set of identification information (mcts_id[1]), a rectangular region including both of the sets is set, and is assigned to a picture (a unit of definition of the parameter of the level). That is, a size W of the rectangular region in a horizontal direction is estimated as pic_width_in_luma_samples, a size H of the rectangular region in a vertical direction is estimated as pic_height_in_luma_samples, a size W×H of the rectangular region is estimated as PicSizeinSamplesY, and the parameter of the level for the rectangular region may be defined.

In this manner, a value of the parameter defined for the rectangular region may be mapped with the parameter defined in the picture unit. Therefore, when such parameter mapping is performed, it is possible to employ more appropriate definition for the independently decodable partial region.

Incidentally, when all tiles are independently decodable, it is possible to set a level mcts_level_idc[i]) necessary for decoding the partial region according to a size of the partial region. In this case, the size of the partial region may be represented by the number of tiles (the number of rows) in a vertical direction and the number of tiles (the number of columns) in a horizontal direction of the partial region. Here, "i" denotes the number of correspondence relations between the size and the level of the partial region.

In the example of A of FIG. 21, in a loop of a 20th row to a 28th row from the top, the size and the level of the partial region are associated. In the loop, information (num_mc_tile_columns_minus1[i]) indicating the number of tiles of the partial region in a vertical direction is set (a 24th row from the top), and information (num_mc_tile_rows_minus1[i]) indicating the number of tiles of the partial region in a horizontal direction is set (a 25th row from the top).

Figure 23:
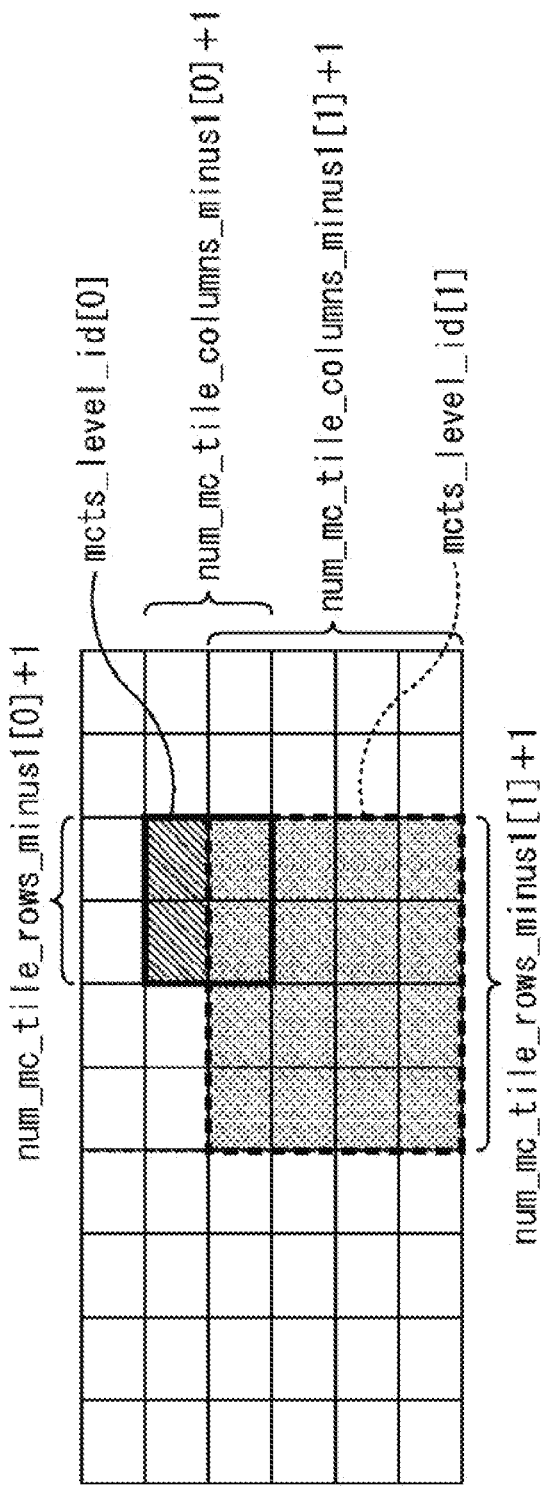
FIG. 23 is a diagram describing syntax elements.

For example, in FIG. 23, in a "0"th correspondence relation in which identification information (mcts_level_id[0]) is set, the partial region of 2×2 tiles is associated with a level (meta_level_idc[0]), That is, in the correspondence relation, a value of information (num_mc_tile_columns_minus1[0]) indicating the number of tiles of the partial region in a vertical direction is set to "1," and information (num_mc_tile_rows_minus1[0]) indicating the number of tiles of the partial region in a horizontal direction is set to "1." When such information is set, in addition to the fact that the number of tiles of the partial region corresponding to the level (meta_level_idc[0]) is 4, a shape (a rectangle of two vertical tiles×two horizontal tiles) of the partial region is also shown.

For example, in FIG. 23, in a "1"st correspondence relation in which identification information (mcts_level_id[1]) is set, the partial region of 4×4 tiles is associated with a level (meta_level_idc[1]). That is, in the correspondence relation, a value of information (num_mc_tile_columns_minus1[1]) indicating the number of tiles of the partial region in a vertical direction is set to "3," and information (num_mc_tile_rows_minus1[1]) indicating the number of tiles of the partial region in a horizontal direction is set to "3." When such information is set, in addition to the fact that the number of tiles of the partial region corresponding to the level (meta_level_idc[1]) is 16, a shape (a rectangle of four vertical tiles×four horizontal tiles) of the partial region is also shown.

In this manner, it is possible to increase convenience of information for associating the partial region with the level. For example, a terminal configured to acquire and display a partial image thereof determines whether the partial region is horizontally long based on the information. When the partial region is horizontally long, it is possible to adjust an aspect ratio of a display image such as display by inserting a black band on the top and bottom more easily.

<Other Example 2 of Setting Decoding Load Definition Information>

When all tiles are independently decodable, a maximum value (max_level_idc) of a level of a tile unit in the picture may be set. That is, one tile is set as one set, a maximum value in the picture of the level set for each set may be set. An exemplary syntax in this case is described in A of FIG. 24. In addition, an example of semantics in this case is described in B of FIG. 24.

Figure 26:
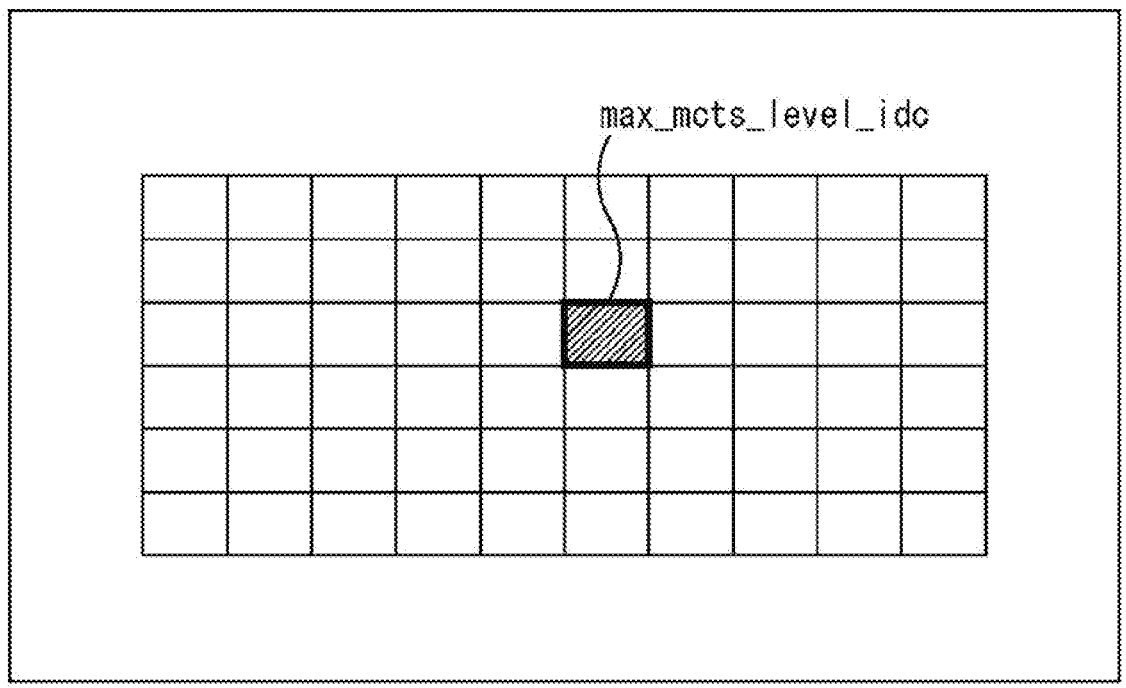
FIG. 26 is a diagram describing syntax elements.

In the example of A of FIG. 24, in a 21st row from the top, a maximum value (max_level_idc) of the level in the picture is set. As exemplified in FIG. 26, the level is a level that is set for the set composed of one tile. For example, in FIG. 26, a maximum value of the level set for each set of 60 sets (60 tiles) in total including 6 vertical sets (6 tiles)×10 horizontal sets (10 tiles) in the picture is set as max_level_idc.

The number of tiles segmented from the entire image is determined by the application. Although the number of tiles corresponding to each level is not entirely defined, the application can sufficiently accurately determine the number of tiles that can be segmented (can perform a process such as decoding) based on the maximum value (max_level_idc) of the level.

That is, instead of entirely defining the number of tiles corresponding to each level, when only a maximum value (max_level_idc) of the level set for each set (that is, for each tile) composed of one the is set in the picture, the application may control the number of segmented tiles based on the setting so that the process such as decoding does not fail.

Therefore, in this manner, compared to when the number of tiles corresponding to each level is entirely defined, a syntax of all tiles can be simplified and a load of the process can be reduced. In addition, compared to when the number of tiles corresponding to each level is entirely defined, an amount of information to be transmitted can be reduced and coding efficiency can increase.

Figure 25:
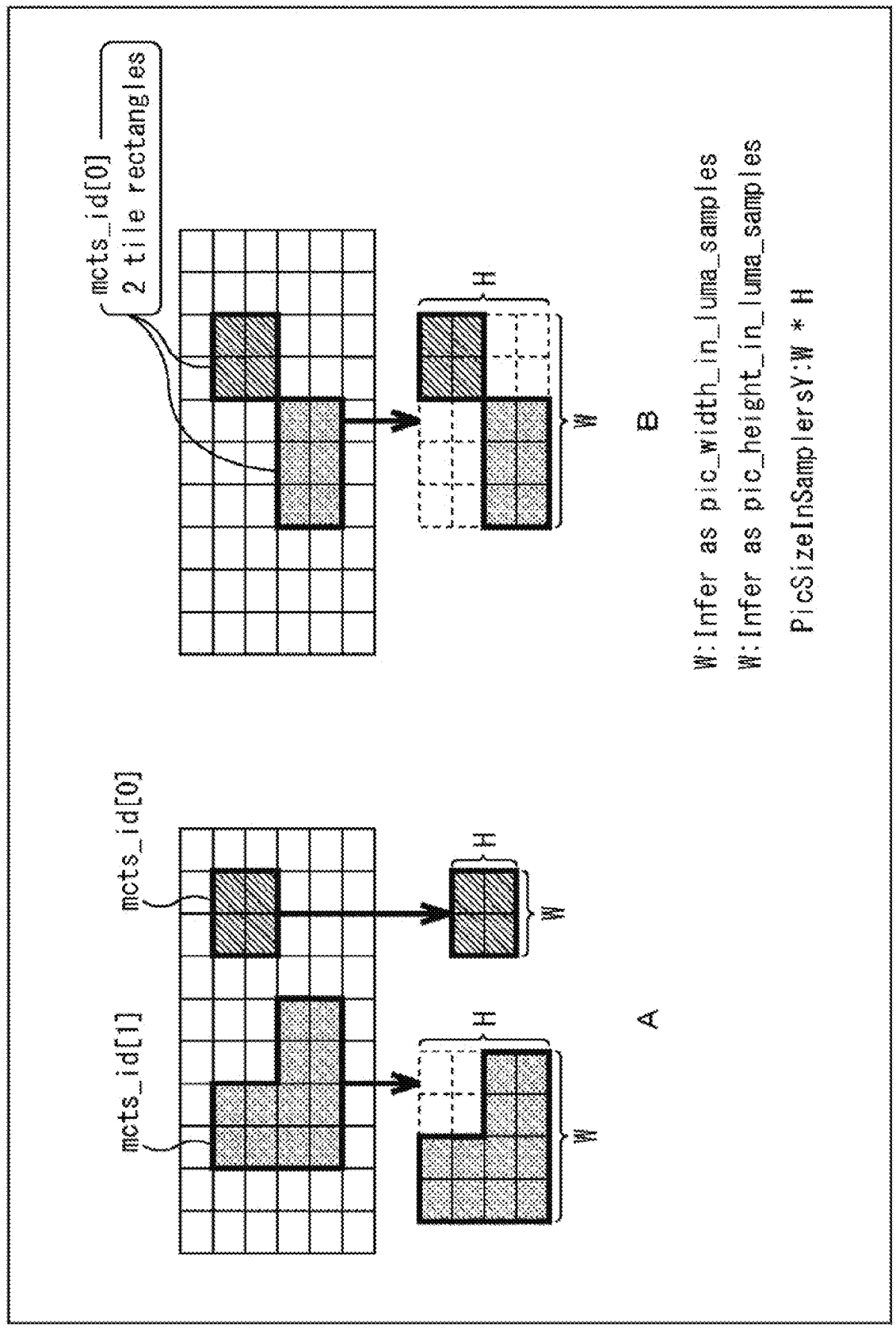
FIG. 25 is a diagram describing a state of parameter mapping.

Also, as exemplified in A of FIG. 24, in a 17th row from the top, a level (mcts_level_idc[i]) for each partial region is set. That is, as exemplified in A of FIG. 25, when there are two independently decodable sets, a set to which identification information (mcts_id[0]) is assigned and a set to which identification information mcts_id[1]) is assigned, it is possible to set a level (mcts_level_idc[i]) for each set.

In this case, a rectangular region including the set is set for each set, and may be assigned to each picture (a unit of defining the parameter of the level). For example, in A of FIG. 25, the rectangular region including the set of identification information (mcts_id[0]) is set, a size W of the rectangular region in a horizontal direction is estimated as pic_width_in_luma_samples, a size H of the rectangular region in a vertical direction is estimated as pic_height_in_luma_samples, a size W×H of the rectangular region is estimated as PicSizeInSamplesY, and the parameter of the level for the rectangular region may be defined. Similarly, a rectangular region including the set of identification information (mcts_d[1]) is set, a size W of the rectangular region in a horizontal direction is estimated as pic_width_in_luma_samples, a size H of the rectangular region in a vertical direction is estimated as pic_height_in_luma_samples, a size W×H of the rectangular region is estimated as PicSizeInSamplesY, and the parameter of the level for the rectangular region may be defined.

In this manner, a value of the parameter defined for each rectangular region may be mapped with the parameter defined in the picture unit. Therefore, when such parameter mapping is performed, it is possible to employ more appropriate definition for each independently decodable partial region.

Also, when the independently decodable partial region is formed of a plurality of rectangular regions, a rectangle including all these rectangular regions may be set. For example, in B of FIG. 25, a set of identification information (mcts_id[0]) includes two rectangular regions, a rectangular region including all of the set is set, a size W of the rectangular region in a horizontal direction is estimated as pic_width_in_luma_samples, a size H of the rectangular region in a vertical direction is estimated as pic_height_in_luma_samples, a size W×H of the rectangular region is estimated as PicSizeInSamplesY, and the parameter of the level for the rectangular region may be defined.

In this manner, even when the independently decodable partial region is formed of a plurality of rectangular regions, a value of the parameter defined for the rectangular region may be mapped with the parameter defined in the picture unit.

Therefore, when such parameter mapping is performed, it is possible to employ more appropriate definition of the partial region even if the independently decodable partial region is formed of a plurality of rectangular regions.

2. Second Embodiment

<Image Coding Device>

Figure 27:
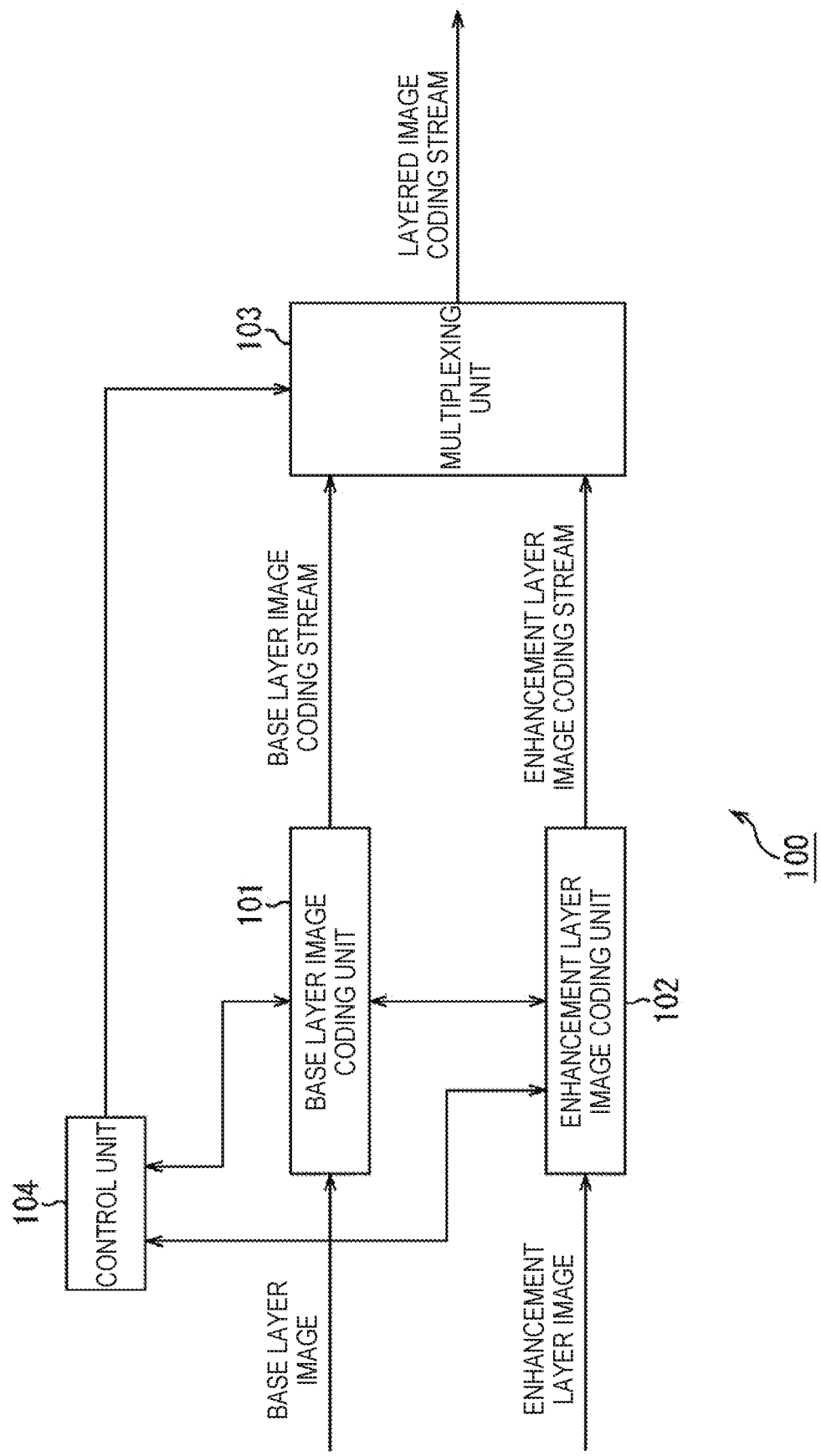
FIG. 27 is a block diagram illustrating a main configuration example of an image coding device.

Next, a device configured to implement the present technology described above and a method thereof will be described. FIG. 27 is a diagram illustrating an image coding device, which is an aspect of an image processing device to which the present technology is applied. An image coding device 100 illustrated in FIG. 27 is a device configured to perform layered image coding (scalable coding). As illustrated in FIG. 27, the image coding device 100 includes a base layer image coding unit 101, an enhancement layer image coding unit 102, a multiplexing unit 103, and a control unit 104.

The base layer image coding unit 101 codes a base layer image and generates a base layer image coding stream. The enhancement layer image coding unit 102 codes an enhancement layer image and generates an enhancement layer image coding stream. The multiplexing unit 103 multiplexes the base layer image coding stream generated in the base layer image coding unit 101 and the enhancement layer image coding stream generated in the enhancement layer image coding unit 102, and generates a layered image coding stream. The multiplexing unit 103 transmits the generated layered image coding stream to the decoding side.

The control unit 104 performs settings related to all image data, controls the base layer image coding unit 101 and the enhancement layer image coding unit 102 based on the settings, and thus controls coding of each of the layers. In addition, the control unit 104 generates the video parameter set (VPS) using the settings, supplies the parameter to the multiplexing unit 103, and transmits the parameter to the decoding side. In this case, the video parameter set may be transmitted to be included in the layered image coding stream or may be transmitted as data separate from the layered image coding stream.

In addition, when the decoding load definition information or information indicating whether the decoding load definition information is set is set in the video parameter set (VPS), the control unit 104 collects the decoding load definition information or the like from the base layer image coding unit 101 and the enhancement layer image coding unit 102, and sets the decoding load definition information or information indicating whether the decoding load definition information is set in the video parameter set (VPS) based on the information.

In addition, the base layer image coding unit 101 and the enhancement layer image coding unit 102 may exchange decoding load related information, which is information on a magnitude of a load of a decoding process, with each other. For example, as exemplified in FIG. 11, when the decoding load definition information of a plurality of layers is set, a coding unit of the layer collects decoding load related information of other layers.

<Base Layer Image Coding Unit>

Figure 28:
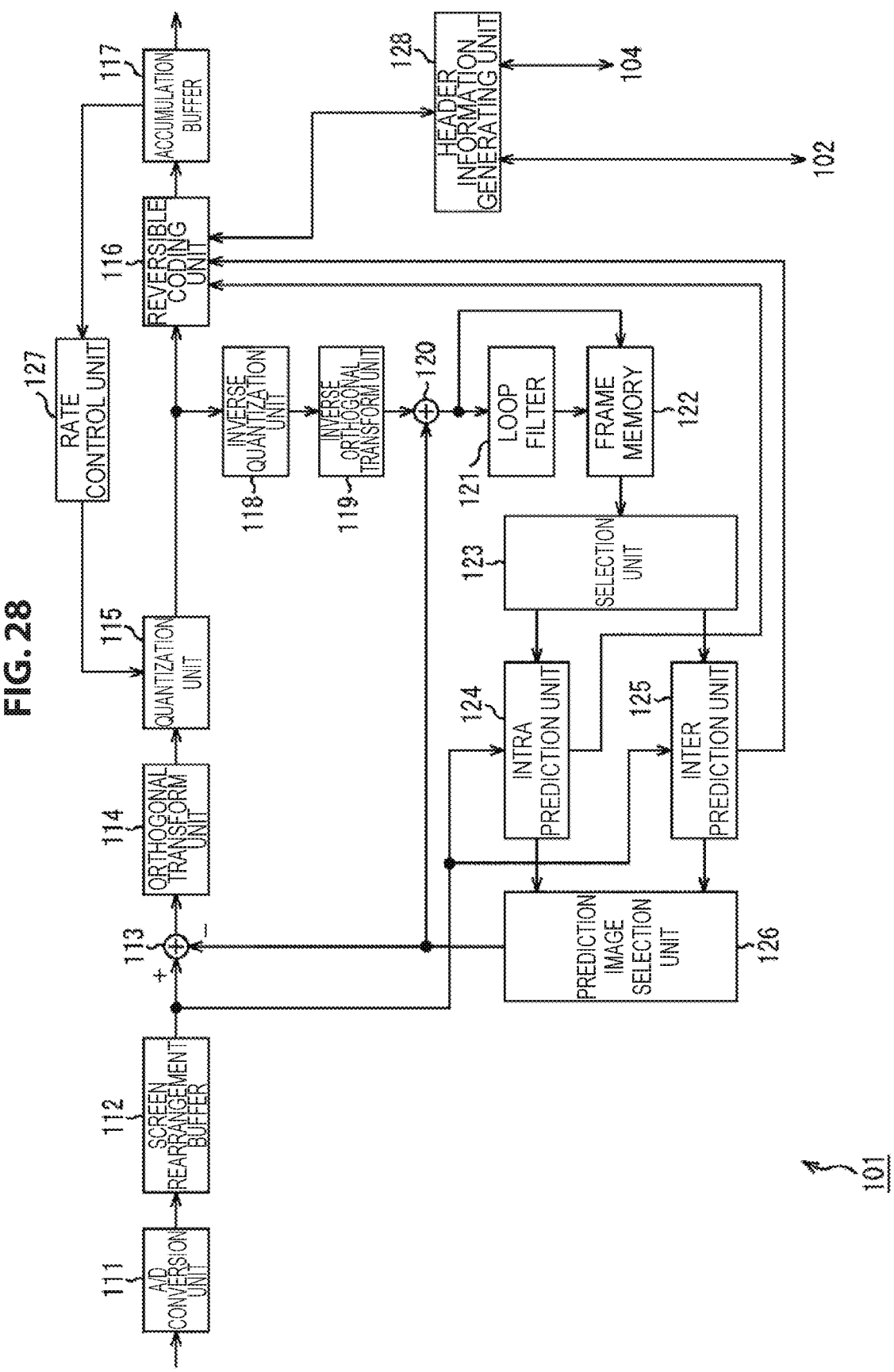
FIG. 28 is a block diagram illustrating a main configuration example of a base layer image coding unit.

FIG. 28 is a block diagram illustrating a main configuration example of the base layer image coding unit 101 of FIG. 27, As illustrated in FIG. 28, the base layer image coding unit 101 includes an A/D conversion unit 111, a screen rearrangement buffer 112, a computation unit 113, an orthogonal transform unit 114, a quantization unit 115, a reversible coding unit 116, an accumulation buffer 117, an inverse quantization unit 118, and an inverse orthogonal transform unit 119. In addition, the base layer image coding unit 101 includes a computation unit 120, a loop filter 121, a frame memory 122, a selection unit 123, an intra prediction unit 124, an inter prediction unit 125, a prediction image selection unit 126, and a rate control unit 127.

The A/D conversion unit 111 performs A/D conversion of input image data (base layer image information), and supplies and stores the converted image data (digital data) in the screen rearrangement buffer 112. The screen rearrangement buffer 112 rearranges images of frames of a stored display order according to an order of frames for coding, depending on a group of picture (GOP), and supplies the image whose frame order is rearranged to the computation unit 113. In addition, the screen rearrangement buffer 112 supplies the image in which the frame order is rearranged to the intra prediction unit 124 and the inter prediction unit 125.

The computation unit 113 subtracts a prediction image supplied from the intra prediction unit 124 or the inter prediction unit 125 through the prediction image selection unit 126 from the image read from the screen rearrangement buffer 112, and outputs difference information thereof to the orthogonal transform unit 114. For example, in an image on which intra coding is performed, the computation unit 113 subtracts a prediction image supplied from the intra prediction unit 124 from the image read from the screen rearrangement buffer 112. In addition, for example, in an image on which inter coding is performed, the computation unit 113 subtracts a prediction image supplied from the inter prediction unit 125 from the image read from the screen rearrangement buffer 112.

The orthogonal transform unit 114 performs an orthogonal transform such as a discrete cosine transform or a Karhunen-Loève transform on the difference information supplied from the computation unit 113. The orthogonal transform unit 114 supplies a conversion coefficient thereof to the quantization unit 115.

The quantization unit 115 quantizes the conversion coefficient supplied from the orthogonal transform unit 114. The quantization unit 115 sets the quantization parameter based on information on a target value of a code amount supplied from the rate control unit 127, and performs quantization thereof. The quantization unit 115 supplies the quantized conversion coefficient to the reversible coding, unit 116.

The reversible coding unit 116 codes the conversion coefficient quantized in the quantization unit 115 using an arbitrary coding scheme. Since coefficient data is quantized under control of the rate control unit 127, the code amount becomes a target value (or approximates a target value) set by the rate control unit 127.

In addition, the reversible coding unit 116 acquires information indicating a mode of intra prediction from the intra prediction unit 124, and acquires information indicating, a mode of inter prediction or differential motion vector information from the inter prediction unit 125. Further, the reversible coding unit 116 appropriately generates a network abstraction layer (NAL) unit of a base layer including a sequence parameter set (SPS), a picture parameter set (PPS) and the like.

The reversible coding unit 116 codes various pieces of information using an arbitrary coding scheme and sets the information as a part of coded data (also referred to as a "coding stream") (multiplexes). The reversible coding unit 116 supplies and accumulates the coded data obtained by coding to the accumulation buffer 117.

Examples of the coding scheme of the reversible coding unit 116 include variable-length coding and arithmetic coding. Examples of the variable-length coding include context-adaptive variable length coding (CAVLC) defined in an H.264 scheme or the AVC scheme. Examples of the arithmetic coding include context-adaptive binary arithmetic coding (CABAC).

The accumulation buffer 117 temporarily maintains the coding stream (base layer coding stream) supplied from the reversible coding unit 116. The accumulation buffer 117 outputs the maintained base layer coding stream to the multiplexing unit 103 (FIG. 27) at a predetermined timing. That is, the accumulation buffer 117 also serves as a transmission unit configured to transmit the base layer coding stream.

In addition, the conversion coefficient quantized in the quantization unit 115 is also supplied to the inverse quantization unit 118. The inverse quantization unit 118 performs inverse quantization of the quantized conversion coefficient using a method corresponding to quantization by the quantization unit 115. The inverse quantization unit 118 supplies the obtained conversion coefficient to the inverse orthogonal transform unit 119.

The inverse orthogonal transform unit 119 performs an inverse orthogonal transform of the conversion coefficient supplied from the inverse quantization unit 118 using a method corresponding to an orthogonal transform process by the orthogonal transform unit 114. An inverse orthogonal-transformed output (restored difference information) is supplied to the computation unit 120.

The computation unit 120 adds the prediction image from the intra prediction unit 124 or the inter prediction unit 125 through the prediction image selection unit 126 to the restored difference information, which is an inverse orthogonal transform result supplied from the inverse orthogonal transform unit 119, and obtains a locally decoded image (decoded image). The decoded image is supplied to the loop filter 121 or the frame memory 122.

The loop filter 121 includes a deblocking filter, an adaptation loop filter or the like, and performs an appropriate filter process on a reconstructed image supplied from the computation unit 120. For example, the loop filter 121 performs a deblocking filter process on the reconstructed image and thus removes block distortion of the reconstructed image. In addition, for example, the loop filter 121 performs a loop filter process on the deblocking filter process result (the reconstructed image whose block distortion is removed) using a Wiener filter to improve image quality. The loop filter 121 supplies the filter process result (hereinafter also referred to as a "decoded image") to the frame memory 122.

Also, the loop filter 121 may further perform any other filter process on the reconstructed image. In addition, the loop filter 121 may supply information on a filter coefficient or the like used in the filter process to the reversible coding unit 116 as necessary, and code the information.

The frame memory 122 stores the supplied decoded image, and supplies the stored decoded image to the selection unit 123 as a reference image at a predetermined timing.

More specifically, the frame memory 122 stores the reconstructed image supplied from the computation unit 120 and the decoded image supplied from the loop filter 121. The frame memory 122 supplies the stored reconstructed image to the intra prediction unit 124 through the selection unit 123 at a predetermined timing or based on a request from the outside such as the intra prediction unit 124. In addition, the frame memory 122 supplies the stored decoded image to the inter prediction unit 125 through the selection unit 123 at a predetermined timing or based on a request from the outside such as the inter prediction unit 125.

The selection unit 123 selects a supply destination of the reference image supplied from the frame memory 122. For example, in intra prediction, the selection unit 123 supplies the reference image (a pixel value in a current picture or a base layer decoded image) supplied from the frame memory 122 to the intra prediction unit 124. In addition, for example, in inter prediction, the selection unit 123 supplies the reference image (a decoded image other than the current picture of an enhancement layer or the base layer decoded image) supplied from the frame memory 122 to the inter prediction unit 125.

The intra prediction unit 124 performs a prediction process on a current picture, which is an image of frames of a process target, and generates a prediction image. The intra prediction unit 124 performs the prediction process for each predetermined block (using a block as a processing unit). That is, the intra prediction unit 124 generates a prediction image of a current block, which is a process target of the current picture. In this case, the intra prediction unit 124 performs a prediction process (in-screen prediction (also referred to as "intra prediction")) using the reconstructed image supplied from the frame memory 122 through the selection unit 123 as the reference image. That is, the intra prediction unit 124 generates a prediction image using a pixel value in the periphery of the current block included in the reconstructed image. The peripheral pixel value used in the intra prediction is a pixel value of a pixel, which has been processed, of the current picture. In the intra prediction (that is, in a method of generating a prediction image), a plurality of methods (also referred to as "intra prediction modes") are prepared in advance as candidates. The intra prediction unit 124 performs intra prediction in the plurality of intra prediction modes prepared in advance.

The intra prediction unit 124 generates a prediction image in all of the intra prediction modes serving as candidates, evaluates a cost function value of each prediction image using an input image supplied from the screen rearrangement buffer 112, and selects an optimal mode. When an optimal intra prediction mode is selected, the intra prediction unit 124 supplies the prediction image generated in the optimal mode to the prediction image selection unit 126.

In addition, as described above, the intra prediction unit 124 appropriately supplies intra prediction mode information indicating an employed intra prediction mode or the like to the reversible coding unit 116 and codes it.

The inter prediction unit 125 performs a prediction process on the current picture and generates a prediction image. The inter prediction unit 125 performs the prediction process for each predetermined block (using a block as a processing unit). That is, the inter prediction unit 125 generates a prediction image of a current block, which is a process target of the current picture. In this case, the inter prediction unit 125 performs the prediction process using image data of the input image supplied from the screen rearrangement buffer 112 and image data of the decoded image supplied from the frame memory 122 as the reference image. The decoded image is an image (a picture other than the current picture) of frames that are processed before the current picture. That is, the inter prediction unit 125 performs a prediction process (inter-screen prediction (also referred to as "inter prediction")) of generating a prediction image using an image of another picture.

The inter prediction is performed by motion prediction and motion compensation. More specifically, the inter prediction unit 125 uses the input image and the reference image, performs a motion prediction on the current block, and detects a motion vector. Therefore, the inter prediction unit 125 uses the reference image, performs a motion compensation process according to the detected motion vector, and generates a prediction image (inter prediction image information) of the current block. In the inter prediction (that is, in a method of generating a prediction image), a plurality of methods (also referred to as "inter prediction modes) are prepared in advance as candidates. The inter prediction unit 125 performs such inter prediction in the plurality of inter prediction modes prepared in advance.

The inter prediction unit 125 generates a prediction image in all of the inter prediction modes serving as candidates. The inter prediction unit 125 uses the input image supplied from the screen rearrangement buffer 112 and information of a generated difference motion vector, evaluates a cost function value of each prediction image and selects an optimal mode. When an optimal inter prediction mode is selected, the inter prediction unit 125 supplies the prediction image generated in the optimal mode to the prediction image selection unit 126.

When information indicating an employed inter prediction mode or the coded data is decoded, the inter prediction unit 125 supplies information necessary for performing a process in the inter prediction mode or the like to the reversible coding unit 116 and codes it. As necessary information, for example, information of a generated difference motion vector or a flag indicating an index of a predicted motion vector as predicted motion vector information is exemplified.

The prediction image selection unit 126 selects a supply source of the prediction image supplied to the computation unit 113 or the computation unit 120. For example, in intra coding, the prediction image selection unit 126 selects the intra prediction unit 124 as the supply source of the prediction image, and supplies the prediction image supplied from the intra prediction unit 124 to the computation unit 113 or the computation unit 120. In addition, for example, in inter coding, the prediction image selection unit 126 selects the inter prediction unit 125 as the supply source of the prediction image, and supplies the prediction image supplied from the inter prediction unit 125 to the computation unit 113 or the computation unit 120.

The rate control unit 127 controls a rate of the quantization operation of the quantization unit 115 based on the code amount of the coded data accumulated in the accumulation buffer 117 so that no overflow or underflow occurs.

In addition, the frame memory 122 supplies the stored base layer decoded image to the enhancement layer image coding unit 102.

In addition, as illustrated in FIG. 28, the base layer image coding unit 101 further includes a header information generating unit 128.

The header information generating unit 128 generates header information such as the sequence parameter set (SPS) or MCTS SEI. In this case, as described in the first embodiment, the header information generating unit 128 performs a process of setting the decoding load definition information for defining a magnitude of a load of a decoding process of the independently decodable partial region. For example, the header information generating unit 128 may acquire decoding load related information of the base layer from the reversible coding unit 116 and generate the decoding load definition information of the independently decodable partial region of the base layer based on the decoding load related information. In addition, the header information generating unit 128 may acquire, for example, decoding load related information of the enhancement layer from the enhancement layer image coding unit 102, and generate the decoding load definition information of the independently decodable partial region of the enhancement layer based on the decoding load related information.

Further, the header information generating unit 128 may supply the decoding load definition information or the like to the control unit 104, and enable settings for the decoding load definition information to be performed in the video parameter set.

<Enhancement Layer Image Coding Unit>

Figure 29:
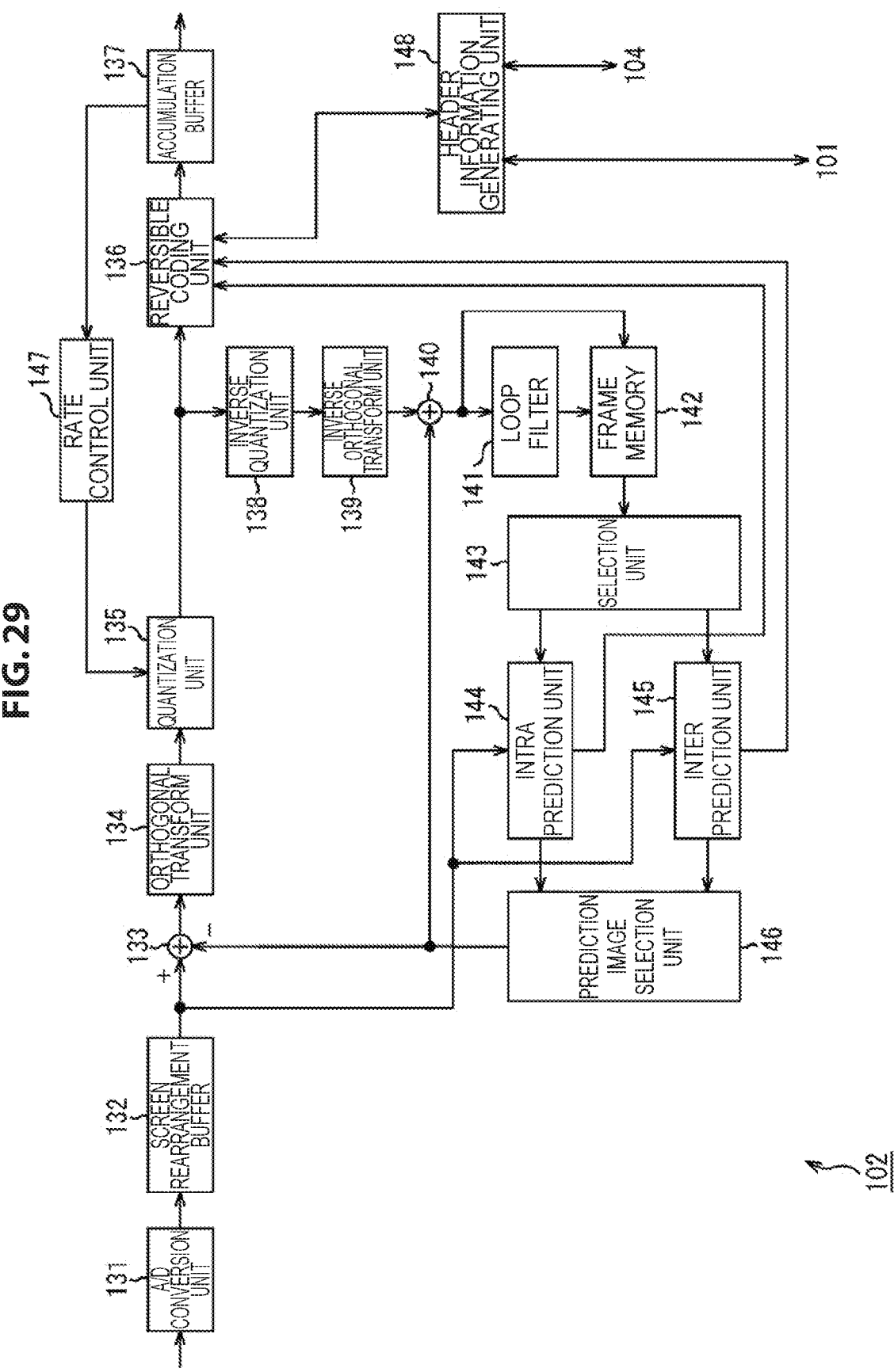
FIG. 29 is a block diagram illustrating a main configuration example of an enhancement layer image coding unit.

FIG. 29 is a block diagram illustrating a main configuration example of the enhancement layer image coding unit 102 of FIG. 27. As illustrated in FIG. 29, the enhancement layer image coding unit 102 basically has the same configuration as the base layer image coding unit 101 of FIG. 28.

That is, as illustrated in FIG. 29, the enhancement layer image coding unit 102 includes an A/D conversion unit 131, a screen rearrangement buffer 132, a computation unit 133, an orthogonal transform unit 134, a quantization unit 135, a reversible coding unit 136, an accumulation buffer 137, an inverse quantization unit 138, and an inverse orthogonal transform unit 139. In addition, the enhancement layer image coding unit 102 includes a computation unit 140, a loop filter 141, a frame memory 142, a selection unit 143, an intra prediction unit 144, an inter prediction unit 145, a prediction image selection unit 146, and orate control unit 147.

The A/D conversion unit 131 to the rate control unit 147 correspond to and perform the same processes as the A/D conversion unit 111 to the rate control unit 127 of FIG. 28. However, respective units of the enhancement layer image coding unit 102 perform a process of coding enhancement layer image information rather than the base layer, Therefore, when processes of the A/D conversion unit 131 to the rate control unit 147 are described, the above descriptions of the A/D conversion unit 111 to the rate control unit 127 of FIG. 28 may be applied. However, in this case, it is necessary that data to be processed be data of the enhancement layer rather than data of the base layer. In addition, it is necessary to appropriately replace a processing unit of an input source or an output destination of data with a corresponding processing unit among the A/D conversion unit 131 to the rate control unit 147 and read it.

The enhancement layer image coding unit 102 further includes a header information generating unit 148.

The header information generating unit 148 corresponds to the header information generating unit 128 of FIG. 28 and performs the same process as the header information generating unit 128. However, the header information generating unit 148 performs a process of the enhancement layer rather than the base layer.

Alternatively, when the decoding load definition information of the enhancement layer is also created in the header information generating unit 128 of the base layer, the header information generating unit 148 of the enhancement layer may be omitted.

<Header Information Generating Unit>

Figure 30:
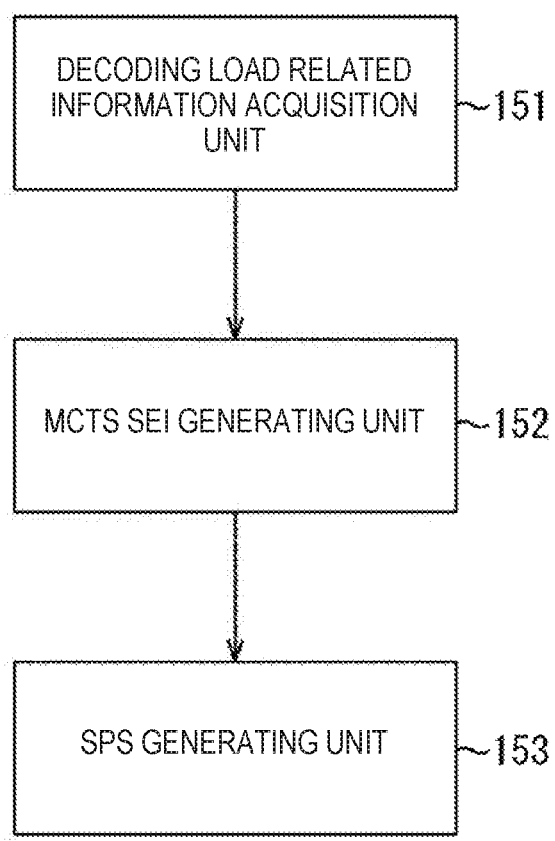
FIG. 30 is a block diagram illustrating a main configuration example of a header information generating unit.

FIG. 30 is a diagram illustrating an exemplary configuration of function blocks of the header information generating unit 128 of FIG. 28. In the header information generating unit 128, for example, when a program read by a CPU from a ROM or the like is executed using a RAM, the above-described process is executed and thus various function blocks illustrated in FIG. 30 are implemented.

As illustrated in FIG. 30, the header information generating unit 128 includes a decoding load related information acquisition unit 151, an MCTS SEI generating unit 152, and an SPS generating unit 153.

The decoding load related information acquisition unit 151 acquires information on a load of the decoding process that is used to generate the decoding load definition information of the independently decodable partial region. As long as it is used to generate the decoding load definition information, any content of information on a load of the decoding process may be used.

As described in the first embodiment, the MCTS SEI generating unit 152 generates MCTS SEI including the decoding load definition information of the independently decodable partial region. That is, the MCTS SEI generating unit 152 sets the decoding load definition information of the independently decodable partial region in MCTS SEI. Content of the decoding load definition information is arbitrary. For example, in the first embodiment, any one or more of various pieces of information described with reference to FIGS. 9 to 26 may be included in the decoding load definition information. Also, when a level is defined in a partial region unit, the MCTS SEI generating unit 152 also defines a parameter of the level for the partial region, as described in the first embodiment. The definition may be assigned (parameter mapping is performed) to definition of the level of the entire image (picture) unit.

As described in the first embodiment, the SPS generating unit 153 generates the sequence parameter set (SPS) including the decoding load definition information of the independently decodable partial region or information indicating whether the decoding load definition information of the independently decodable partial region is set in MCTS SEI (also referred to collectively as "information on definition of a decoding load"). That is, the SPS generating unit 153 sets information on definition of a decoding load of the independently decodable partial region in the sequence parameter set (SPS). Content of the information on definition of a decoding load is arbitrary. For example, in the first embodiment, any one or more of various pieces of information described with reference to FIGS. 9 to 26 may be included in the decoding load definition information.

Also, as described in the first embodiment, the decoding load definition information of the independently decodable partial region is set only in MCTS and this information may not be set in the sequence parameter set (SPS) in this case, the SPS generating unit 153 may be omitted.

<Flow of Image Coding Processes>

Next, a flow of processes executed by the image coding device 100 described above will be described. First, an exemplary flow of image coding processes will be described with reference to a flowchart of FIG. 31.

When the image coding process starts, the control unit 104 of the image coding device 100 performs settings of entire scalable coding in Step S101.

In Step S102, the control unit 104 controls respective units of the base layer image coding unit 101 to the multiplexing unit 103 according to settings performed in Step S101.

In Step S103, the control unit 104 generates a video parameter set (VPS) by applying the settings performed in Step S101.

In Step S104, the base layer image coding unit 101 codes image data of the base layer.

In Step S105, the enhancement layer image coding unit 102 codes image data of the enhancement layer.

In Step S106, the multiplexing unit 103 multiplexes the base layer image coding stream generated in Step S104 and the enhancement layer image coding stream generated in Step S105 (that is, bitstreams of the layers), and generates the layered image coding stream of one system. Also, the multiplexing unit 103 includes the video parameter set (VPS) generated in Step S103 in the layered image coding stream as necessary. The multiplexing unit 103 outputs the layered image coding stream and transmits the stream to the decoding side.

When the process of Step S106 ends, the image coding device 100 ends the image coding process. One picture is processed by such image coding processes. Therefore, the image coding device 100 repeatedly executes such image coding processes for each picture of layered moving image data. However, processes that are not necessarily performed for each picture, for example, the processes of Steps S101 to S103, are appropriately omitted.

<Flow of Base Layer Coding Processes>

Next, in Step S104 of FIG. 31, an exemplary flow of base layer coding processes executed by the base layer image coding unit 101 will be described with reference to a flowchart of FIG. 32.

When the base layer coding process starts, the A/D conversion unit 111 of the base layer image coding unit 101 performs A/D conversion of an image of frames (picture) of the input moving image in Step S121.

In Step S122, the screen rearrangement buffer 112 stores the image on which A/D conversion is performed in Step S121, and performs rearrangement according to an order of coding from a display order of pictures.

In Step S123, the intra prediction unit 124 performs an intra prediction process in an intra prediction mode.

In Step S124, the inter prediction unit 125 performs an inter prediction process in which motion prediction or motion compensation is performed in the inter prediction mode.

In Step S125, the prediction image selection unit 126 selects the prediction image based on a cost function value or the like. That is, the prediction image selection unit 126 selects any of the prediction image generated by intra prediction of Step S123 and the prediction image generated by inter prediction of Step S124.

In Step S126, the computation unit 113 computes a difference between the input image whose frame order is rearranged in the process of Step S122 and the prediction image selected in the process of Step S125, That is, the computation unit 113 generates image data of a difference image between the input image and the prediction image. The image data of the difference image obtained in this manner has a smaller amount of data than original image data. Therefore, compared to when the image is directly coded, it is possible to compress an amount of data.

In Step S127, the orthogonal transform unit 114 performs orthogonal transform of the image data of the difference image generated in the process of Step S126.

In Step S128, the quantization unit 115 uses the quantization parameter calculated by the rate control unit 127 and quantizes the orthogonal transform coefficient obtained in the process of Step S127.

In Step S129, the inverse quantization unit 118 performs inverse quantization of the coefficient (also referred to as a "quantization coefficient") generated and quantized in the process of Step S128 using a characteristic corresponding to a characteristic of the quantization unit 115.

In Step S130, the inverse orthogonal transform unit 119 performs an inverse orthogonal transform of the orthogonal transform coefficient obtained in the process of Step S129.

In Step S131, the computation unit 120 adds the prediction image selected in the process of Step S125 to the difference image restored in the process of Step S130, and thus generates image data of the reconstructed image.

In Step S132, the loop filter 121 performs the loop filter process of the image data of the reconstructed image generated in the process of Step S131, Therefore, block distortion of the reconstructed image or the like is removed.

In Step S133, the frame memory 122 stores data such as the decoded image (the base layer decoded image) obtained in the process of Step S132 or the reconstructed image obtained in the process of Step S131.

In Step S134, the reversible coding unit 116 codes the coefficient obtained and quantized in the process of Step S128. That is, reversible coding such as variable-length coding or arithmetic coding is performed on data corresponding to the difference image.

In addition, in this case, the reversible coding unit 116 codes information on a prediction mode of the prediction image selected in the process of Step S125, and adds the difference image to the coded data obtained by coding. That is, the reversible coding unit 116 also codes optimal intra prediction mode information supplied from the intra prediction unit 124 or information corresponding to the optimal inter prediction mode supplied from the inter prediction unit 125 and adds the result to the coded data.

In Step S135, the header information generating unit 128 generates header information of various null units or the like. The generated header information is supplied to the reversible coding unit 116 and added to the coded data.

In Step S136, the accumulation buffer 117 accumulates the coded data (the base layer image coding stream)

obtained in the processes of Step S134 and Step S135, The base layer image coding stream accumulated in the accumulation buffer 117 is appropriately read, supplied to the multiplexing unit 103, multiplexed with the enhancement layer image coding stream, and then is transmitted to the decoding side through a transmission path or a recording medium.

In Step S137, the rate control unit 127 controls a rate of the quantization operation of the quantization unit 115 based on the code amount (an amount of generated codes) of the coded data accumulated in the accumulation buffer 117 in the process of Step S136 so that no overflow or underflow occurs. In addition, the rate control unit 127 supplies information on the quantization parameter to the quantization unit 115.

Figure 31:
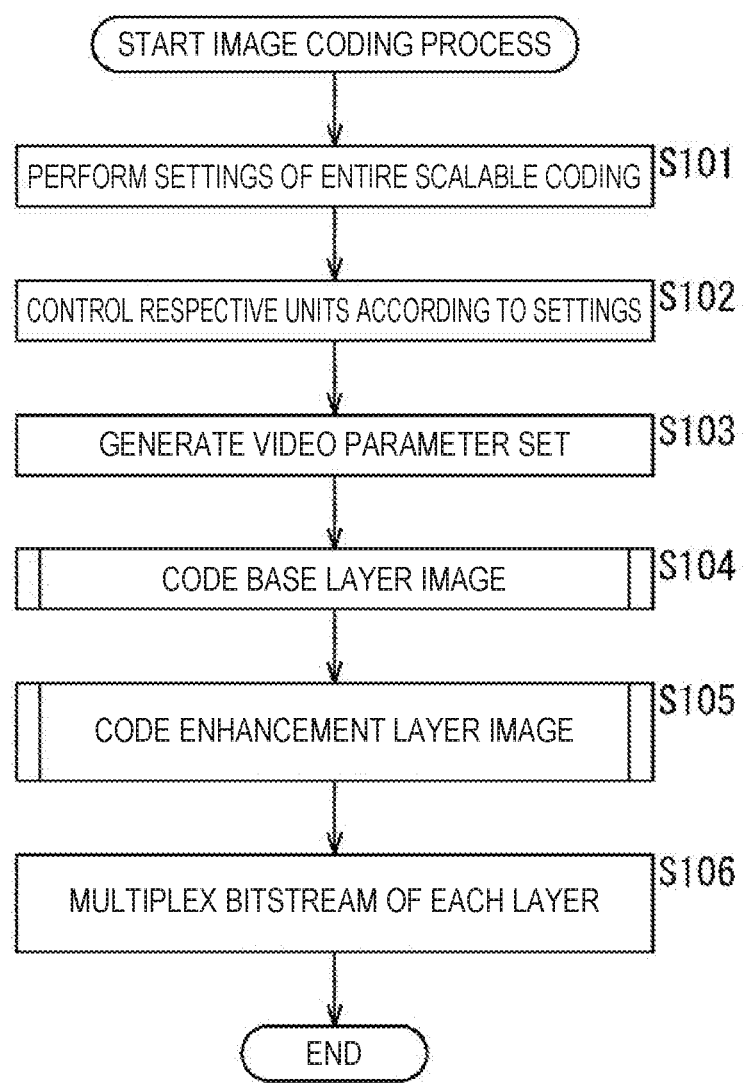
FIG. 31 is a flowchart describing an exemplary flow of image coding processes.

When the process of Step S137 ends, the base layer coding process ends, and the process returns to FIG. 31.

<Flow of Enhancement Layer Coding Processes>

Figure 33:
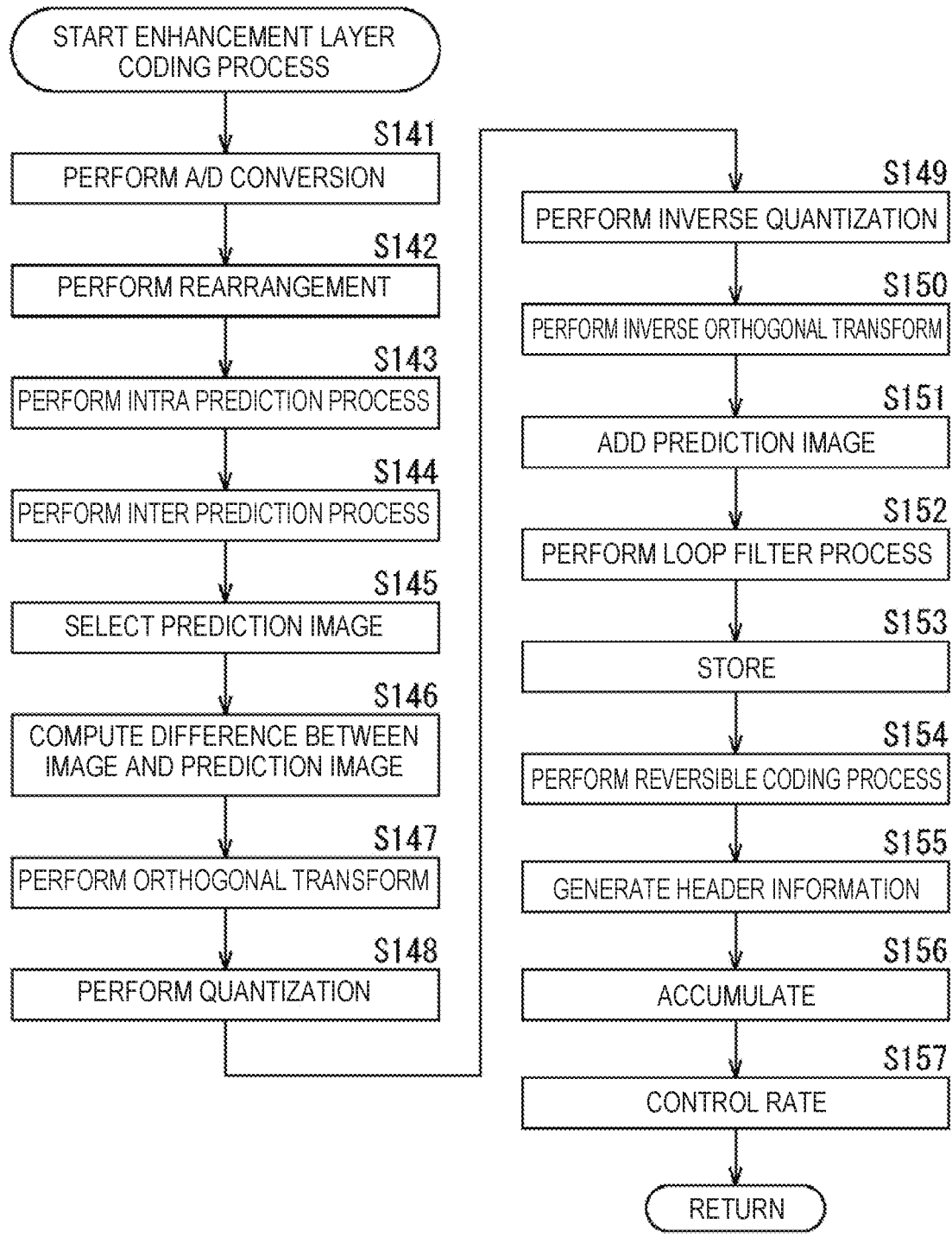
FIG. 33 is a flowchart describing an exemplary flow of enhancement layer coding processes.

Next, in Step S105 of FIG. 31, an exemplary flow of enhancement layer coding processes executed by the enhancement layer image coding unit 102 will be described with reference to a flowchart of FIG. 33.

Respective processes (Steps S141 to S157) of the enhancement layer coding processes correspond to respective processes (Steps S121 to S137) of the base layer coding processes, and are executed basically in the same manner as these processes. While the processes of the base layer coding processes are performed on the base layer, respective processes (Steps S141 to S157) of the enhancement layer coding processes are performed on the enhancement layer.

In addition, when the decoding load definition information of the independently decodable partial region is set only in the base layer, settings of the decoding load definition information may be omitted in Step S155.

When the process of Step S157 ends, the enhancement layer coding process ends, and the process returns to FIG. 31.

<Flow of Header Generation Processes>

Figure 34:
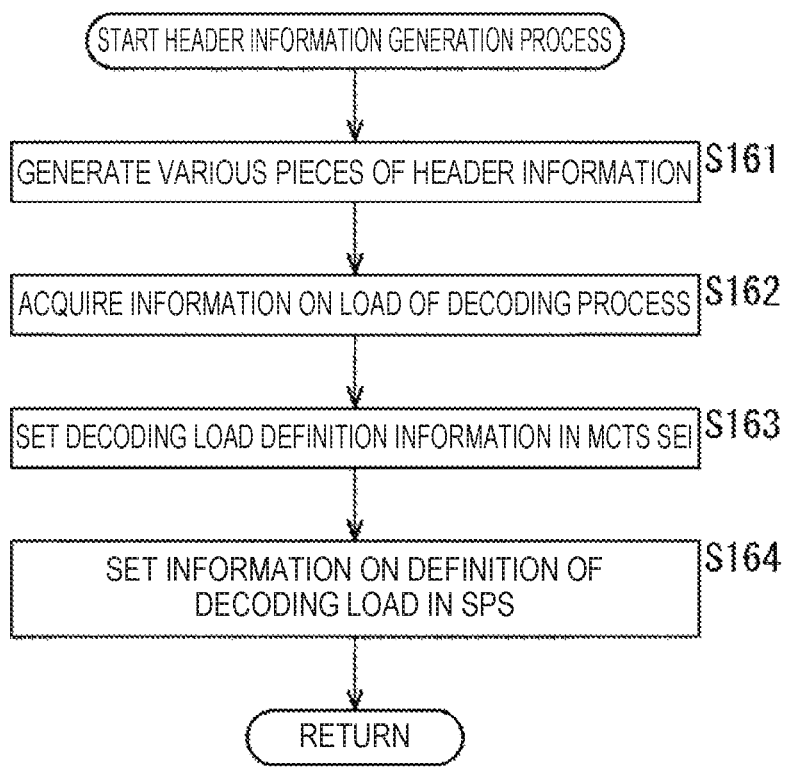
FIG. 34 is a flowchart describing an exemplary flow of header information generating processes.

Next, an exemplary flow of header generation processes executed in Step S135 of FIG. 32 will be described with reference to a flowchart of FIG. 34.

When the header generation process starts, the header information generating unit 128 generates various pieces of header information, for example, a sequence parameter set (SPS). SET, a picture parameter set (PPS), and a slice header (SliceHeader) in Step S161.

In Step S162, the decoding load related information acquisition unit 151 acquires decoding load related information, which is information on a load of a decoding process of the partial region, necessary for generating the decoding load definition information of the independently decodable partial region. Additionally, when the decoding load definition information of the enhancement layer is set, decoding load related information is also acquired from the enhancement layer. As long as it is used to generate the decoding load definition information, any content of the decoding load related information may be used.

In Step S163, the MCTS SEI generating unit 152 sets the decoding load definition information of the partial region in MCTS SEI of the independently decodable partial region generated in Step S161. For example, the MCTS SEI generating unit 152 sets the decoding load definition information, as described with reference to syntaxes of FIGS. 9 to 26 in the first embodiment.

For example, as illustrated in FIG. 10, when the independently decodable partial region includes a plurality of sets (a plurality of tiles), the MCTS SEI generating unit 152 uses decoding load related information of each tile, and sets decoding load related information for each set. In addition, the MCTS SEI generating unit 152 may use decoding load related information of each tile and set the decoding load definition information of the entire partial region.

Also, when there are a plurality of independently decodable partial regions, the MCTS SEI generating unit 152 may set the decoding load definition information for each partial region. Content of the decoding load definition information is arbitrary. For example, in the first embodiment, any one or more of various pieces of information described with reference to FIGS. 9 to 26 may be included in the decoding load definition information.

In Step S164, the SPS setting unit 153 sets the decoding load definition information of the independently decodable partial region, or information (also referred to as "information on definition of a decoding load") indicating whether the decoding load definition information of the partial region is set in MCTS SET in the sequence parameter set (SPS) generated in Step S161. Content of the information on definition of a decoding load is arbitrary. For example, in the first embodiment, any one or more of various pieces of information described with reference to FIGS. 9 to 26 may be included in the decoding load definition information.

Figure 32:
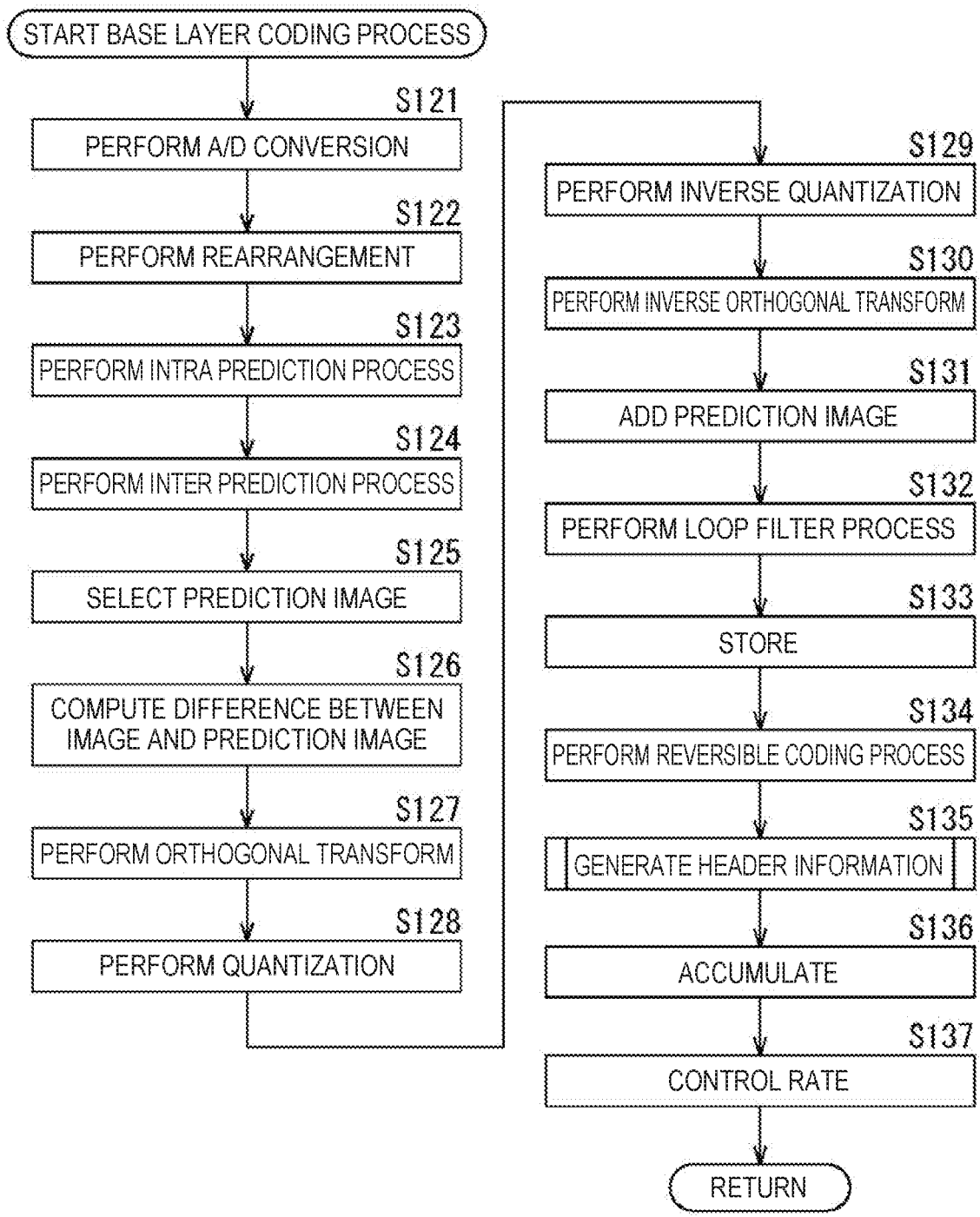
FIG. 32 is a flowchart describing an exemplary flow of base layer coding processes.

When the process of Step S164 ends, the header information generating process ends and the process returns to FIG. 32.

Also, as described in the first embodiment, the decoding load definition information of the independently decodable partial region is set only in MCTS SEI, and this information may not be set in the sequence parameter set (SPS). In this case, the process of Step S164 may be omitted.

In addition, in Step S163, when a level is defined in a partial region unit, the MCTS SEI generating unit 152 also defines a parameter of the level for the partial region, as described in the first embodiment. The definition may be assigned to definition of the level of the entire image (picture) unit (parameter mapping is performed).

The header information set as described above is supplied to the reversible coding unit 116 and included in the coded data.

When the respective processes are executed in this manner, the image coding device 100 can recognize performance necessary for decoding more accurately.

Also, when the decoding load definition information of the independently decodable partial region is set in the enhancement layer, the header information generating unit 148 may be executed as described with reference to the flowchart of FIG. 34. On the other hand, when no decoding load definition information is set, only the process of Step S161 of FIG. 34 may be executed.

3. Third Embodiment

<Image Decoding Device>

Figure 35:
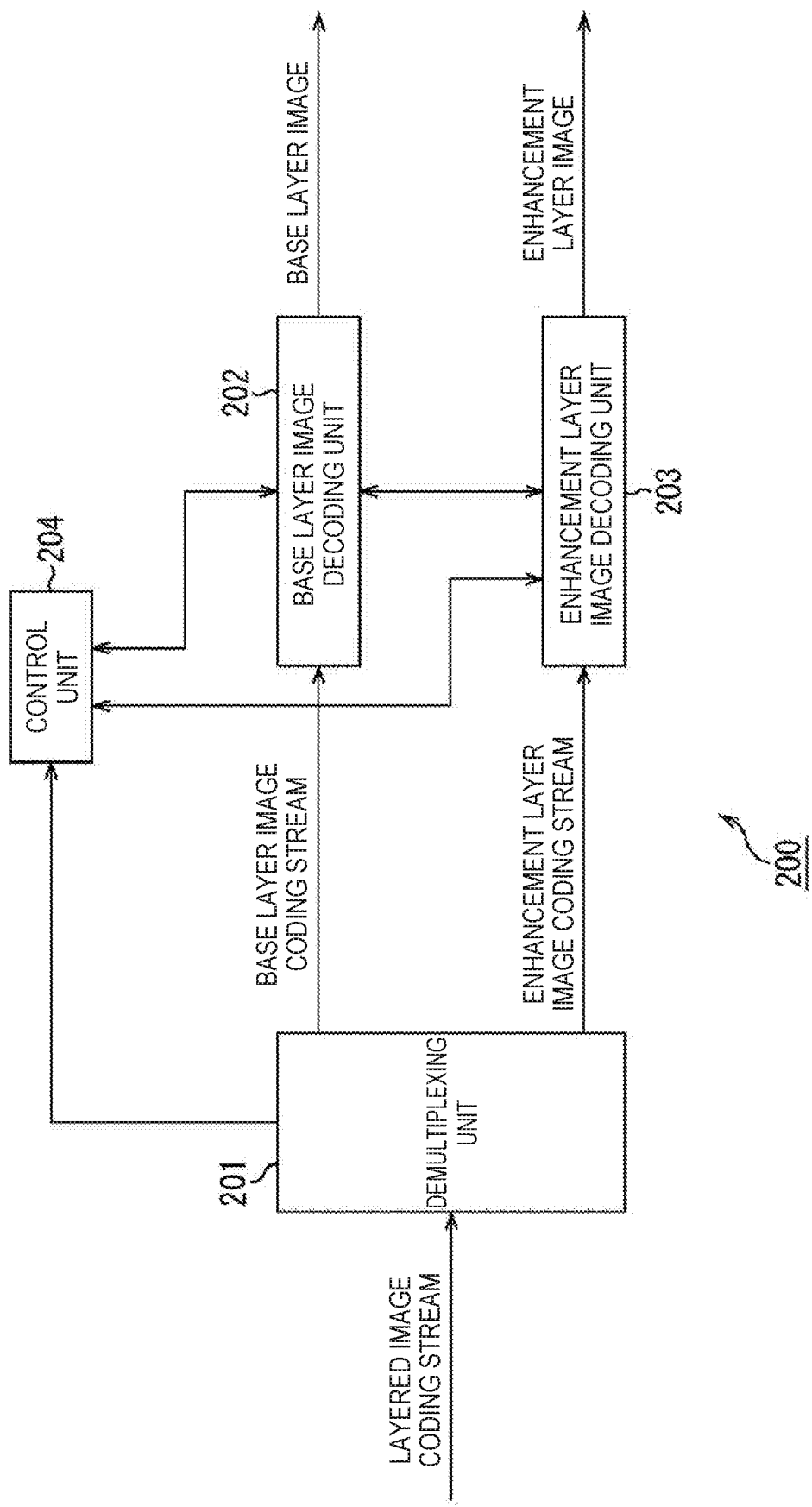
FIG. 35 is a block diagram illustrating a main configuration example of an image decoding device.

Next, decoding of the coded data coded as described above will be described. FIG. 35 is a block diagram illustrating a main configuration example of an image decoding device corresponding to the image coding device 100, which is an aspect of an image processing device to which the present technology is applied. An image decoding device 200 illustrated in FIG. 35 decodes coded data generated by the image coding device 100 using a decoding method corresponding to the coding method (that is, hierarchically decodes coded data that is hierarchically coded). As illustrated in FIG. 35, the image decoding device 200 includes a demultiplexing unit 201, a base layer image decoding unit 202, an enhancement layer image decoding unit 203, and a control unit 204.

The demultiplexing unit 201 receives the layered image coding stream in which the base layer image coding stream and the enhancement layer image coding stream transmitted from the coding side are multiplexed, demultiplexes the received stream, and extracts the base layer image coding stream and the enhancement layer image coding stream. The base layer image decoding unit 202 decodes the base layer image coding stream extracted by the demultiplexing unit 201 and obtains the base layer image. The enhancement layer image decoding unit 203 decodes the enhancement layer image coding stream extracted by the demultiplexing unit 201 and obtains the enhancement layer image.

The control unit 204 analyzes the video parameter set (VPS) supplied from the demultiplexing unit 201, and controls the base layer image decoding unit 202 and the enhancement layer image decoding unit 203 based on the information (controls coding of each of the layers).

In addition, the control unit 204 acquires the analysis result of the decoding load definition information of the header information from the base layer image decoding unit 202 and the enhancement layer image decoding unit 203, and controls operations of respective processing units of the image decoding device 200 according to the analysis result.
<Base Layer Image Decoding Unit>

Figure 36:
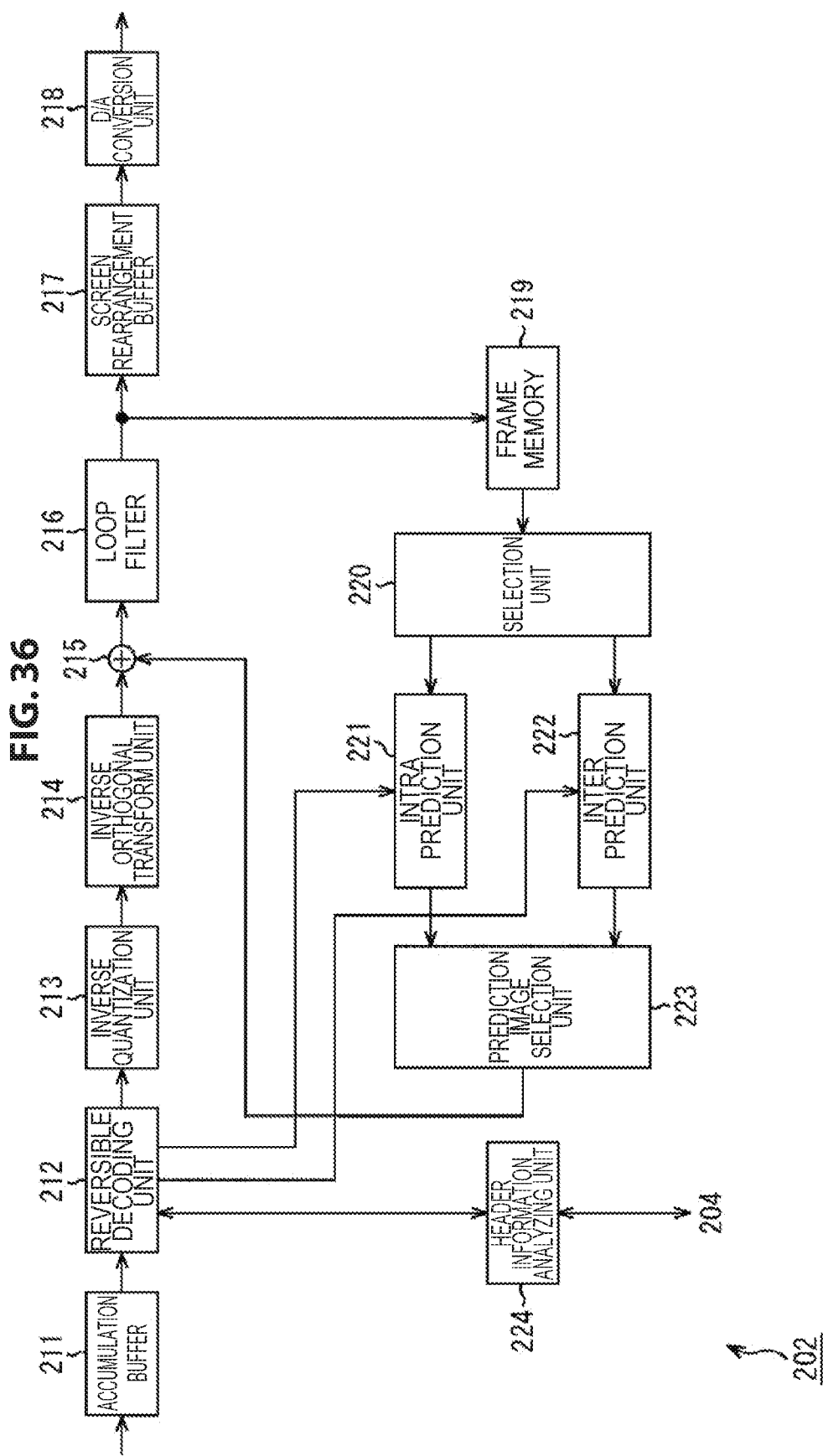
FIG. 36 is a block diagram illustrating a main configuration example of a base layer image decoding unit.

FIG. 36 is a block diagram illustrating a main configuration example of the base layer image decoding unit 202 of FIG. 35. As illustrated in FIG. 36, the base layer image decoding unit 202 includes an accumulation buffer 211, a reversible decoding unit 212, an inverse quantization unit 213, an inverse orthogonal transform unit 214, a computation unit 215, a loop filter 216, a screen rearrangement buffer 217, and a D/A conversion unit 8. In addition, the base layer image decoding unit 202 includes a frame memory 219, a selection unit 220, an intra prediction unit 221, an inter prediction unit 222, and a prediction image selection unit 223.

The accumulation buffer 211 also serves as a reception unit configured to receive the transmitted coded data (the base layer image coding stream supplied from the demultiplexing unit 201). The accumulation buffer 211 receives and accumulates the transmitted coded data, and supplies the coded data to the reversible decoding unit 212 at a predetermined timing. Information necessary for decoding such as prediction mode information is added to the coded data.

The reversible decoding unit 212 decodes the information that is supplied by the accumulation buffer 211 and coded by the reversible coding unit 116 using a decoding scheme corresponding to the coding scheme. The reversible decoding unit 212 supplies the quantized coefficient data of the difference image obtained by decoding to the inverse quantization unit 213.

In addition, the reversible decoding unit 212 determines whether the intra prediction mode or the inter prediction mode is selected as an optimal prediction mode, and supplies information on the optimal prediction mode in a mode that is determined to have been selected between the intra prediction unit 221 and the inter prediction unit 222. That is, for example, when the intra prediction mode is selected as the optimal prediction mode on the coding side, the information on the optimal prediction mode (intra prediction mode information) is supplied to the intra prediction unit 221. In addition, for example, when the inter prediction mode is selected as the optimal prediction mode on the coding side, the information on the optimal prediction mode (inter prediction mode information) is supplied to the inter prediction unit 222.

Further, the reversible decoding unit 212 extracts information necessary for inverse quantization, for example, a quantization matrix or a quantization parameter, from the coded data, and supplies the information to the inverse quantization unit 213.

The inverse quantization unit 213 performs inverse quantization of the quantized coefficient data obtained by decoding of the reversible decoding unit 212 using a scheme corresponding to a quantization scheme of the quantization unit 115. Also, the inverse quantization unit 213 is the same processing unit as the inverse quantization unit 118. The inverse quantization unit 213 supplies the obtained coefficient data (the orthogonal transform coefficient) to the inverse orthogonal transform unit 214.

The inverse orthogonal transform unit 214 performs an inverse orthogonal transform of the orthogonal transform coefficient supplied from the inverse quantization unit 213 using a scheme corresponding to an orthogonal transform scheme of the orthogonal transform unit 114 as necessary. Also, the inverse orthogonal transform unit 214 is the same processing unit as the inverse orthogonal transform unit 119.

According to the inverse orthogonal transform process, the image data of the difference image is restored. The restored image data of the difference image corresponds to the image data of the difference image before an orthogonal transform is performed on the coding side. In the following, the restored image data of the difference image obtained by the inverse orthogonal transform process of the inverse orthogonal transform unit 214 is also referred to as "decoded residual data." The inverse orthogonal transform unit 214 supplies the decoded residual data to the computation unit 215. In addition, the image data of the prediction image is supplied from the intra prediction unit 221 or the inter prediction unit 222 to the computation unit 215 through the prediction image selection unit 223.

The computation unit 215 uses the decoded residual data and the image data of the prediction image, and obtains the image data of the reconstructed image in which the difference image and the prediction image are added. The reconstructed image corresponds to the input image before the prediction image is subtracted by the computation unit 113. The computation unit 215 supplies the reconstructed image to the loop filter 216.

The loop filter 216 appropriately performs the loop filter process including the deblocking filter process or an adaptive loop filter process on the supplied reconstructed image, and generates the decoded image. For example, the loop filter 216 performs the deblocking filter process on the reconstructed image and thus removes block distortion. In addition, for example, the loop filter 216 performs the loop filter process on the deblocking filter process result (the reconstructed image whose block distortion is removed) a Wiener filter to improve image quality.

Also, a type of the filter process performed by the loop filter 216 is arbitrary, and a filter process other than the above-described process may be performed. In addition, the loop filter 216 may perform the filter process using the filter coefficient supplied from the image coding device. Further, the loop filter 216 may omit such a filter process and output input data without the filter process.

The loop filter 216 supplies the decoded image (or the reconstructed image), which is the filter process result, to the screen rearrangement buffer 217 and the frame memory 219.

The screen rearrangement buffer 217 rearranges an order of frames of the decoded image. That is, the screen rearrangement buffer 217 rearranges the image of frames rearranged in a coding order by the screen rearrangement buffer 112 according to an original display order. That is, the screen rearrangement buffer 217 stores the image data of the decoded image of frames supplied in the coding order in this order, reads the image data of the decoded image of frames stored in the coding order, and supplies the result to the D/A conversion unit 218 in the display order. The D/A conversion unit 218 performs D/A conversion of the decoded image (digital data) of frames supplied from the screen rearrangement buffer 217, and outputs and displays the result on a display (not illustrated) as analog data.

The frame memory 219 stores the supplied decoded image, and supplies the stored decoded image to the intra prediction unit 221 or the inter prediction unit 222 through the selection unit 220 as the reference image at a predetermined timing or based on a request from the outside such as the intra prediction unit 221 or the inter prediction unit 222.

The intra prediction mode information or the like is appropriately supplied to the intra prediction unit 221 from the reversible decoding unit 212. The intra prediction unit 221 performs intra prediction in the intra prediction mode (optimal intra prediction mode) used in the intra prediction unit 124, and generates the prediction image. In this case, the intra prediction unit 221 performs intra prediction using the image data of the reconstructed image supplied from the frame memory 219 through the selection unit 220. That is, the intra prediction unit uses the reconstructed image as the reference image (peripheral pixel). The intra prediction unit 221 supplies the generated prediction image to the prediction image selection unit 223.

Optimal prediction mode information, motion information or the like is appropriately supplied to the inter prediction unit 222 from the reversible decoding unit 212. The inter prediction unit 222 performs inter prediction using the decoded image (the reference image) acquired from the frame memory 219 in the inter prediction mode (optimal inter prediction mode) indicated by the optimal prediction mode information acquired from the reversible decoding unit 212, and generates the prediction image.

The prediction image selection unit 223 supplies the prediction image supplied from the intra prediction unit 221 or the prediction image supplied from the inter prediction unit 222 to the computation unit 215. Therefore, in the computation unit 215, the prediction image and the decoded residual data (difference image information) from the inverse orthogonal transform unit 214 are added to obtain the reconstructed image.

In addition, the frame memory 219 supplies the stored base layer decoded image to the enhancement layer image decoding unit 203.

The base layer image decoding unit 202 further includes a header information analyzing unit 224. The header information analyzing unit 224 acquires header information extracted from the coding stream by the reversible decoding unit 212, and analyzes the information. For example, the header information analyzing unit 224 analyzes the decoding load definition information included in the header information. The header information analyzing unit 224 supplies information indicating the analysis result to the control unit 204.

<Enhancement Layer Image Decoding Unit>

Figure 37:
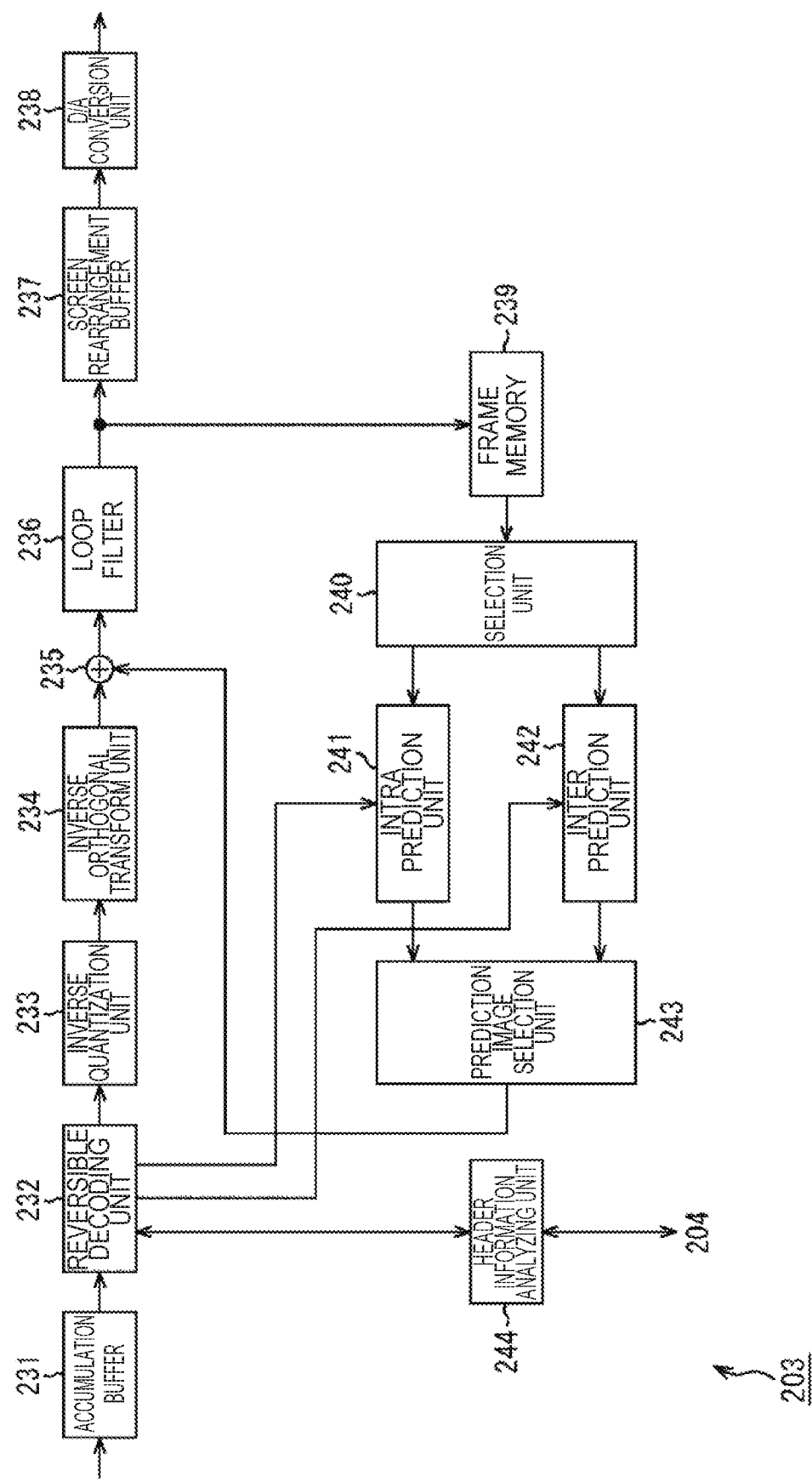
FIG. 37 is a block diagram illustrating a main configuration example of an enhancement layer image decoding unit.

FIG. 37 is a block diagram illustrating a main configuration example of the enhancement layer image decoding unit 203 of FIG. 35. As illustrated in FIG. 37, the enhancement layer image decoding unit 203 includes basically the same configuration as the base layer image decoding unit 202 of FIG. 36.

That is, as illustrated in FIG. 37, the enhancement layer image decoding unit 203 includes an accumulation buffer 231, a reversible decoding unit 232, an inverse quantization unit 233, an inverse orthogonal transform unit 234, a computation unit 235, a loop filter 236, a screen rearrangement buffer 237, and a D/A conversion unit 238. In addition, the enhancement layer image decoding unit 203 includes a frame memory 239, a selection unit 240 an intra prediction unit 241, an inter prediction unit 242, and a prediction image selection unit 243.

The accumulation buffer 231 to the prediction image selection unit 243 correspond to and perform the same processes as the accumulation buffer 211 to the prediction image selection unit 223 of FIG. 36. However, respective units of the enhancement layer image decoding unit 203 perform a process of coding enhancement layer image information rather than the base layer. Therefore, when processes of the accumulation buffer 231 to the prediction image selection unit 243 are described, the above descriptions of the accumulation buffer 211 to the prediction image selection unit 223 of FIG. 36 may be applied. However, in this case, it is necessary that data to be processed be data of the enhancement layer rather than data of the base layer. In addition, it is necessary to appropriately replace a processing unit of an input source or an output source of data with a corresponding processing unit of the enhancement layer image decoding unit 203 and read it.

Also, the frame memory 239 acquires the base layer decoded image supplied from the base layer image decoding unit 202 and stores the image as, for example, a long term reference frame. The base layer decoded image is used as the reference image of, for example, inter layer prediction, in the prediction process by the intra prediction unit 241 or the inter prediction unit 242.

The enhancement layer image decoding unit 203 further includes a header information analyzing unit 244.

The reversible decoding unit 232 acquires header information such as the sequence parameter set (SPS) or MCTS SEI from the enhancement layer image coding stream. There is a possibility of the decoding load definition information of the independently decodable partial region being included in the header information. The reversible decoding unit 232 supplies the header information to the header information analyzing unit 244.

The header information analyzing unit 244 analyzes the decoding load definition information of the independently decodable partial region included in the supplied header information, and supplies the analysis result to the control unit 204.

Also, when the decoding load definition information is set only in the base layer, the header information analyzing unit 244 of the enhancement layer may be omitted.

<Header Information Analyzing Unit>

Figure 38:
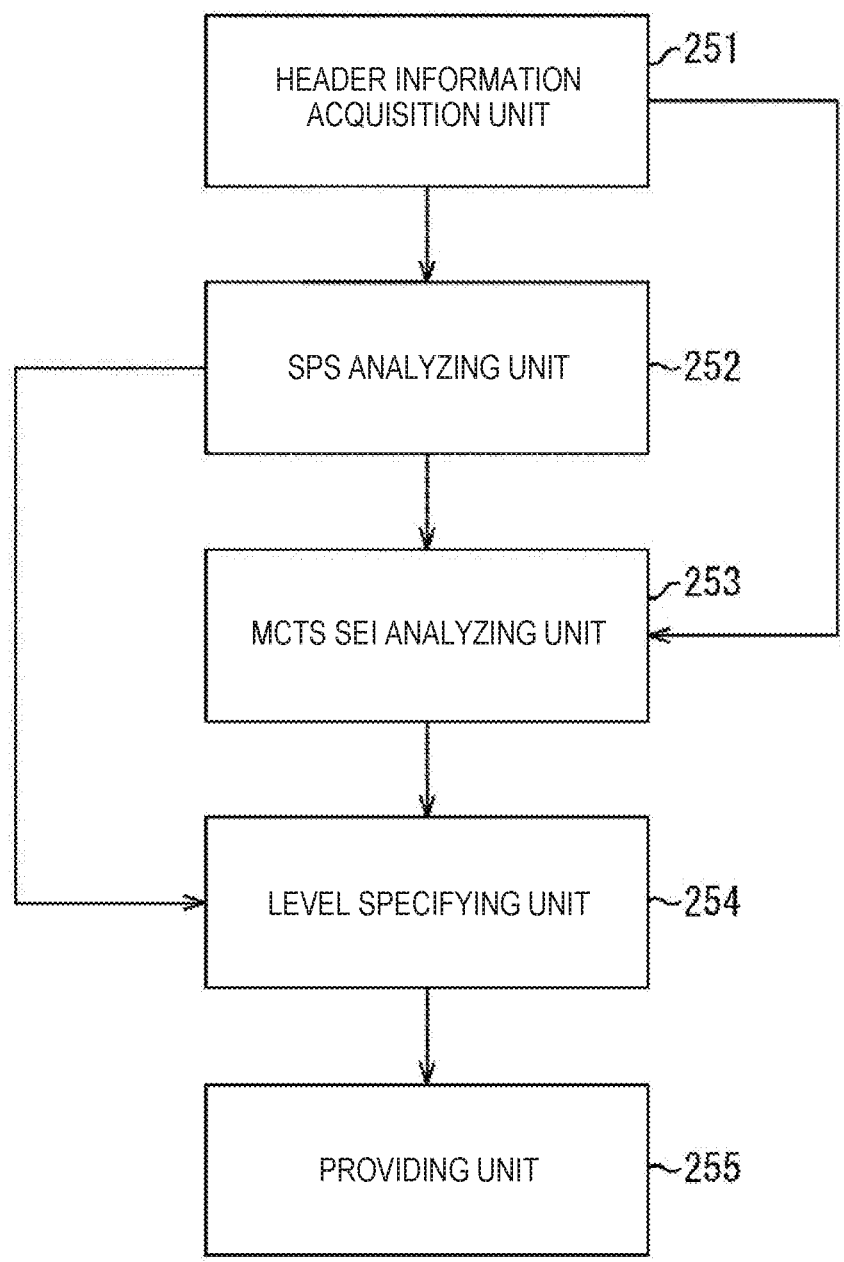
FIG. 38 is a block diagram illustrating an exemplary configuration of a header information analyzing unit.

FIG. 38 is a diagram illustrating an exemplary configuration of function blocks of the header information analyzing unit 224 of FIG. 36. In the header information analyzing unit 224, for example, when a program read by a CPU from a ROM or the like is executed using a RAM, the above-described process is executed and thus various function blocks illustrated in FIG. 38 are implemented.

As illustrated in FIG. 38, the header information analyzing unit 224 includes a header information acquisition unit 251, an SPS analyzing unit 252, an MCTS SEI analyzing unit 253, a level specifying unit 254, and a providing unit 255.

The header information acquisition unit 251 acquires various pieces of header information supplied from the reversible decoding unit 212. The SPS analyzing unit 252 analyzes the sequence parameter set (SPS) acquired as header information by the header information acquisition unit 251. As described in the first embodiment, the information on definition of a decoding load of the independently decodable partial region is included in the sequence parameter set (SPS). Content of the information on definition of a decoding load is arbitrary. For example, in the first embodiment, any one or more of various pieces of information described with reference to FIGS. 9 to 26 may be included in the decoding load definition information.

The MCTS SEI analyzing unit 253 analyzes MCTS SEI acquired as header information by the header information acquisition unit 251. As described in the first embodiment, the MCTS SEI includes the decoding load definition information of the independently decodable partial region. Content of the decoding load definition information is arbitrary. For example, in the first embodiment, any one or more of various pieces of information described with reference to FIGS. 9 to 26 may be included in the decoding load definition information.

The level specifying unit 254 specifies a level necessary for decoding the independently decodable partial region based on the analysis result of the SPS analyzing unit 252 and MCTS SEI. The providing unit 255 provides the level specified by the level specifying unit 254 or information on a load of the decoding process corresponding to the level to the control unit 104.

Also, as described in the first embodiment, when a parameter defined in a predetermined region including the partial region is mapped with definition of the level of the entire image (picture) unit, the level specifying unit 254 or the providing unit 255 may employ the mapping parameter when the level is specified or the level is interpreted.

Also, as described in the first embodiment, the decoding load definition information of the independently decodable partial region is set only in MCTS SEI, and this information may not be set in the sequence parameter set (SPS). In this case, the SPS analyzing unit 252 may be omitted.

<Flow of Image Decoding Processes>

Next, a flow of processes executed by the image decoding device 200 described above will be described. First, an exemplary flow of image decoding processes will be described with reference to a flowchart of FIG. 39.

When the image decoding process starts, in Step S201, the demultiplexing unit 201 of the image decoding device 200 demultiplexes the layered image coding stream transmitted from the coding side for each layer.

In Step S202, the reversible decoding unit 212 extracts the header information including the decoding load definition information from the base layer image coding stream extracted in the process of Step S201.

Alternatively, for example, when the decoding load definition information is also included in the enhancement layer, the reversible decoding unit 232 similarly performs the process, and extracts the header information of the enhancement layer.

In Step S203, the header information analyzing unit 224 analyzes the header information extracted in Step S202, and specifies the level necessary for decoding from the decoding load definition information.

In Step S204, the control unit 204 determines whether the coding stream is decodable based on the analysis result of Step S203. When it is determined that the coding stream is decodable, the process advances to Step S205.

In Step S205, the base layer image decoding unit 202 decodes the base layer image coding stream. In Step S206, the enhancement layer image decoding unit 203 decodes the enhancement layer image coding stream.

When the process of Step S206 ends, the image decoding process ends.

On the other hand, in Step S204, when it is determined that the coding stream is not decodable, the process advances to Step S207. In this case, in Step S207, the control unit 204 performs an error process, which is a predetermined process when normal decoding cannot be performed.

The error process may be any process. For example, decoding may be forcibly terminated (including being suspended or paused), or a warning such as an image or audio may be provided to the user. In addition, for example, another coding stream having a lower level may be acquired and decoding may be restarted. Further, for example, occurrence of disorder in the decoded image may be allowed and the coding stream may be forcibly decoded.

When the process of Step S207 ends, the image decoding process ends.

<Flow of Header Information Analyzing Processes>

Next, an exemplary flow of header information analyzing processes executed in Step S203 of FIG. 39 will be described with reference to a flowchart of FIG. 40.

When the header information analyzing process starts, the SPS analyzing unit 252 determines whether the sequence parameter set (SPS) is referred to in Step S211. When the information on definition of a decoding load of the independently decodable partial region is included in the sequence parameter set (SPS) acquired as the header information and it is determined that the sequence parameter set (SPS) is referred to, the process advances to Step S212.

In Step S212, the SPS analyzing unit 252 analyzes the information on definition of a decoding load of the independently decodable partial region included in the sequence parameter set (SPS). Content of the information on definition of a decoding load is arbitrary. For example, in the first embodiment, any one or more of various pieces of information described with reference to FIGS. 9 to 26 may be included in the decoding load definition information. When the analysis ends, the process advances to Step S213. On the other hand, in Step S211, when the information on definition of a decoding load of the independently decodable partial region is not included in the sequence parameter set (SPS) and it is determined that the sequence parameter set (SPS) is not referred to, the process advances to Step S213.

In Step S213, the MCTS SEI analyzing unit 253 determines whether MCTS SEI is referred to. When the decoding load definition information of the independently decodable partial region is set in MCTS SET acquired as the header information and it is determined that MCTS SEI is referred to, the process advances to Step S214.

In Step S214, the MCTS SEI analyzing unit 253 analyzes the decoding load definition information of the independently decodable partial region included in MCTS SEI. Content of the decoding load definition information is arbitrary. For example, in the first embodiment, any one or more of various pieces of information described with reference to FIGS. 9 to 26 may be included in the decoding load definition information. When the analysis ends, the process advances to Step S215, On the other hand, in Step S213, when the decoding load definition information of the independently decodable partial region is not set in MCTS SEI and it is determined that MCTS SEI is not referred to, the process advances to Step S215.

In Step S215, the level specifying unit 254 specifies a level necessary for decoding based on the analysis result of Steps S212 and S214.

In Step S216, the providing unit 255 provides information indicating the level necessary for decoding specified in Step S215 to the control unit 104.

Figure 39:
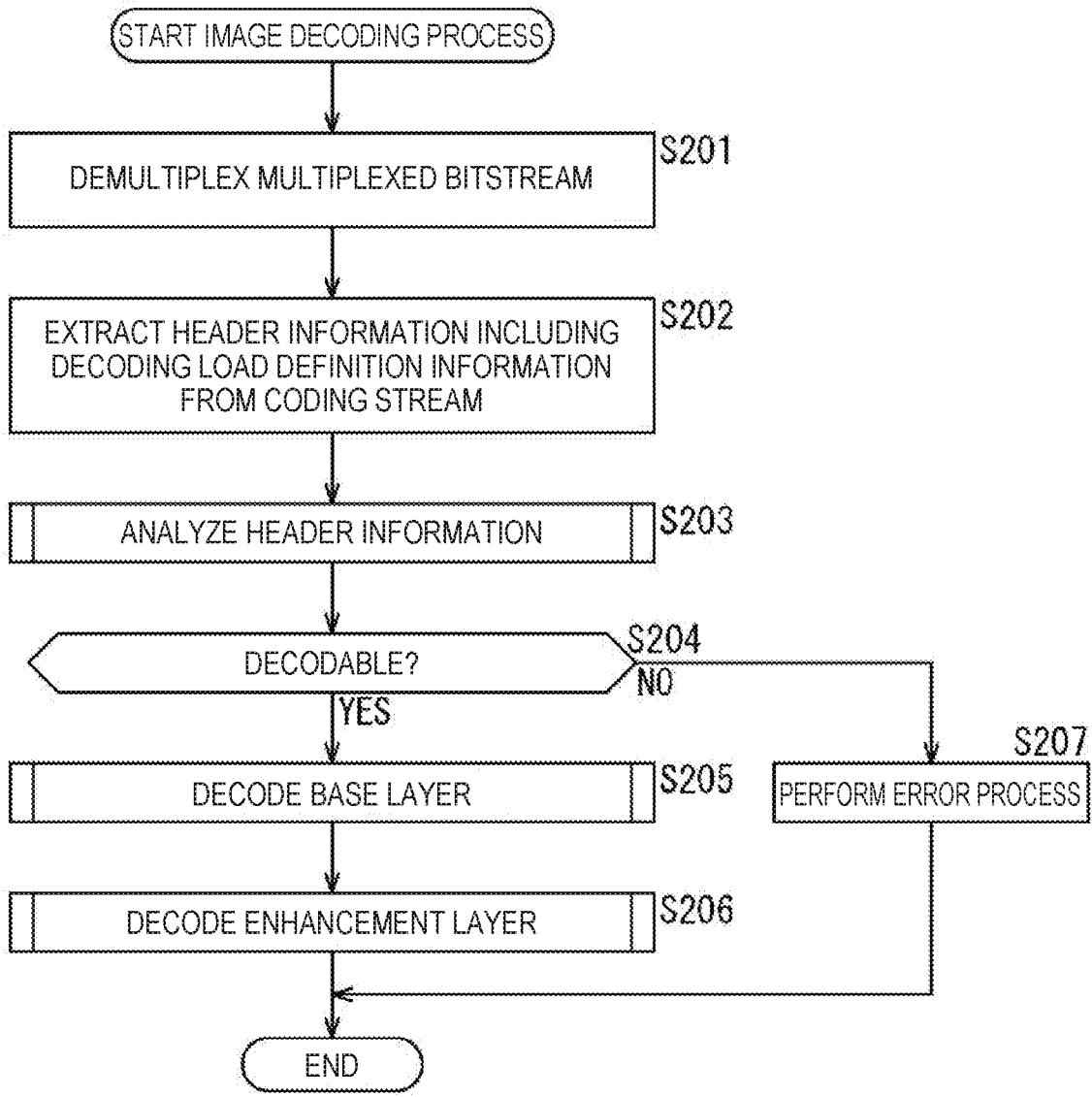
FIG. 39 is a flowchart describing an exemplary flow of image decoding processes.
Figure 40:
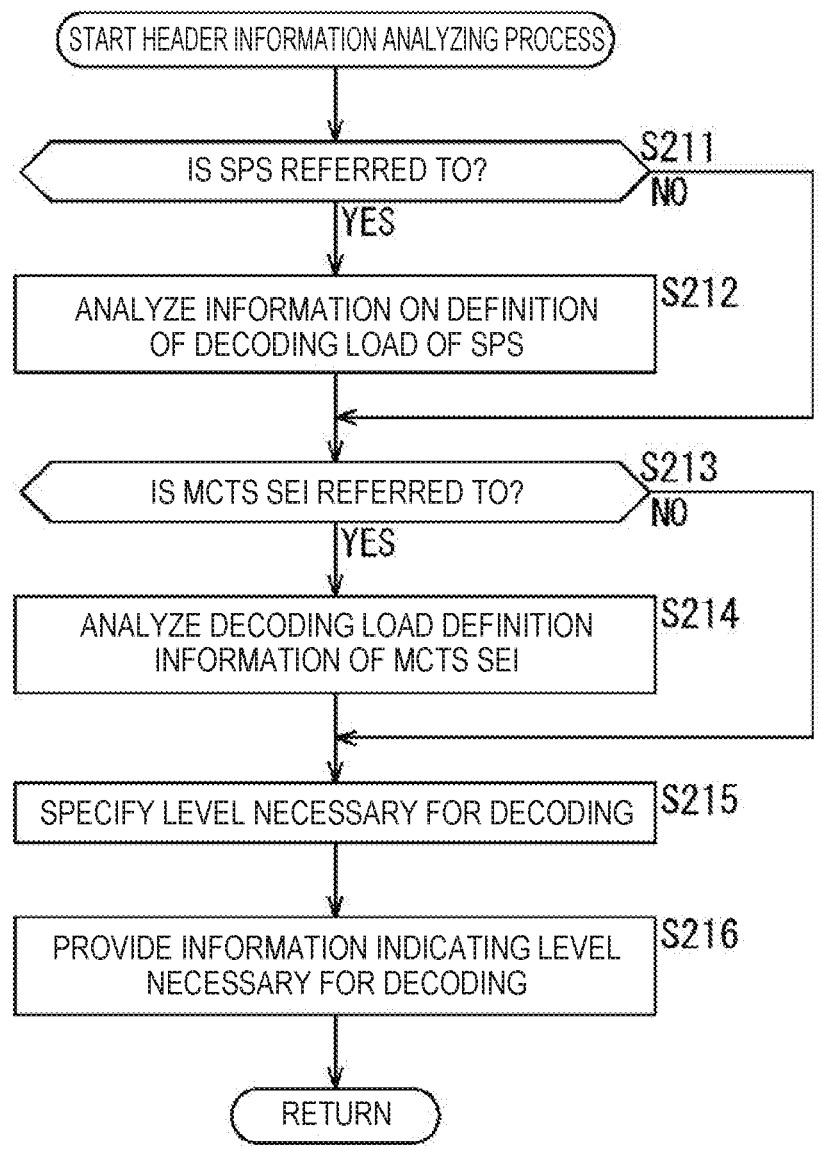
FIG. 40 is a flowchart describing an exemplary flow of header information analyzing processes.

When the process of Step S216 ends, the header information analyzing process ends and the process returns to FIG. 39.

Also, as described in the first embodiment, when a parameter defined in a predetermined region including the partial region is mapped with definition of the level of the entire image (picture) unit, the level specifying unit 254 or the providing unit 255 may employ the mapping parameter in the process of Step S215 or Step S216.

Also, as described in the first embodiment, the decoding load definition information of the independently decodable partial region is set only in MCI'S SEI, and this information may not be set in the sequence parameter set (SPS). In this case, the process of Step S211 and Step S212 may be omitted.

<Flow of Base Layer Decoding Processes>

When decoding is possible according to the result of determination of whether decoding is possible based on the decoding load definition information described above, the base layer decoding process is executed in Step S205 of FIG. 39. An exemplary flow of the base layer decoding processes will be described with reference to a flowchart of FIG. 41.

When the base layer decoding process starts, in Step S221, the accumulation buffer 211 of the base layer image decoding unit 202 accumulates the transmitted base layer coding stream. In Step S222, the reversible decoding unit 212 decodes the base layer coding stream supplied from the accumulation buffer 211. That is, image data such as an I slice, a P slice, and a B slice coded by the reversible coding unit 116 is decoded. In this case, various pieces of information other than the image data included in the bitstream such as the header information are also decoded.

In Step S223, the inverse quantization unit 213 performs inverse quantization of the quantized coefficient obtained in the process of Step S222.

In Step S224, the inverse orthogonal transform unit 214 performs an inverse orthogonal transform on the coefficient that is inverse-quantized in Step S223.

In Step S225, the intra prediction unit 221 and the inter prediction unit 222 perform the prediction process and generate the prediction image. That is, the prediction process is performed in the prediction mode, which is determined in the reversible decoding unit 212, applied when coding is performed, More specifically, for example, if intra prediction is applied when coding is performed, the intra prediction unit 221 generates the prediction image in the intra prediction mode that is set as optimum when coding is performed. In addition, for example, if inter prediction is applied when coding is performed, the inter prediction unit 222 generates the prediction image in the inter prediction mode that is set as optimum when coding is performed.

In Step S226, the computation unit 215 adds the prediction image generated in Step S226 to the difference image obtained by the inverse orthogonal transform in Step S225. Therefore, the image data of the reconstructed image is obtained.

In Step S227, the loop filter 216 appropriately performs the loop filter process including the deblocking filter process or the adaptive loop filter process on the image data of the reconstructed image obtained in the process of Step S227.

In Step S228, the screen rearrangement buffer 217 rearranges frames of the reconstructed image on which the filter process is performed in Step S227. That is, an order of frames rearranged when coding is performed is rearranged to an original display order.

In Step S229, the D/A conversion unit 218 performs D/A conversion of the image whose frame order is rearranged in Step S228. The image is output to a display (not illustrated) and the image is displayed.

In Step S230, the frame memory 219 stores data such as the decoded image obtained in the process of Step S227 or the reconstructed image obtained in the process of Step S226.

When the process of Step S230 ends, the base layer decoding process ends and the process returns to FIG. 39.

<Flow of Enhancement Layer Decoding Processes>

Figure 42:
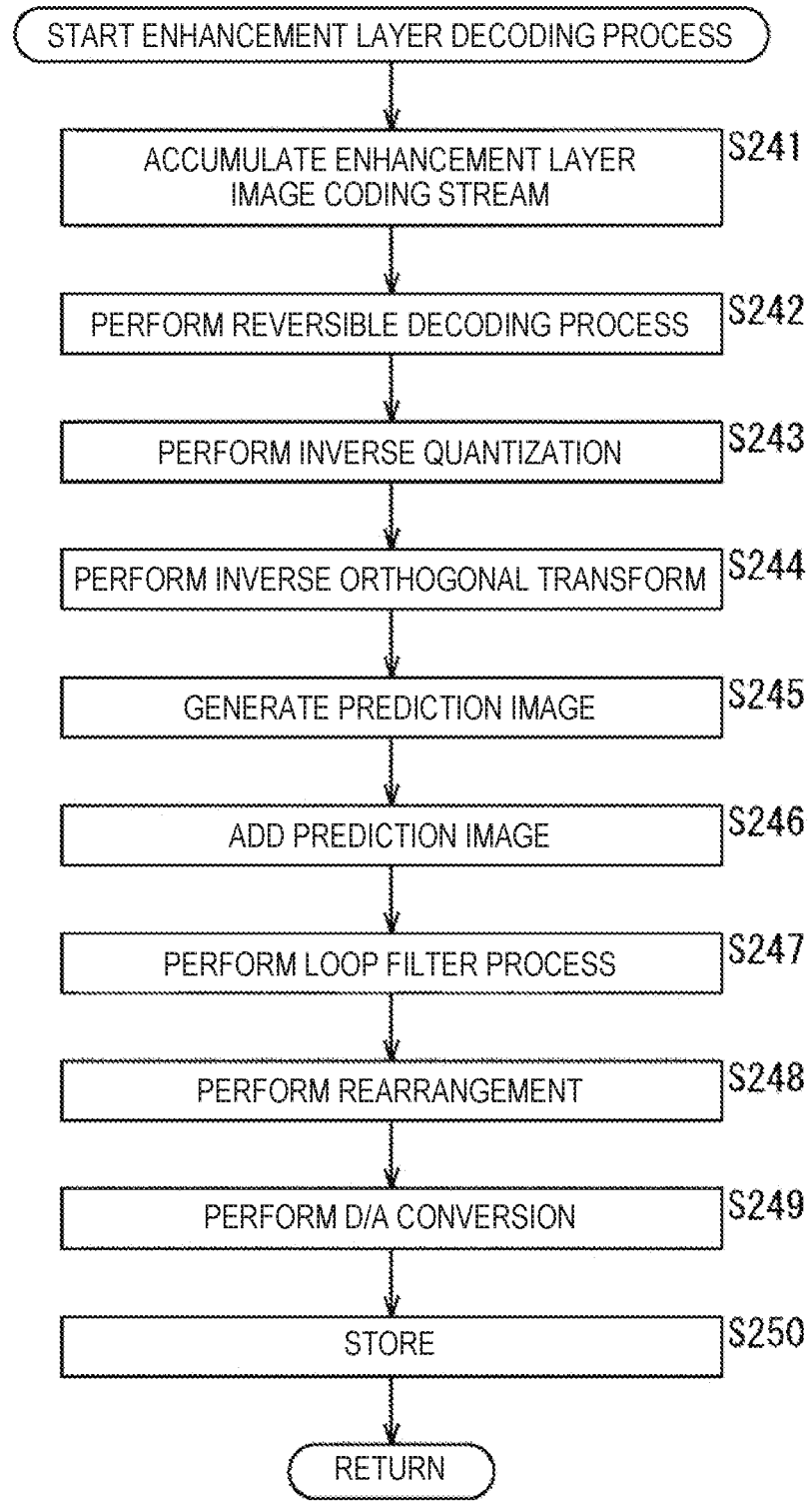
FIG. 42 is a flowchart describing an exemplary flow of enhancement layer decoding processes.

Similar to the base layer decoding process, when decoding is possible according to the result of determination of whether decoding is possible based on the decoding load definition information described above, the enhancement layer decoding process is executed in Step S206 of FIG. 39. An exemplary flow of the enhancement layer decoding processes will be described with reference to a flowchart of FIG. 42.

Figure 41:
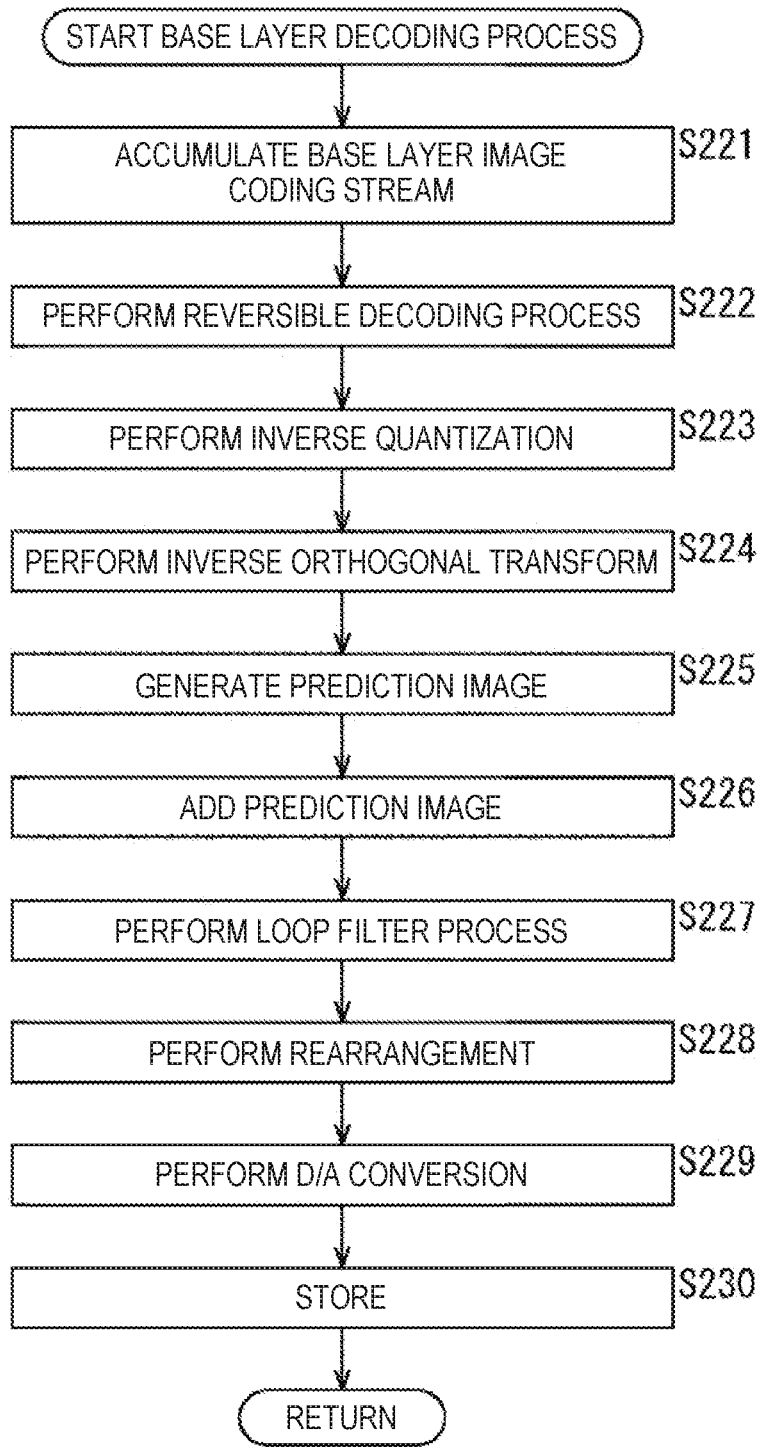
FIG. 41 is a flowchart describing an exemplary flow of base layer decoding processes.

Respective processes (Steps S241 to S250) of the enhancement layer decoding processes correspond to respective processes (Steps S221 to S230) of the base layer decoding processes of FIG. 41, and are executed basically in the same manner as these processes. While respective processes (Steps S221 to S230) of the base layer decoding processes are performed on the base layer, respective processes (Steps S241 to S250) of the enhancement layer decoding processes are performed on the enhancement layer.

When the process of Step S250 ends, the enhancement layer decoding process ends and the process returns to FIG. 39.

When the respective processes are executed in this manner, if the image decoding device 200 uses the decoding load definition information of the independently decodable partial region, it is possible to recognize performance necessary for decoding more accurately.

An application range of the present technology includes applications to all image coding devices and image decoding devices capable of coding and decoding partial images.

In addition, the present technology may be applied to an image coding device and an image decoding device used to receive image information (a bitstream) compressed by motion compensation and an orthogonal transform such as a discrete cosine transform, similarly to, for example, MPEG, or H.26x, through satellite broadcast, cable television, the Internet, or network media such as a mobile telephone. In addition, the present technology may be applied to an image coding device and an image decoding device used to perform a process in storage media such as optical and magnetic discs and a flash memory.

4. Fourth Embodiment

<Application to Multi-View Image Encoding and Multi-View Image Decoding>

Figure 43:
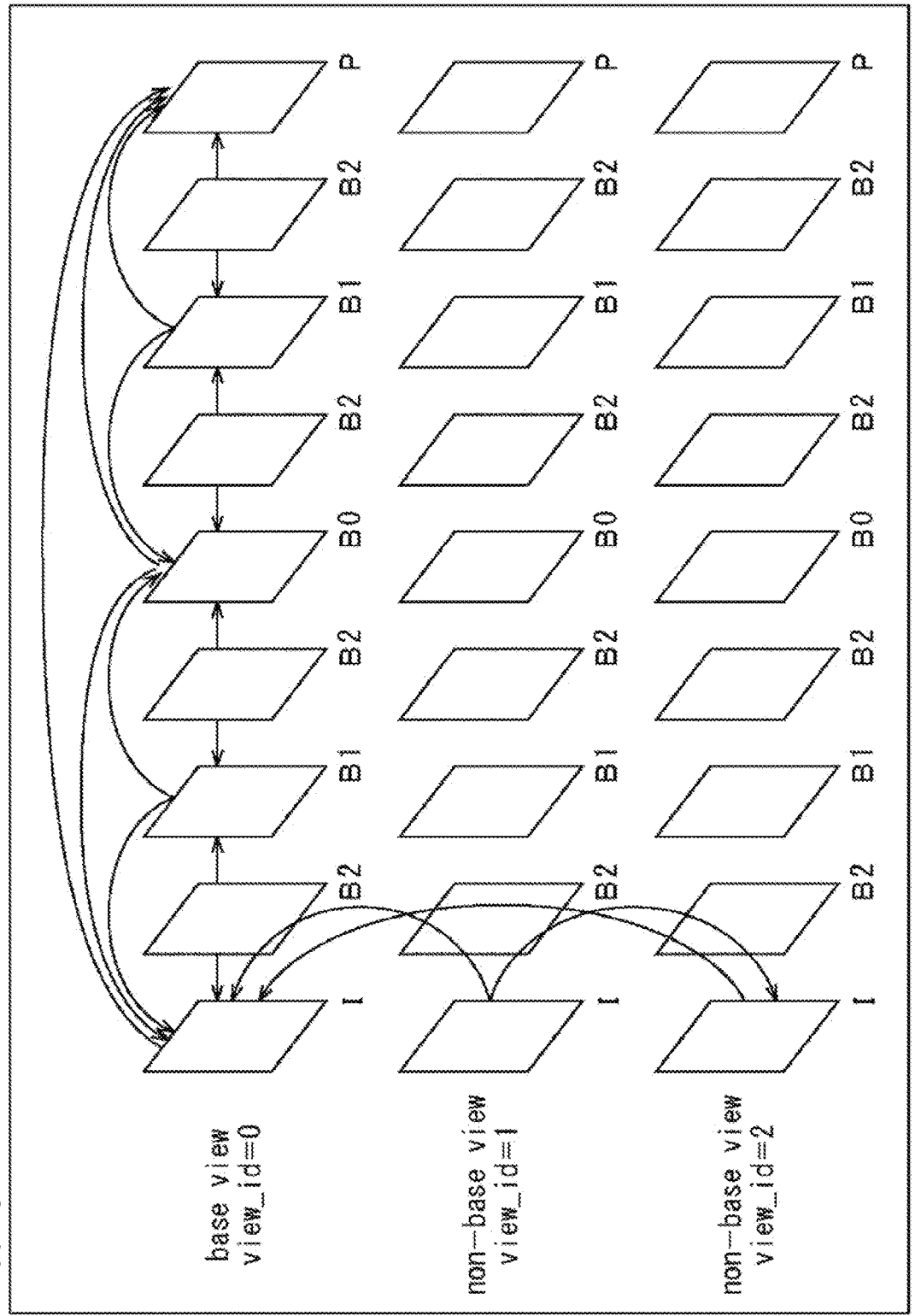
FIG. 43 is a diagram illustrating an example of a multi-view image coding scheme.

The above-described series of processes can be applied to multi-view image encoding and multi-view image decoding. FIG. 43 illustrates an example of a multi-view image coding scheme.

As illustrated in FIG. 43, a multi-view image includes images having a plurality of views. The plurality of views of the multi-view image include a base view for which encoding/decoding is performed using only the image of its own view without using information of other views and non-base views for which encoding/decoding is performed using information of other views. In encoding/decoding of a non-base view, the information of the base view may be used, and the information of the other non-base view may be used.

That is, a reference relation between views in multi-view image coding and decoding is similar to a reference relation between layers in layered image coding and decoding. Therefore, in coding and decoding of the multi-view image in FIG. 43, the above-described method may be applied. In this manner, similarly to the multi-view image, it is possible to recognize performance necessary for decoding more accurately.

<Multi-View Image Encoding Device>

Figure 44:
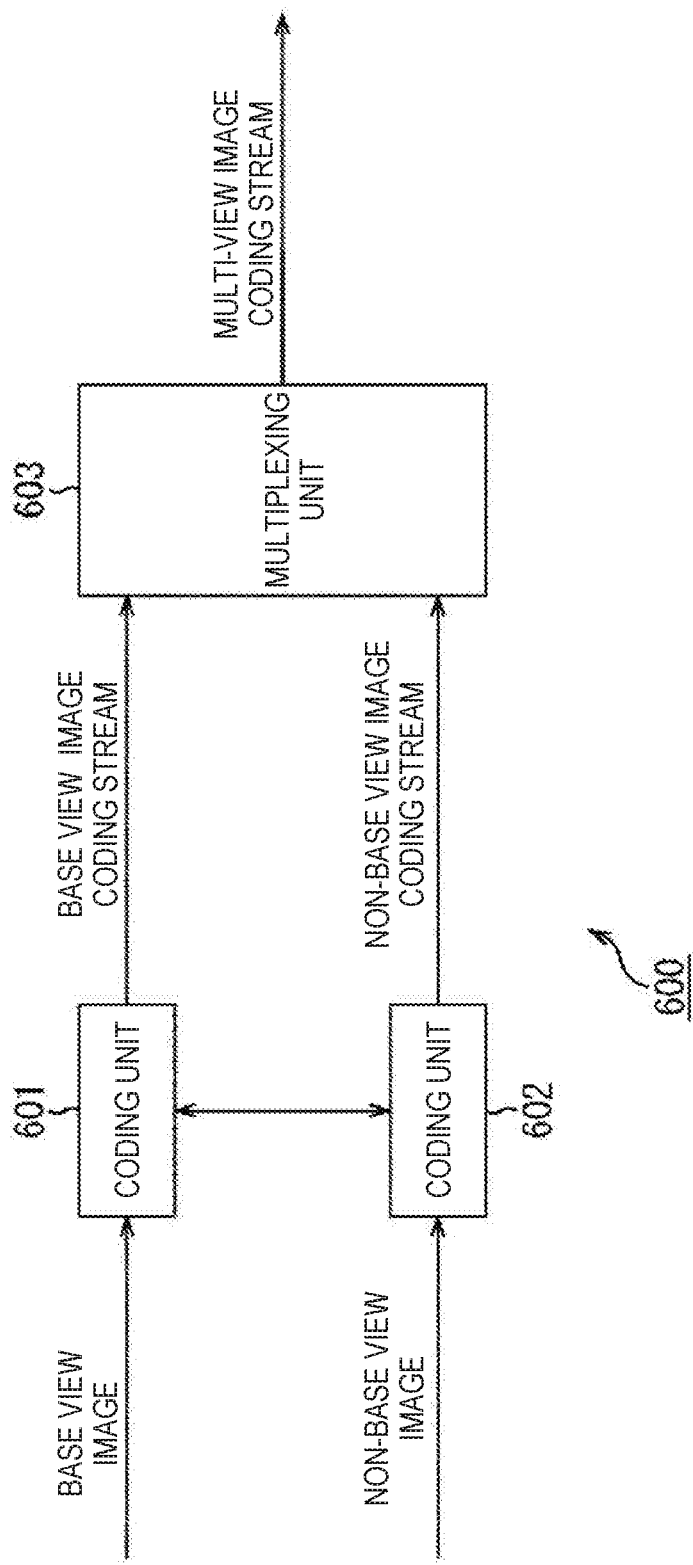
FIG. 44 is a diagram illustrating a main configuration example of a multi-view image coding device to which the present technology is applied.

FIG. 44 is a diagram illustrating a multi-view image encoding device which performs the above-described multi-view image encoding. As illustrated in FIG. 44, the multi-view image encoding device 600 has an encoding unit 601, an encoding unit 602, and a multiplexing unit 603.

The encoding unit 601 encodes abuse view image to generate a base view image encoded stream. The encoding unit 602 encodes anon-base view image to generate a non-base view image encoded stream. The multiplexing unit 603 multiplexes the base view image encoded stream generated by the encoding unit 601 and the non-base view image encoded stream generated by the encoding unit 602 to generate a multi-view image encoded stream.

The base layer image coding unit 101 may be applied as the coding unit 601 of the multi-view image coding device 600, and the enhancement layer image coding unit 102 may be applied as the coding unit 602. In this manner, it is possible to recognize performance necessary for decoding more accurately.

<Multi-View Image Decoding Device>

Figure 45:
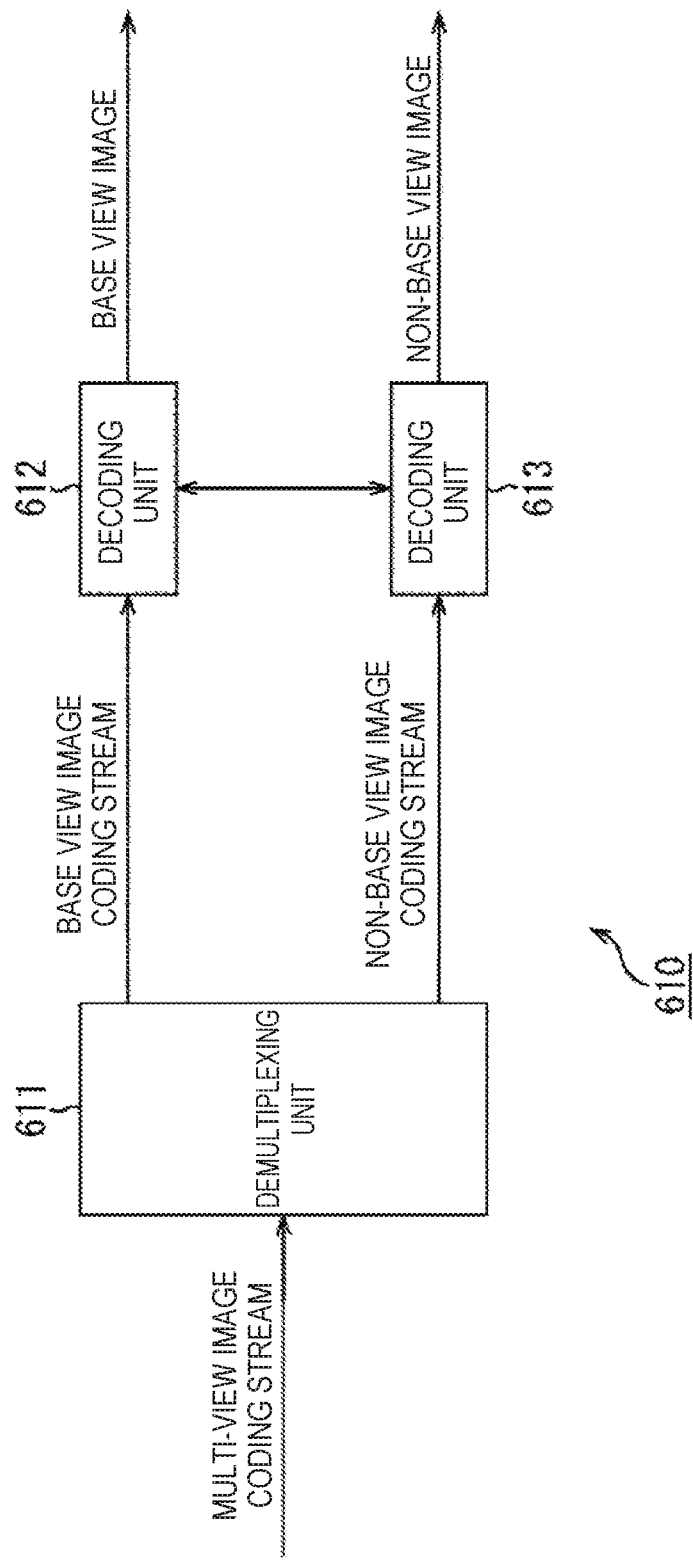
FIG. 45 is a diagram illustrating a main configuration example of a multi-view image decoding device to which the present technology is applied.

FIG. 45 is a diagram illustrating a multi-view image decoding device which performs the above-described multi-view image decoding. As illustrated in FIG. 45, the multi-view image decoding device 610 has an demultiplexing unit 611, a decoding unit 612, and another decoding unit 613.

The demultiplexing unit 611 demultiplexes the multi-view image encoded stream obtained by multiplexing the base view image encoded stream and the non-base view image encoded stream to extract the base view image encoded stream and the non-base view image encoded stream. The decoding unit 612 decodes the base view image encoded stream extracted by the demultiplexing unit 611 to obtain the base view image. The decoding unit 613 decodes the non-base view image encoded stream extracted by the demultiplexing unit 611 to obtain the non-base view image.

The base layer image decoding unit 202 may be applied as the decoding unit 612 of the multi-view image decoding device 610, and the enhancement layer image decoding unit 203 may be applied as the decoding unit 613. In this manner, it is possible to recognize performance necessary for decoding more accurately.

5. Fifth Embodiment

<Computer>

The above-described series of processes can also be performed by hardware and can also be performed by software. When the series of processes is performed by software, a program of the software is installed in a computer. Here, the computer includes a computer embedded in dedicated hardware and, for example, a general personal computer capable of various functions through installation of various programs.

Figure 46:
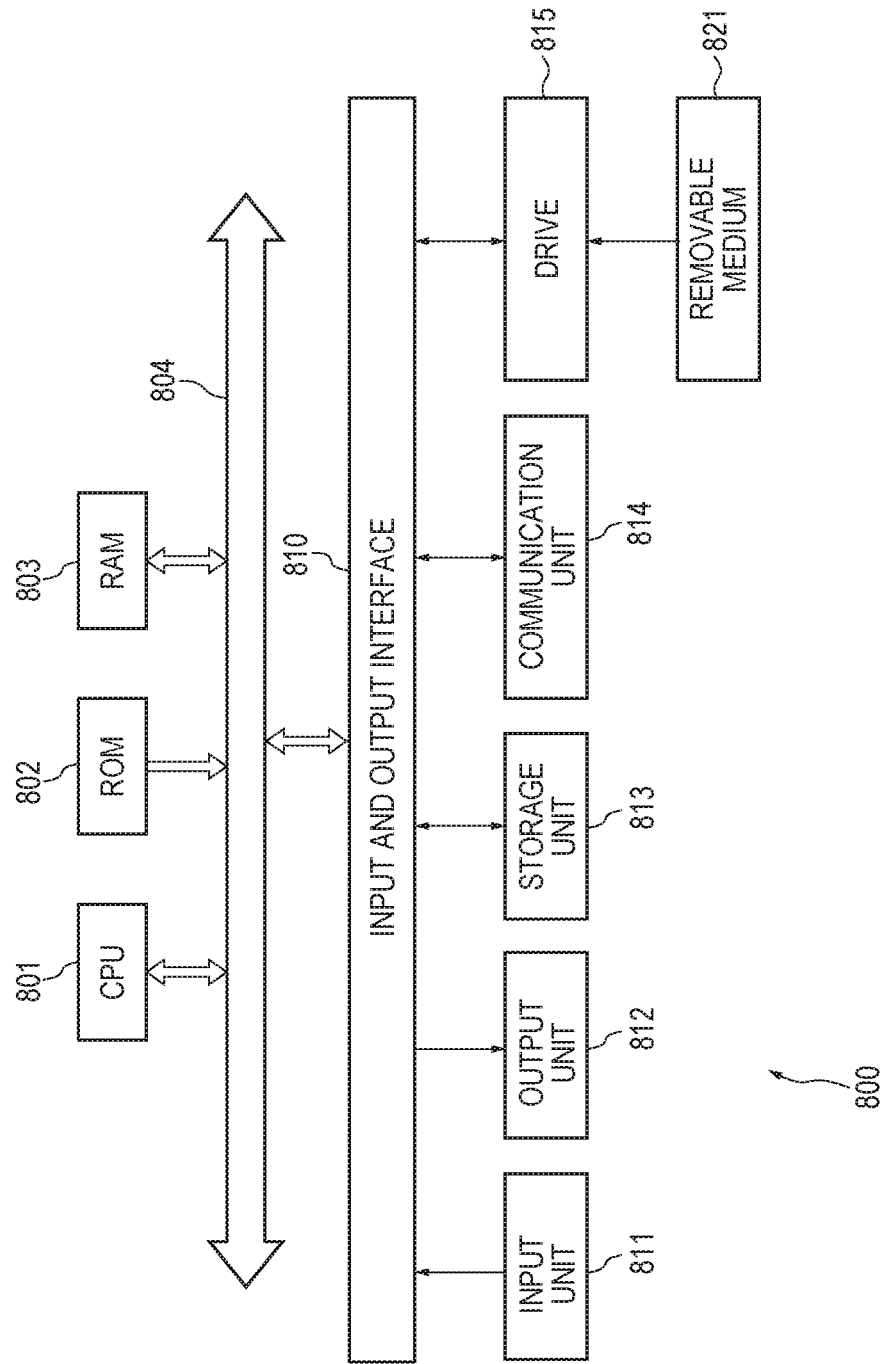
FIG. 46 is a block diagram illustrating an example of a main configuration of a computer.

FIG. 46 is a block diagram illustrating an example of a hardware configuration of the computer performing the above-described series of processes according to a program.

In a computer 800 illustrated in FIG. 46, a central processing unit (CPU) 801, a read-only memory (ROM) 802, and a random access memory (RAM) 803 are connected mutually via a bus 804.

An input and output interface 810 is also connected to the bus 804. An input unit 811, an output unit 812, a storage unit 813, a communication unit 814, and a drive 815 are connected to the input and output interface 810.

The input unit 811 is formed by, for example, a keyboard, a mouse, a microphone, a touch panel, or an input terminal. The output unit 812 is formed by, for example, a display, a speaker, or an output terminal. The storage unit 813 is formed by, for example, a hard disk, a RAM disk, or a non-volatile memory. The communication unit 814 is formed by, for example, a network interface. The drive 815 drives a removable medium 821 such as a magnetic disk, an optical disc, a magneto-optical disc, or a semiconductor memory.

In the computer having the above-described configuration, for example, the CPU 801 performs the above-described processes by loading a program stored in the storage unit 813 to the RAM 803 via the input and output interface 810 and the bus 804 and executing the program. The RAM 803 also appropriately stores data necessary for the CPU 801 to perform various processes.

For example, a program executed by the computer (the CPU 801) can be recorded in the removable medium 821 such as a package medium to be applied. In this case, by mounting the removable medium 821 on the drive 815, the program can be installed in the storage unit 813 via the input and output interface 810.

The program can also be supplied via a wired or wireless transmission medium such as a local area network, the Internet, or digital satellite broadcast. In this case, the program can be received by the communication unit 814 to be installed in the storage unit 813.

Further, the program can also be installed in advance in the ROM 802 or the storage unit 813.

Programs executed by the computer may be programs which are processed chronologically in the order described in the present specification or may be programs which are processed at necessary timings, for example, in parallel or when called.

In the present specification, steps describing a program recorded in a recording medium include not only processes which are performed chronologically in the described order but also processes which are performed in parallel or individually but not chronologically.

In the present specification, a system means a set of a plurality of constituent elements (devices, modules (components), and the like) and all of the constituent elements may be included or may not be included in the same casing. Accordingly, a plurality of devices accommodated in separate casings and connected via networks and a single device in which a plurality of modules are accommodated in a single casing are all systems.

A configuration described above as a single device (or processing unit) may be divided and configured as a plurality of devices (or processing units). In contrast, a configuration described above as a plurality of devices (or processing units) may be collected and configured as a single device (or processing unit). Configurations other than the above-described configurations may, of course, be added to the configurations of the devices (or the processing units). Further, as long as configurations or operations are substantially the same in the entire system, parts of the configurations of certain devices (or processing units) may be included in the configurations of the other devices or other processing units).

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, in the present technology, it is possible to realize a cloud computing configuration in which a single function is shared and processed jointly by a plurality of devices via networks.

Each step described in the above-described flowcharts can be performed by a single device and can also be shared and performed by a plurality of devices.

When a plurality of processes are included in a single step, the plurality of processes included in the single step can be performed by a single device and can also be shared and performed by a plurality of devices.

The image encoding device and the image decoding device according to the above-described embodiments can be applied to various electronic devices such as a transmitter or a receiver in delivery of satellite broadcast, a wired broadcast such as a cable TV, or the Internet and delivery to a terminal by cellular communication, a recording device recording an image in a medium such as an optical disc, a magnetic disk, or a flash memory, or a reproduction device reproducing an image from the storage medium. Hereinafter, four application examples will be described.

6. Sixth Embodiment

<First Application Example: CL Television Receiver>

Figure 47:
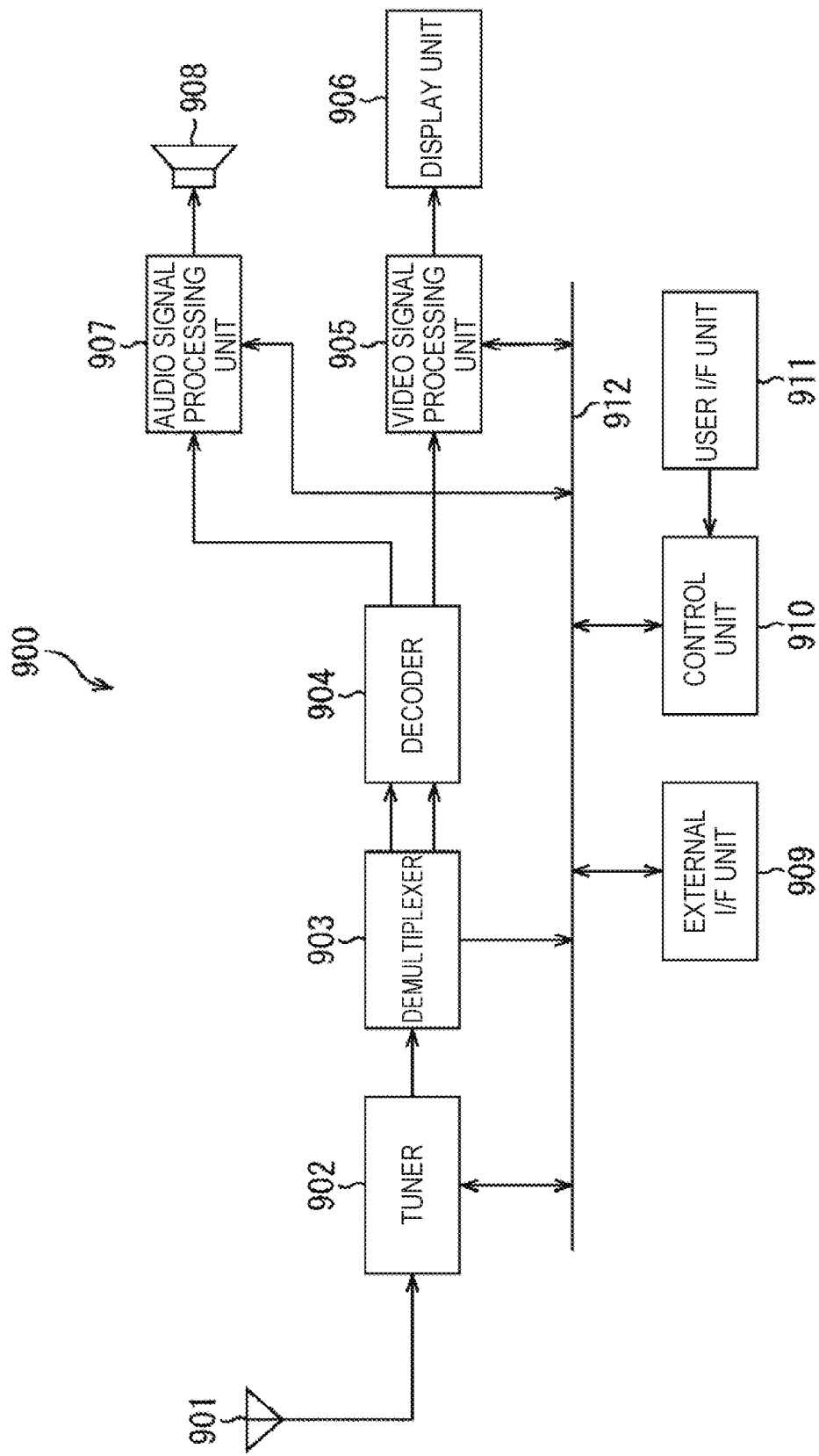
FIG. 47 is a block diagram illustrating an example of a schematic configuration of a television device.

FIG. 47 is a block diagram illustrating an example of a schematic configuration of a television device to which the above-described embodiments are applied. A television device 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from a broadcast signal received via the antenna 901 and demodulates the extracted signal. The tuner 902 then outputs an encoded bit stream obtained through the demodulation to the demultiplexer 903. That is, in the television device 900, the tuner 902 serves as a transmission unit configured to receive a coding stream in which an image is coded.

The demultiplexer 903 demultiplexes a video stream and an audio stream of a viewing target program from the encoded bit stream and outputs the demultiplexed streams to the decoder 904. The demultiplexer 903 extracts auxiliary data such as an electronic program guide (EPG) from the encoded bit stream and supplies the extracted data to the control unit 910. Also, when the coding bitstream is scrambled, the demultiplexer 903 may per m descrambling.

The decoder 904 decodes the video stream and the audio stream input from the demultiplexer 903. The decoder 904 outputs video data generated through the decoding process to the video signal processing unit 905. The decoder 904 outputs audio data generated through the decoding process to the audio signal processing unit 907.

The video signal processing unit 905 reproduces the video data input from the decoder 904, and causes a video to be displayed on the display unit 906. In addition, the video signal processing unit 905 may cause an application screen supplied via the network to be displayed on the display unit 906. In addition, the video signal processing unit 905 may perform an additional process, for example, noise elimination, on the video data according to settings. Further, the video signal processing unit 905 may generate an image of a graphical user interface (GUI), for example, a menu, a button or a cursor, and superimpose the generated image on an output image.

The display unit 906 is driven by a drive signal supplied from the video signal processing unit 905 and displays a video or an image on a video plane of a display device (for example, a liquid crystal display, a plasma display or an organic electro luminescence display (OEM) (organic EL display)).

The audio signal processing unit 907 performs a reproducing process such as D/A conversion and amplification on audio data input from the decoder 904, and causes audio to be output from the speaker 908. In addition, the audio signal processing unit 907 may perform an additional process such as noise elimination on the audio data.

The external interface unit 909 is an interface that connects the television device 900 and an external device or the network. For example, the video stream or the audio stream received through the external interface unit 909 may be decoded by the decoder 904. That is, in the television device 900, the external interface unit 909 serves as a transmission unit configured to receive a coding stream in which an image is coded.

The control unit 910 includes a processor such as a CPU and memories such as a RAM and a ROM. The memories store programs executed by the CPU, program data, EPG data, data acquired via a network, and the like. The programs stored in the memories are read and executed by the CPU, for example, when the television device 900 is activated. The CPU controls an operation of the television device 900, for example, according to an operation signal input from the user interface unit 911 by executing a program.

The user interface unit 911 is connected to the control unit 910. The user interface unit 911 includes, for example, a button and a switch used by the user to operate the television device 900, and a reception unit of a remote control signal. The user interface unit 911 detects the user's operation through such a component, generates an operation signal and outputs the generated operation signal to the control unit 910.

The bus 912 connects the tuner 902, the demultiplexer 903, the decoder 904, the video signal processing unit 905, the audio signal processing unit 907, the external interface unit 909 and the control unit 910 to one another.

In the television device 900 configured in this manner, the decoder 904 has functions of the image decoding device 200 according to the above-described embodiment. Accordingly, it is possible to recognize performance necessary for decoding the image more accurately in the television device 900.

Second Application Example

Mobile Telephone

Figure 48:
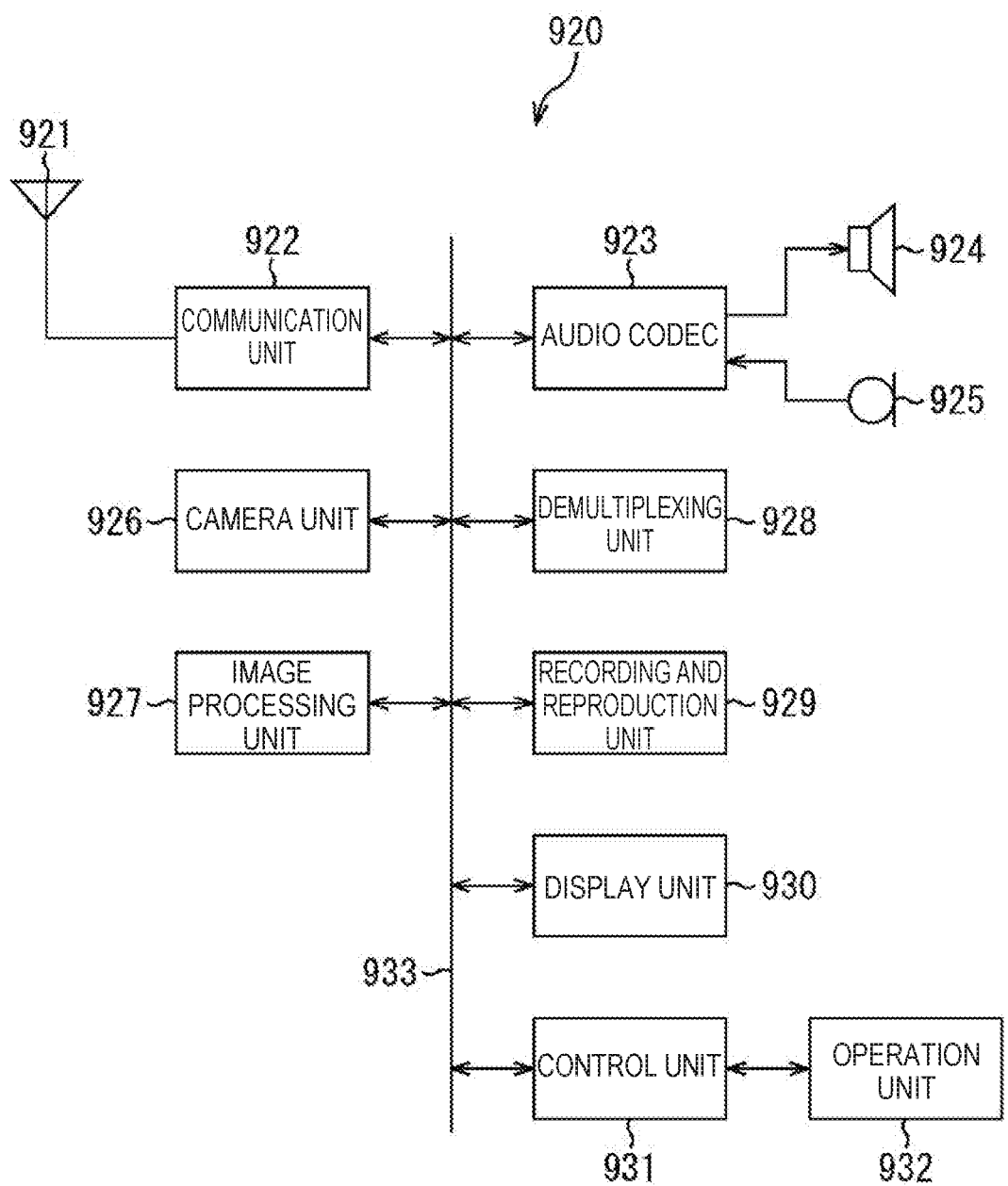
FIG. 48 is a block diagram illustrating an example of a schematic configuration of a mobile telephone.

FIG. 48 illustrates an exemplary schematic configuration of a mobile telephone to which the above-described embodiment is applied, A mobile telephone 920 includes an antenna 921, a communication unit 922, an audio codec 923, a speaker 924, a microphone 925, a camera unit 926, an image processing unit 927, a demultiplexing unit 928, a recording and reproduction unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the demultiplexing unit 928, the recording and reproduction unit 929, the display unit 930, and the control unit 931 to one another.

The mobile telephone 920 performs operations such as transmission and reception of audio signals, transmission and reception of electronic mail or image data, capturing of images, and recording of data in various operation modes such as an audio calling mode, a data communication mode, a photographing mode, and a video phone mode.

In the audio calling mode, an analog audio signal generated by the microphone 925 is supplied to the audio codec 923. The audio codec 923 converts the analog audio signal into the audio data and performs A/D conversion and compression of the converted audio data. Therefore, the audio codec 923 outputs the compressed audio data to the communication unit 922. The communication unit 922 codes and modulates the audio data and generates a transmission signal. Therefore, the communication unit 922 transmits the generated transmission signal to a base station (not illustrated) through the antenna 921. In addition, the communication unit 922 amplifies a wireless signal received through the antenna 921, performs frequency conversion thereon, and acquires a received signal. Therefore, the communication unit 922 demodulates and decodes the received signal to generate audio data, and outputs the generated audio data to the audio codec 923. The audio codec 923 extends the audio data and performs D/A conversion thereon, and generates an analog audio signal. Therefore, the audio codec 923 supplies the generated audio signal to the speaker 924 and causes audio to be output.

In addition, in the data communication mode, for example, the control unit 931 generates text data of E-mail according to the user's operation through the operation unit 932. In addition, the control unit 931 causes text to be displayed on the display unit 930. In addition, the control unit 931 generates E-mail data according to a transmission instruction by the user through the operation unit 932, and outputs the generated E-mail data to the communication unit 922. The communication unit 922 codes and modulates the E-mail data and generates a transmission signal. Therefore, the communication unit 922 transmits the generated transmission signal to the base station (not illustrated) through the antenna 921. In addition, the communication unit 922 amplifies a wireless signal received through the antenna 921, performs frequency conversion thereon, and acquires a received signal. Therefore, the communication unit 922 demodulates and decodes the received signal, restores the E-mail data, and outputs the restored E-mail data to the control unit 931. The control unit 931 causes content of E-mail to be displayed on the display unit 930 and supplies the E-mail data to the recording and reproduction unit 929 and causes the data to be written in the storage medium.

The recording and reproduction unit 929 includes an arbitrary readable and writable storage medium. For example, the storage medium may be a built-in storage medium such as a RAM or a flash memory, or a storage medium of an external mounting type such as a hard disk, a magnetic disk, a magneto optical disk, an optical disc, a Universal Serial Bus (USB) memory or a memory card.

In addition, in the photographing mode, for example, the camera unit 926 captures an image of a subject, generates image data, and outputs the generated image data to the image processing unit 927. The image processing unit 927 codes the image data input from the camera unit 926, supplies the coding stream to the recording and reproduction unit 929, and causes the stream to be written in the storage medium.

Further, in an image display mode, the recording and reproduction unit 929 reads the coding stream recorded in the storage medium and outputs the read stream to the image processing unit 927. The image processing unit 927 decodes the coding stream input from the recording and reproduction unit 929, supplies the image data to the display unit 930, and causes the image to be displayed.

In addition, in the television phone mode, for example, the demultiplexing unit 928 multiplexes the video stream coded by the image processing unit 927 and the audio stream input from the audio codec 923 and outputs the multiplexed stream to the communication unit 922. The communication unit 922 codes and modulates the stream and generates a transmission signal. Therefore, the communication unit 922 transmits the generated transmission signal to the base station (not illustrated) through the antenna 921. In addition, the communication unit 922 amplifies a wireless signal received through the antenna 921, performs frequency conversion thereon, and acquires a received signal. The coding bitstream may be included in the transmission signal and the received signal. Therefore, the communication unit 922 demodulates and decodes the received signal, restores the stream, and outputs the restored stream to the demultiplexing unit 928. The demultiplexing unit 928 separates the video stream and the audio stream from the input stream, and outputs the video stream to the image processing unit 927 and the audio stream to the audio codec 923. The image processing unit 927 decodes the video stream and generates the video data. The video data is supplied to the display unit 930, and a series of images is displayed on the display unit 930. The audio codec 923 extends the audio stream and performs D/A conversion thereon, and generates an analog audio signal. Therefore, the audio codec 923 supplies the generated audio signal to the speaker 924 and causes audio to be output.

In the mobile telephone 920 configured in this manner, the image processing unit 927 has functions of the image coding device 100 or the image decoding device 200 according to the above-described embodiment. Accordingly, it is possible to recognize performance necessary for decoding more accurately in the mobile telephone 920.

Third Application Example

Recording and Reproduction Device

Figure 49:
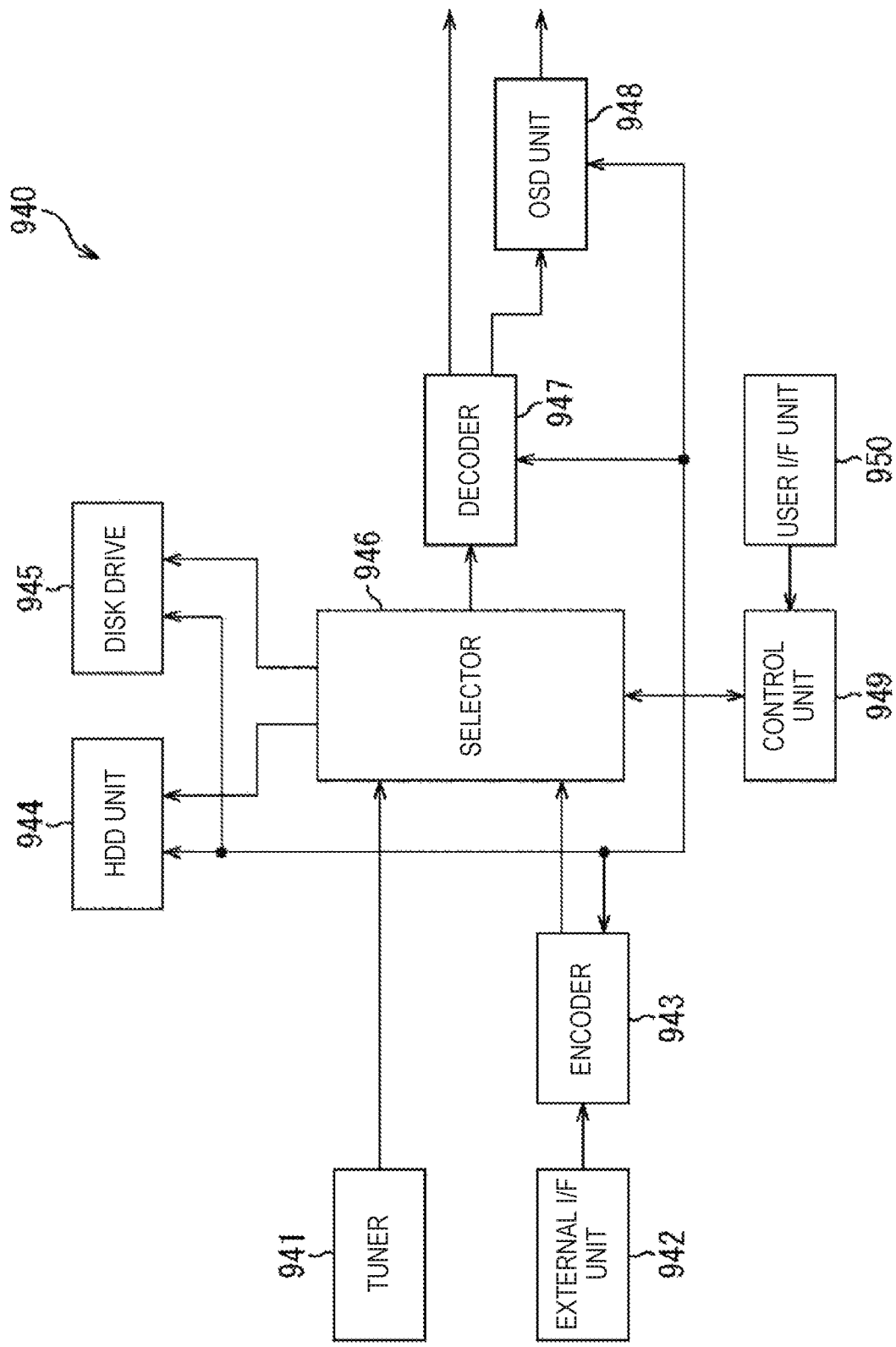
FIG. 49 is a block diagram illustrating an exemplary schematic configuration of a recording and reproduction device.

FIG. 49 illustrates an exemplary schematic configuration of a recording and reproduction device to which the above-described embodiment is applied. A recording and reproduction device 940 codes, for example, received audio data and video data of a broadcast program, and records the result in the recording medium. In addition, the recording and reproduction device 940 may code the audio data and video data acquired from, for example, another device and record the result in the recording medium. In addition, the recording and reproduction device 940 reproduces data recorded in the recording medium through a monitor and a speaker according to, for example, the user's instruction. In this case, the recording and reproduction device 940 decodes the audio data and the video data.

The recording and reproduction device 940 includes a tuner 941, an external interface (I/F) unit 942, an encoder 943, a hard disk drive (HDD) 944, a disk drive 945, a selector 946, a decoder 947, an on-screen display (OSD) 948, a control unit 949, and a user interface (I/F) unit 950.

The tuner 941 extracts a desired channel signal from a broadcast signal received through the antenna (not illustrated), and demodulates the extracted signal. Therefore, the tuner 941 outputs the coding bitstream obtained by demodulation to the selector 946. That is, the tuner 941 serves as a transmission unit in the recording and reproduction device 940.

The external interface unit 942 is an interface that connects the recording and reproduction device 940 and the external device or the network. The external interface unit 942 may be, for example an Institute of Electrical and Electronic Engineers (IEEE) 1394 interface, a network interface, a USB interface, or a flash memory interface. For example, the video data and audio data received through the external interface unit 942 are input to the encoder 943. That is, the external interface unit 942 serves as a transmission unit in the recording and reproduction device 940.

When the video data and audio data input from the external interface unit 942 are not coded, the encoder 943 codes the video data and the audio data. Therefore, the encoder 943 outputs the coding bitstream to the selector 946.

The HDD 944 records the coding bitstream in which content data such as a video and audio is compressed, various programs and other data in an internal hard disk. In addition, when the video and the audio are reproduced, the HDD 944 reads this data from the hard disk.

The disk drive 945 records and reads data in the installed recording medium. The recording medium installed in the disk drive 945 may be, for example, a digital versatile disc (DVD) disc (such as a DVD-Video, a DVD-random access memory (DVD-RAM), a DVD-Recordable (DVD-R), a DVD-Rewritable (DVD-RW), a DVD+Recordable (DVD+R), and a DVD-+Rewritable (DVD+RW)) or a Blu-ray™ disc.

When a video and audio are recorded, the selector 946 selects the coding bitstream input from the tuner 941 or the encoder 943, and outputs the selected coding bitstream to the HDD 944 or the disk drive 945. In addition, when a video and audio are reproduced, the selector 946 outputs the coding bitstream input from the HDD 944 or the disk drive 945 to the decoder 947.

The decoder 947 decodes the coding bitstream and generates video data and audio data. Therefore, the decoder 947 outputs the generated video data to the OSD 948. In addition, the decoder 947 outputs the generated audio data to an external speaker.

The OSD 948 reproduces the video data input from the decoder 947 and displays a video. In addition, the OSD 948 may superimpose an image of a GUI, for example, a menu, a button or a cursor, on the video to be displayed.

The control unit 949 includes a processor such as a CPU and memories such as a RAM and a ROM. The memories store programs executed by the CPU, program data, and the like. The programs stored in the memories are read and executed by the CPU, for example, when the recording and reproduction device 940 is activated. The CPU controls an operation of the recording and reproduction device 940, for example, according to an operation signal input from the user interface unit 950 by executing a program.

The user interface unit 950 is connected to the control unit 949. The user interface unit 950 includes, for example, a button and a switch used by the user to operate the recording and reproduction device 940, and a reception unit of a remote control signal. The user interface unit 950 detects the user's operation through such a component, generates an operation signal and outputs the generated operation signal to the control unit 949.

In the recording and reproduction device 940 configured in this manner, the encoder 943 has functions of the image coding device 100 according to the above-described embodiment. In addition, the decoder 947 has functions of the image decoding device 200 according to the above-described embodiment. Accordingly, it is possible to recognize performance necessary for decoding the image more accurately in the recording and reproduction device 940.

Fourth Application Example

Imaging Device

Figure 50:
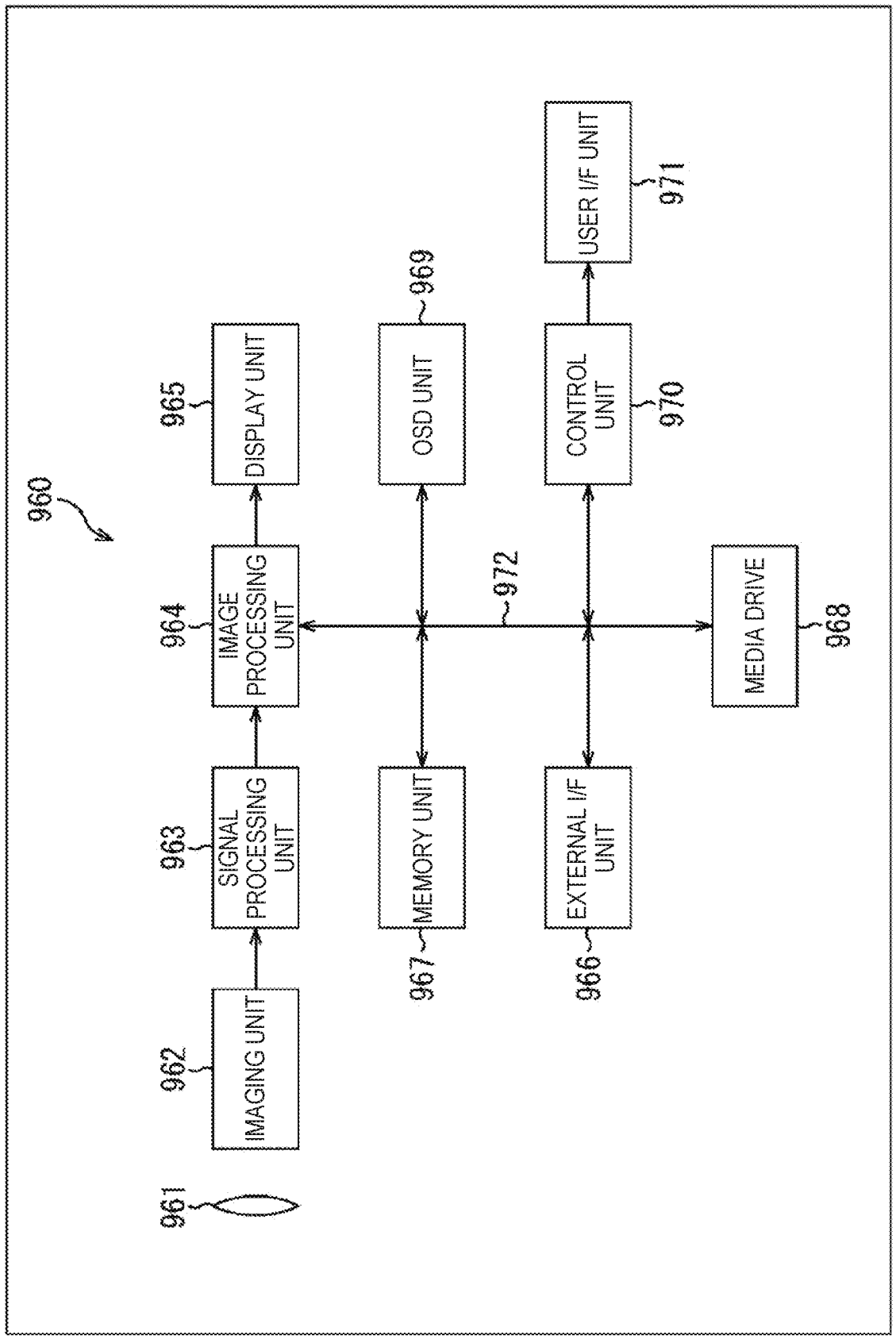
FIG. 50 is a block diagram illustrating an exemplary schematic configuration of an imaging device.

FIG. 50 illustrates an exemplary schematic configuration of an imaging device to which the above-described embodiment is applied. An imaging device 960 generates an image captured of a subject, codes image data, and records the data in the recording medium.

The imaging device 960 includes an optical block 961, an imaging unit 962, a signal processing unit 963, an image processing unit 964, a display unit 965, an external interface (I/F) unit 966, a memory unit 967, a media drive 968, an OSD 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 connects the image processing unit 964, the external interface unit 966, the memory unit 967, the media drive 968, the OSD 969, and the control unit 970 to one another.

The optical block 961 includes a focus lens and an aperture mechanism. The optical block 961 causes an optical image of the subject to be formed on an imaging plane of the imaging unit 962. The imaging unit 962 includes an image sensor such as a charge coupled device (CCD) or a complementary metal oxide semiconductor (CMOS), and converts the optical image formed on the imaging plane into an image signal as an electrical signal by photoelectric conversion. Therefore, the imaging unit 962 outputs the image signal to the signal processing unit 963.

The signal processing unit 963 performs various camera signal processes such as knee correction, gamma correction, and color correction on the image signal input from the imaging unit 962. The signal processing unit 963 outputs image data after the camera signal process to the image processing unit 964.

The image processing unit 964 codes the image data input from the signal processing unit 963 and generates coded data. Therefore, the image processing unit 964 outputs the generated coded data to the external interface unit 966 or the media drive 968. In addition, the image processing unit 964 decodes the coded data input from the external interface unit 966 or the media drive 968 and generates image data. Therefore, the image processing unit 964 outputs the generated image data to the display unit 965. In addition, the image processing unit 964 may output the image data input from the signal processing unit 963 and cause the image to be displayed on the display unit 965. In addition, the image processing unit 964 may superimpose the image to be output to the display unit 965 on display data acquired from the OSD 969.

The OSD 969 generates an image of a GUI, for example, a menu, a button or, a cursor, and outputs the generated image to the image processing unit 964.

The external interface unit 966 is configured as, for example, a USB input and output terminal. The external interface unit 966 connects the imaging device 960 and a printer, for example, when the image is printed. In addition, a drive is connected to the external interface unit 966 as necessary. A removable medium, for example, a magnetic disk or an optical disc, is installed in the drive, and a program read from the removable medium may be installed in the imaging device 960. Further, the external interface unit 966 may be configured as a network interface that is connected to the network such as the LAN or the Internet. That is, the external interface unit 966 serves as a transmission unit in the imaging device 960.

The recording medium installed in the media drive 968 may be any readable and writable removable medium, for example, a magnetic disk, a magneto optical disk, an optical disc, or a semiconductor memory. In addition, the recording medium may be fixedly installed in the media drive 968, and anon-portable storage unit, for example, a built-in hard disk drive or a solid state drive (SSD), may be configured.

The control unit 970 includes a processor such as a CPU and memories such as a RAM and a ROM. The memories store programs executed by the CPU, program data, and the like. The programs stored in the memories are read and executed by the CPU, for example, when the imaging device 960 is activated. The CPU controls an operation of the imaging device 960, for example, according to an operation signal input from the user interface unit 971 by executing a program.

The user interface unit 971 is connected to the control unit 970. The user interface unit 971 includes, for example, a button and a switch used by the user to operate the imaging device 960, and the like. The user interface unit 971 detects the user's operation through such a component, generates an operation signal and outputs the generated operation signal to the control unit 970.

In the imaging device 960 configured in this manner, the image processing unit 964 has functions of the image coding device 100 and the image decoding device 200 according to the above-described embodiment. Accordingly, it is possible to recognize performance necessary for decoding more accurately in the imaging device 960.

7. Seventh Embodiment

<Application Example of Scalable Coding: First System>

Next, a detailed use example of scalably coded data that is scalably coded (layered (image) coding) will be described. The scalable coding is used to select data to be transmitted, for example, as exemplified in FIG. 51.

Figure 51:
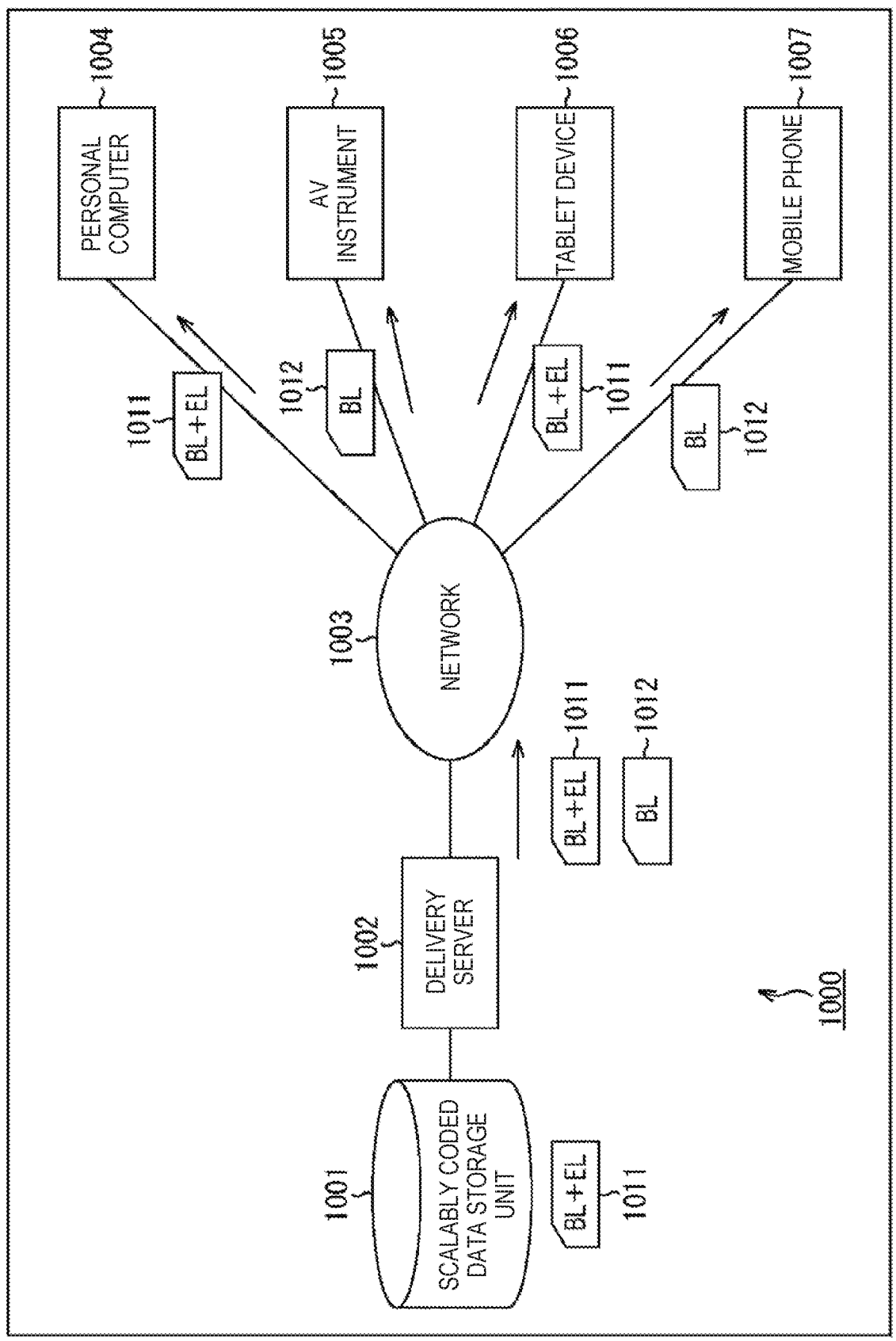
FIG. 51 is a block diagram illustrating an example of scalable coding use.

In a data transmission system 1000 illustrated in FIG. 51, a delivery server 1002 reads scalably coded data stored in a scalably coded data storage unit 1001 and delivers the data to a terminal device such as a personal computer 1004, an AV instrument 1005, a tablet device 1006, or a mobile telephone 1007 via a network 1003.

In this case, the distribution server 1002 selects and transmits coded data of appropriate quality according to a capability of the terminal device, a communication environment or the like. Even when the distribution server 1002 transmits unnecessarily high quality data, not only may an image of high image quality not be obtained in the terminal device, but a delay or an overflow may be caused. In addition, there is concern of a communication band being unnecessarily occupied, and a load on the terminal device unnecessarily increasing. On the other hand, even when the distribution server 1002 transmits unnecessarily low quality data, there is concern of an image of sufficient image quality not being obtained in the terminal device. Therefore, the distribution server 1002 appropriately reads the scalably coded data stored in the scalably coded data storage unit 1001 as coded data of appropriate quality and transmits the data according to a capability of the terminal device, a communication environment or the like.

For example, the scalably coded data storage unit 1001 stores scalably coded data (BL+EL) 1011 that is scalably coded. The scalably coded data (BL+EL) 1011 is coded data including both the base layer and the enhancement layer, and is data from which both the image of the base layer and the image of the enhancement layer can be obtained by decoding.

The delivery server 1002 selects an appropriate layer according to a capability of the terminal device configured to transmit data, a communication environment or the like, and reads data of the layer. For example, the delivery server 1002 reads the scalably coded data (BL+EL) 1011 of high quality from the scalably coded data storage unit 1001 for the personal computer 1004 or the tablet device 1006 having a high processing capacity and transmits the data without change. On the other hand, for example, the delivery server 1002 extracts data of the base layer from the scalably coded data (BL+EL) 1011 for the AV instrument 1005 or the mobile telephone 1007 having a low processing capacity, and transmits the data as scalably coded data (BL) 1012 that has the same content as the scalably coded data (BL+EL) 1011 but has lower quality than the scalably coded data (BL+EL) 1011.

When such scalably coded data is used, since it is possible to easily adjust an amount of data, it is possible to suppress a delay or an overflow from occurring, and suppress an unnecessary load on the terminal device or a communication medium from increasing. In addition, since redundancy between layers is reduced, it is possible to decrease the amount of data in the scalably coded data (BL+EL) 1011, compared to when coded data of each layer is set as separate data. Therefore, it is possible to use a storage area of the scalably coded data storage unit 1001 with higher efficiency.

Also, similarly to the personal computer 1004 to the mobile telephone 1007, since various devices can be applied to the terminal device, hardware performance of the terminal device is different according to the device. In addition, since there are various applications that are executed by the terminal device, a capability of software thereof is different. Further, as the network 1003 serving as a communication medium, any communication channel network including either or both of wired and wireless communication, for example, the Internet or a local area network (LAN) may be applied, and a data transmission capability thereof is different. Further, the capability may be changed according to other communication or the like.

Therefore, before data transmission starts, the delivery server 1002 may perform communication with the terminal device serving as a data transmission destination, and obtain information on a capability of the terminal device such as hardware performance of the terminal device or performance of the application (software) executed by the terminal device, and information on a communication environment such as an available bandwidth of the network 1003. Therefore, the delivery server 1002 may select an appropriate layer based on the information obtained herein.

Also, extraction of the layer may be performed in the terminal device. For example, the personal computer 1004 may decode the transmitted scalably coded data (BL+EL) 1011, display the image of the base layer, or display the image of the enhancement layer. In addition, for example, after extracting the scalably coded data (BL) 1012 of the base layer from the transmitted scalably coded data (BL+EL) 1011, the personal computer 1004 may store it, transfer it to another device, decode it and display the image of the base layer.

It is needless to say that the scalably coded data storage unit 1001, the delivery server 1002, the network 1003, and the number of terminal devices are arbitrary. In addition, while the example in which the delivery server 1002 transmits data to the terminal device has been described above, the use example is not limited thereto. The data transmission system 1000 may be applied to any system as long as the system selects and transmits an appropriate layer according to a capability of the terminal device, a communication environment or the like when coded data that is scalably coded is transmitted to the terminal device.

Therefore, similarly to an application to the layered coding and layered decoding described above with reference to FIGS. 1 to 42, when the present technology is applied to the data transmission system 1000 in FIG. 51, it is possible to obtain the same effects that were described above with reference to FIGS. 1 to 42.

<Application Example of Scalable Coding: Second System>

Figure 52:
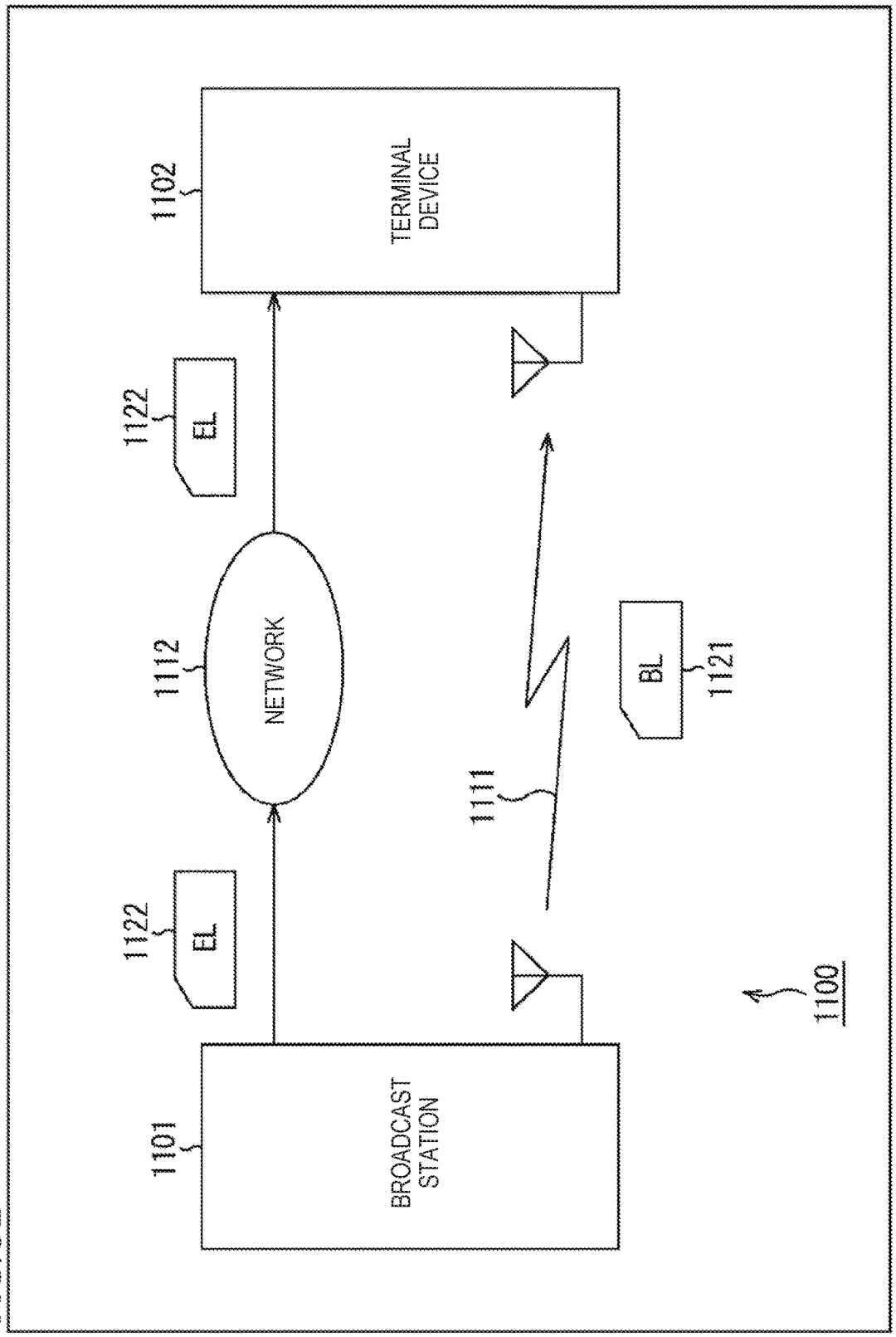
FIG. 52 is a block diagram illustrating another example of scalable coding use.

In addition, the scalable coding is used for transmission through a plurality of communication media, for example, as exemplified in FIG. 52.

In a data transmission system 1100 illustrated in FIG. 52, a broadcast station 1101 transmits scalably coded data of the base layer (BL) 1121 through terrestrial broadcast 1111. In addition, the broadcast station 1101 transmits scalably coded data of the enhancement layer (EL) 1122 via any network 1112 formed of either or both of wired and wireless communication networks (for example, data is packetized and transmitted).

A terminal device 1102 includes a function of receiving the terrestrial broadcast 1111 that is broadcast from the broadcast station 1101, and receives the scalably coded data of the base layer (BL) 1121 transmitted through the terrestrial broadcast 1111. In addition, the terminal device 1102 further includes a communication function of performing communication via the network 1112, and receives the scalably coded data of the enhancement layer (EL) 1122 transmitted via the network 1112.

The terminal device 1102 decodes the scalably coded data of the base layer (BL) 1121 acquired through the terrestrial broadcast 1111 according to, for example, the user's instruction, obtains and stores the image of the base layer, and transmits the result to other device.

In addition, the terminal device 1102 synthesizes the scalably coded data of the base layer (BL) 1121 acquired through the terrestrial broadcast 1111 and the scalably coded data of the enhancement layer (EL) 1122 acquired via the network 1112 according to, for example, the user's instruction, obtains scalably coded data (B+EL), decodes the data, obtains and stores the image of the enhancement layer, and transmits the result to other device.

As described above, the scalably coded data may be transmitted through, for example, a communication medium different for each layer. Therefore, it is possible to deliver a load and suppress a delay or an overflow from occurring.

In addition, according to circumstances, a communication medium used for transmission may be selected for each layer. For example, the scalably coded data of the base layer (BL) 1121 having a relatively large amount of data may be transmitted through a communication medium having a wide bandwidth, and the scalably coded data of the enhancement layer (EL) 1122 having a relatively small amount of data may be transmitted through a communication medium having a narrow bandwidth. In addition, for example, the communication medium for transmitting the scalably coded data of the enhancement layer (EL) 1122 may be switched to the network 1112 or the terrestrial broadcast 1111 according to an available bandwidth of the network 1112. It is needless to say that this is similar for data of any layer.

When control is performed in this manner, it is possible to further suppress a load on data transmission from increasing.

It is needless to say that the number of layers is arbitrary, and the number of communication media used for transmission is also arbitrary. In addition, the number of terminal devices 1102 serving as a data delivery destination is also arbitrary. Further, while the example of broadcast from the broadcast station 1101 has been described above, the use example is not limited thereto. The data transmission system 1100 may be applied to any system as long as the system divides the coded data that is scalably coded into a plurality of pieces of data using a layer as a unit, and transmits the data through a plurality of lines.

Therefore, similarly to an application to the layered coding and layered decoding described above with reference to FIGS. 1 to 42, when the present technology is applied to the data transmission system 1100 in 43 described above, it is possible to obtain the same effects that were described above with reference to FIGS. 1 to 42.

<Application Example of Scalable Coding: Third System>

Figure 53:
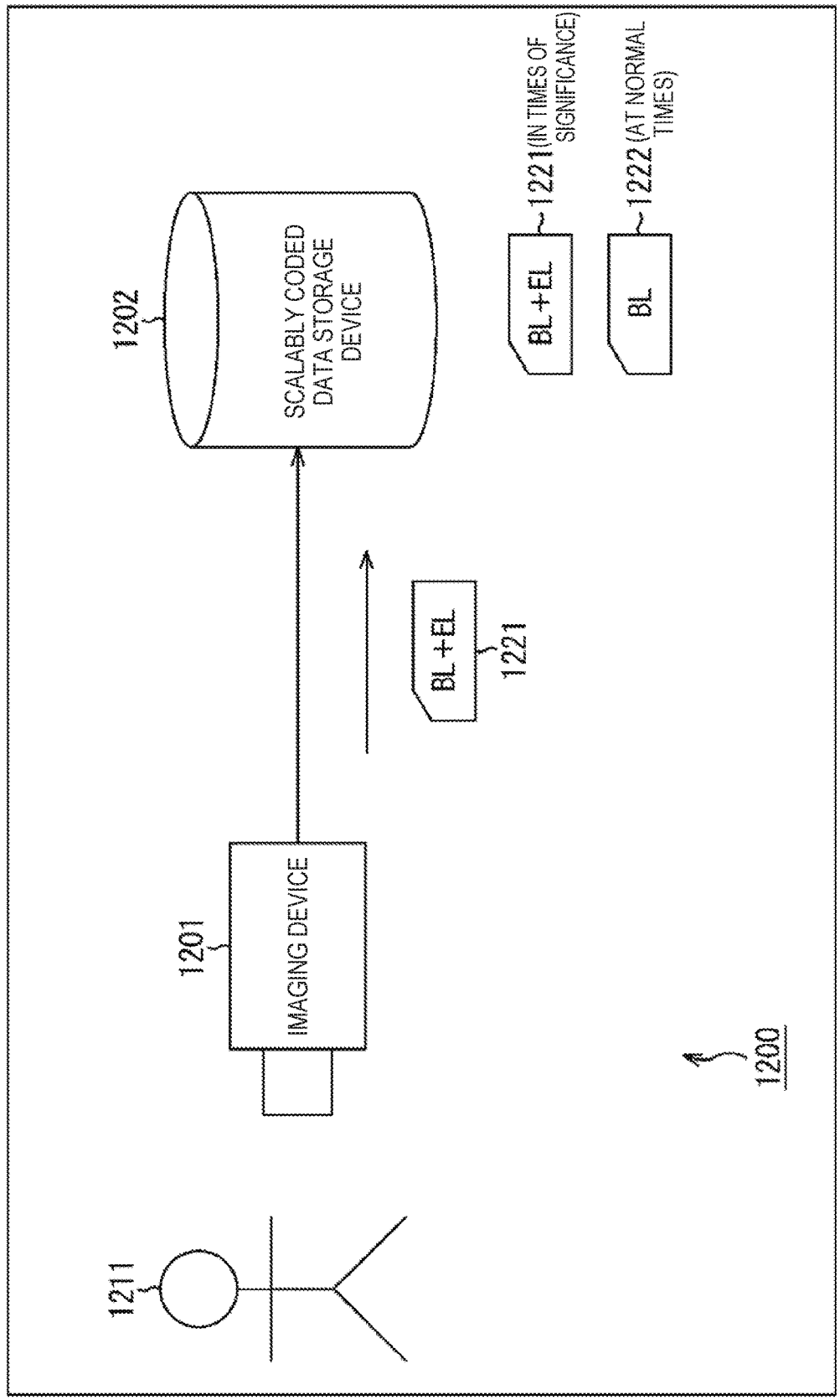
FIG. 53 is a block diagram illustrating still another example of scalable coding use.

Also, the scalable coding is used for storing coded data, for example, as exemplified in FIG. 53.

In an imaging system 1200 illustrated in FIG. 53, an imaging device 1201 scalably codes image data obtained by capturing an image of a subject 1211, and supplies the result to a scalably coded data storage device 1202 as scalably coded data (BL+EL) 1221.

The scalably coded data storage device 1202 stores the scalably coded data (BL+EL) 1221 supplied from the imaging device 1201 with quality according to circumstances. For example, at normal times, the scalably coded data storage device 1202 extracts data of the base layer from the scalably coded data (BL+EL) 1221, and stores it as scalably coded data of the base layer (BL) 1222 having a small amount of data with low quality. On the other hand, for example, in times of significance, the scalably coded data storage device 1202 directly stores the scalably coded data (BL+EL) 1221 having a large amount of data with high quality.

In this manner, since the scalably coded data storage device 1202 may save the image with high image quality only as necessary, it is possible to suppress an amount of data from increasing and it is possible to increase utilization efficiency of a storage area while suppressing a value of an image from decreasing due to image quality degradation.

For example, the imaging device 1201 is a surveillance camera. When there is no monitoring target (for example, an intruder) in a captured image (at normal times), since content of the captured image is highly likely to be unimportant, reducing an amount of data has a priority and the image data (scalably coded data) is stored in low quality. On the other hand, when a monitoring target is shown in the captured image as the subject 1211 (in times of significance), since content of the captured image is highly likely to be important, image quality has a priority, and the image data (scalably coded data) is stored in high quality.

Also, the scalably coded data storage device 1202 may determine normal times and times of significance by, for example, analyzing the image. Alternatively, the imaging device 1201 may perform determination and transmit the determination result to the scalably coded data storage device 1202.

Also, a reference for determining normal times and times of significance is arbitrary, and content of the image serving as the determination reference is arbitrary. It is needless to say that a condition other than content of the image may be set as the determination reference. For example, the determination reference may be switched according to a magnitude, a waveform or the like of recorded audio, switched at predetermined time intervals or switched according to an instruction from the outside such as the user's instruction.

In addition, while the example in which two states, at normal times and in times of significance, are switched has been described above, the number of states is arbitrary. For example, three or more states such as normal times, times of slight significance, times of significance, and times of great significance may be switched. However, a maximum number of states to be switched depends on the number of layers of the scalably coded data.

In addition, the imaging device 1201 may determine the number of layers of scalable coding according to the state. For example, at normal times, the imaging device 1201 may generate the scalably coded data of the base layer (BL) 1222 having a small amount of data with low quality and supply the generated data to the scalably coded data storage device 1202. In addition, for example, in times of significance, the imaging device 1201 may generate the scalably coded data (BL+EL) 1221 of the base layer having a large amount of data with high quality and supply the generated data to the scalably coded data storage device 1202.

While the surveillance camera has been exemplified above, an application of the imaging system 1200 is arbitrary, and is not limited to the surveillance camera.

Therefore, similarly to an application to the layered coding and layered decoding described above with reference to FIGS. 1 to 42, when the present technology is applied to the imaging system 1200 in FIG. 53, it is possible to obtain the same effects that were described above with reference to FIGS. 1 to 42.

Also, the present technology may be applied to, for example, HTTP streaming such as MPEG DASH through which appropriate data is selected from among a plurality of previously prepared pieces of coded data having different resolutions in units of segments and is used. That is, information on coding or decoding may be shared among the plurality of pieces of coded data.

8. Eighth Embodiment

<Other Examples>

Although the examples of devices, systems, and the like to which the present technology is applied have been described above, the present technology is not limited thereto, and can be implemented as any configuration mounted in the devices or devices constituting the systems, for example, processors in the form of system large scale integration (LSI), modules that use a plurality of processors, units that use a plurality of modules, sets obtained by further adding other functions to the units (i.e., a partial configuration of the devices), and the like.

<Video Set>

Figure 54:
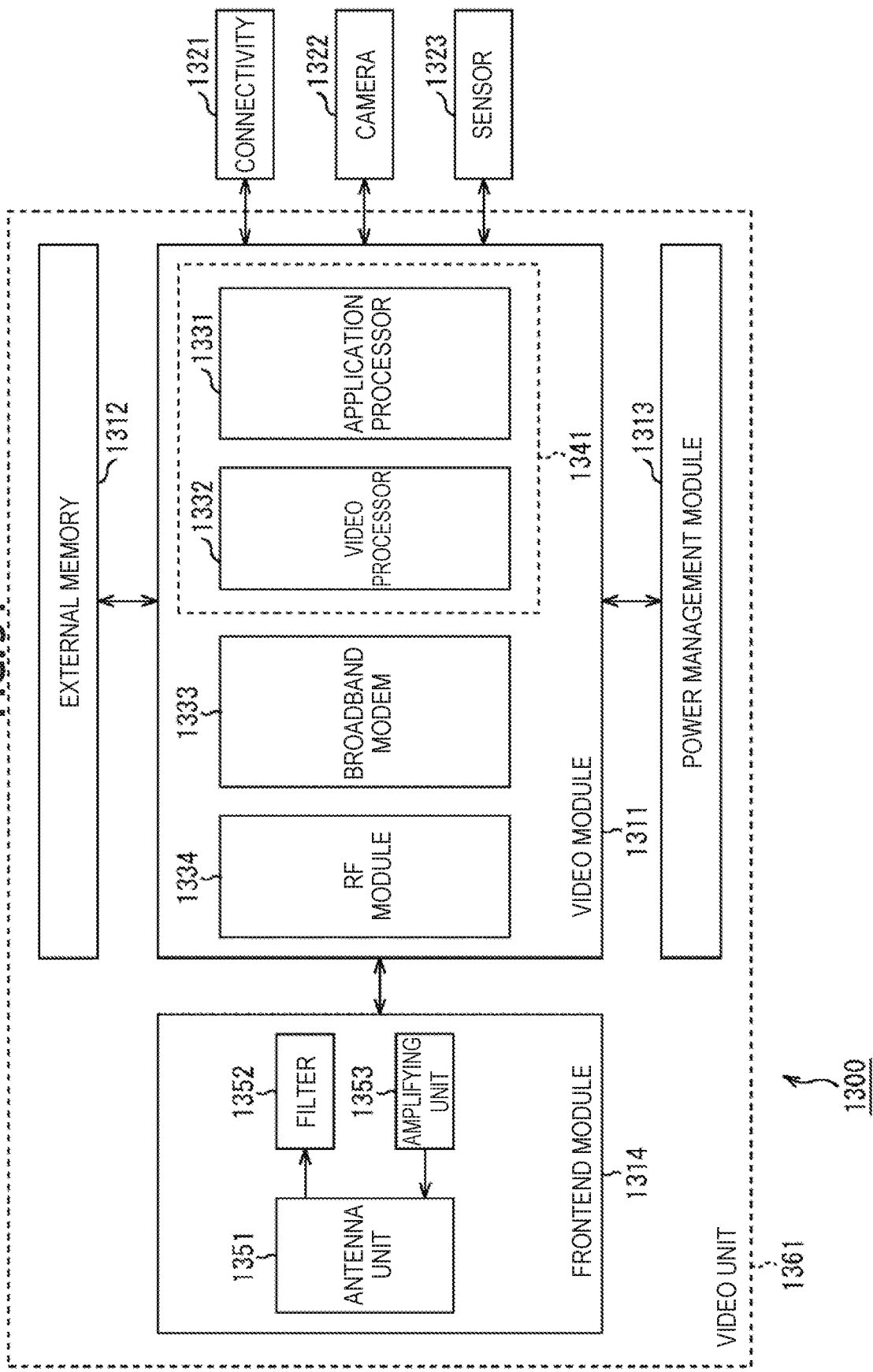
FIG. 54 is a block diagram illustrating an example of a schematic configuration of a video set.

An example in which the present technology is implemented as a set will be described with reference to FIG. 54. FIG. 54 illustrates an example of a schematic configuration of a video set to which the present disclosure is applied.

As electronic apparatuses have gradually become multi-functional in recent years, when some configurations of each apparatus are prepared for sale, provision, and the like in the stage of development and manufacturing, there are not only cases in which such an apparatus is configured to have one function, but also many cases in which a plurality of configurations having relevant functions are combined and implemented as one set with the plurality of functions.

The video set 1300 illustrated in FIG. 54 is configured to be multifunctional as described above by combining devices having functions of encoding and decoding (which may have either or both of the functions) of images with devices having other functions relating to the foregoing functions.

As illustrated in FIG. 54, the video set 1300 has a module group including a video module 1311, an external memory 1312, a power management module 1313, a frontend module 1314 and the like, and devices having relevant functions such as connectivity 1321, a camera 1322, a sensor 1323, and the like.

A module is a form of a component in which several related componential functions are gathered to provide a cohesive function. A specific physical configuration is arbitrary; however, it is considered to be an integration in which, for example, a plurality of processors each having functions, electronic circuit elements such as a resistor and a capacitor, and other devices are disposed on a circuit board. In addition, making a new module by combining a module with another module, a processor, or the like is also considered.

In the example of FIG. 54, the video module 1311 is a combination of configurations with functions relating to image processing, and has an application processor, a video processor, a broadband modem 1333, and an RF module 1334.

A processor is a semiconductor chip integrated with a configuration having predetermined functions using System-On-Chip (SoC), and is also referred to as, for example, system large scale integration (LSI), or the like. The configuration having a predetermined function may be a logic circuit (hardware configuration), may be, along with CPU, a ROM, and a RAM, a program that is executed by using the elements (software configuration), or may be a combination of both configurations. For example, a processor may have a logic circuit, a CPU, a ROM, a RAM, and the like and may realize some functions with the logic circuit (hardware configuration), or may realize the other functions with a program executed by the CPU (software configuration).

The application processor 1331 of FIG. 54 is a processor that executes an application relating to image processing. The application executed by the application processor 1331 can not only perform an arithmetic process but can also control a configuration internal and external to the video module 1311, for example, the video processor 1332 when necessary in order to realize predetermined functions.

The video processor 1332 is a processor having a function relating to (one or both of) encoding and decoding of images.

The broadband modem 1333 digitally modulates data (a digital signal) transmitted through wired or wireless (or both) broadband communication that is performed through a broadband line such as the Internet or a public telephone network, converts the result into an analog signal, and demodulates the analog signal received through the broadband communication and converts the result into data (digital signal), The broadband modem 1333 processes any information, for example, image data processed by the video processor 1332, a stream in which image data is coded, an application program, or setting data.

The RF module 1334 is a module which performs frequency conversion, modulation and demodulation, amplification, a filtering process, and the like on a radio frequency (RF) signal transmitted and received via an antenna. For example, the RF module 1334 generates an RF signal by performing frequency conversion and the like on a baseband signal generated by the broadband modem 1333. In addition, the RF module 1334, for example, generates a baseband signal by performing frequency conversion and the like on an RF signal received via the frontend module 1314.

Note that, as indicated by the dashed line 1341 in FIG. 54, the application processor 1331 and the video processor 1332 may be integrated to constitute one processor.

The external memory 1312 is a module that is provided outside the video module 1311, having, a storage device used by the video module 1311. The storage device of the external memory 1312 may be realized with any physical configuration, but is generally used when large amounts of data such as image data in units of frames are stored, and thus it is desirable to realize the storage device with a relatively inexpensive and high-capacity semiconductor memory, for example, a dynamic random access memory (DRAM).

The power management module 1313 manages and controls power supply to the video module 1311 (each constituent element inside the video module 1311).

The frontend module 1314 is a module which provides the RF module 1334 with a frontend function (serving as a circuit of a transmitting and receiving end on an antenna side). The frontend module 1314 has, for example, an antenna unit 1351, a fitter 1352, and an amplifying unit 1353 as illustrated in FIG. 54.

The antenna unit 1351 is configured with an antenna which transmits and receives wireless signals and peripherals thereof. The antenna unit 1351 transmits a signal supplied from the amplifying unit 1353 as a radio signal and supplies a received radio signal to the filter 1352 as an electric signal (RF signal). The filter 1352 performs a filtering process or the like on the RF signal received via the antenna unit 1351 and supplies the processed RF signal to the RF module 1334. The amplifying unit 1353 amplifies an RF signal supplied from the RF module 1334, and supplies the signal to the antenna unit 1351.

The connectivity 1321 is a module having a function relating to connection to the outside. A physical configuration of the connectivity 1321 is arbitrary. The connectivity 1321 has, for example, a configuration with a communication function other than that of a communication standard to which the broadband modem 1333 corresponds, an external input and output terminal, or the like.

For example, the connectivity 1321 may have a communicating function that is based on a wireless communication standard such as Bluetooth (a registered trademark), IEEE 802.11 (for example, Wireless Fidelity (Wi-Fi; a registered trademark), near field communication (NFC), or Infrared Data Association (IrDA), an antenna which transmits and receives signals based on the standard, or the like. In addition, the connectivity 1321 may have, for example, a module having a communicating function based on a wired communication standard such as Universal Serial Bus (USB), or High-Definition Multimedia Interface (HDMI™, or a terminal based on the standard. Furthermore, the connectivity 1321 may have, for example, another data (signal) transmitting function of an analog input and output terminal or the like.

Note that the connectivity 1321 may be set to include a device serving as a data (signal) transmission destination. For example, the connectivity 1321 may be set to have a drive (including a drive not only of a removable medium but also of a hard disk, a solid-state drive (SSD), a network-attached storage (NAS), or the like) which reads and writes data with respect to a recording medium such as a magnetic disk, an optical disc, a magneto-optical disc, or a semiconductor memory. In addition, the connectivity 1321 may be set to have an image or audio output device (a monitor, a speaker, or the like).

The camera 1322 is a module having a function of capturing a subject and obtaining image data of the subject. Image data obtained from capturing by the camera 1322 is, for example, supplied to and encoded by the video processor 1332.

The sensor 1323 is a module having arbitrary sensing functions of, for example, a sound sensor, an ultrasound sensor, alight sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, a temperature sensor, and the like. Data detected by the sensor 1323 is, for example, supplied to the application processor 1331 and used by an application or the like.

The configurations described as modules above may be realized as processors, or conversely the configurations described as processors may be realized as modules.

In the video set 1300 with the configuration described above, the present technology can be applied to the video processor 1332 as will be described below. Thus, the video set 1300 can be implemented as a set to which the present technology is applied.

<Example of a Configuration of a Video Processor>

Figure 55:
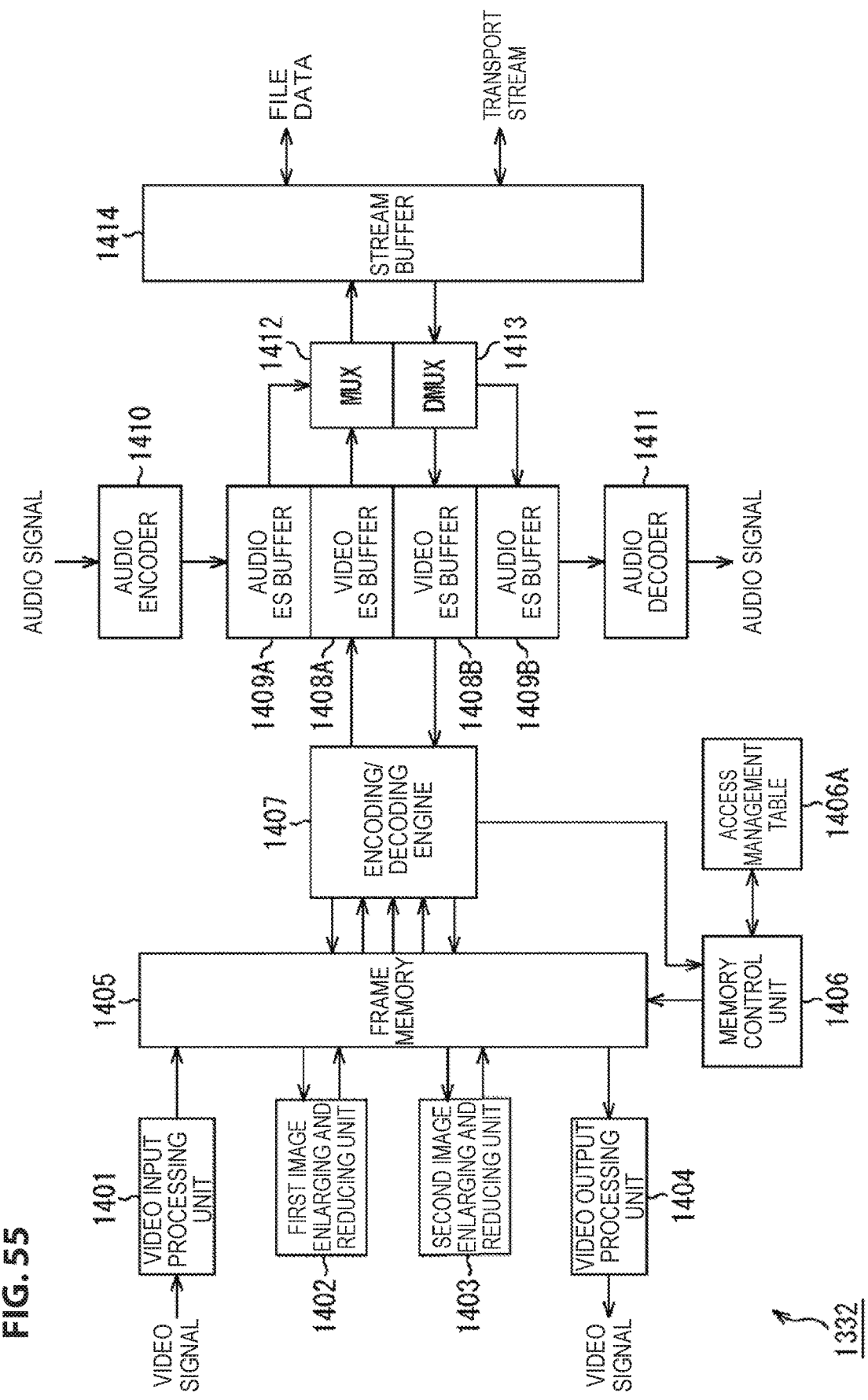
FIG. 55 is a block diagram illustrating an example of a schematic configuration of a video processor.

FIG. 55 illustrates an example of a schematic configuration of the video processor 1332 (of FIG. 54) to which the present technology is applied.

In the example of FIG. 55, the video processor 1332 has a function of receiving a video signal and audio signal input and coding the input using a predetermined scheme, and a function of decoding the coded video data and audio data and reproducing and outputting the video signal and audio signal.

As illustrated in FIG. 55, the video processor 1332 has a video input processing unit 1401, a first image enlarging and reducing unit 1402, a second image enlarging and reducing unit 1403, a video output processing unit 1404, a frame memory 1405, and a memory control unit 1406. In addition, the video processor 1332 has an encoding/decoding engine 1407, video elementary stream (ES) buffers 1408A and 1408B, and audio ES buffers 1409A and 1409B. Furthermore, the video processor 1332 has an audio encoder 1410, an audio decoder 1411, a multiplexer (MUX) 1412, a demultiplexer (DMUX) 1413, and a stream buffer 1414.

The video input processing unit 1401 acquires a video signal input from, for example, the connectivity 1321 (FIG. 54), and converts the signal into digital image data. The first image enlarging and reducing unit 1402 performs format conversion, an image enlarging or reducing process or the like on image data. The second image enlarging and reducing unit 1403 performs an image enlarging or reducing process on the image data according to the format of a destination to which the data is output via the video output processing unit 1404, or performs format conversion, an image enlarging or reducing process or the like in the same manner as the first image enlarging and reducing unit 1402. The video output processing unit 1404 performs format conversion, conversion into an analog signal, or the like on image data, and outputs the data to, for example, the connectivity 1321 as a reproduced video signal.

The frame memory 1405 is a memory for image data shared by the video input processing unit 1401, the first image enlarging and reducing unit 1402, the second image enlarging and reducing unit 1403, the video output processing unit 1404, and the encoding/decoding engine 1407. The frame memory 1405 is realized as a semiconductor memory, for example, a DRAM, or the like.

The memory control unit 1406 receives a synchronization signal from the encoding/decoding engine 1407 and controls access to the frame memory 1405 for writing and reading according to an access schedule to the frame memory 1405 which is written in an access management table 1406A. The access management table 1406A is updated by the memory control unit 1406 according to processes executed in the encoding/decoding engine 1407, the first image enlarging and reducing unit 1402, the second image enlarging and reducing unit 1403, and the like.

The encoding/decoding engine 1407 performs an encoding process of image data and a decoding process of a video stream that is data obtained by encoding image data. For example, the encoding/decoding engine 1407 encodes image data read from the frame memory 1405, and sequentially writes the data in the video ES buffer 1408A as video streams. In addition, for example, the encoding/decoding engine 1407 sequentially reads video streams from the video ES buffer 1408B, and sequentially writes the data in the frame memory 1405 as image data. The encoding/decoding engine 1407 uses the frame memory 1405 as a work area for such encoding and decoding. In addition, the encoding/decoding engine 1407 outputs a synchronization signal to the memory control unit 1406 at a timing at which, for example, a process on each micro block is started.

The video ES buffer 1408A buffers a video stream generated by the encoding/decoding engine 1407 and supplies the stream to the multiplexer (MUX) 1412. The video ES buffer 1408B buffers a video stream supplied from the demultiplexer (DMUX) 1413 and supplies the stream to the encoding/decoding engine 1407.

The audio ES buffer 1409A buffers an audio stream generated by an audio encoder 1410 and supplies the stream to the multiplexer (MUX) 1412. The audio ES buffer 1409B buffers an audio stream supplied from the demultiplexer (DMUX) 1413 and supplies the stream to an audio decoder 1411.

The audio encoder 1410, for example, digitally converts an audio signal input from, for example, the connectivity 1321 or the like, and encodes the signal in a predetermined scheme, for example, an MPEG audio scheme, an Audio-Code number 3 (AC3) scheme, or the like. The audio encoder 1410 sequentially writes audio streams that are data obtained by encoding audio signals in the audio ES buffer 1409A. The audio decoder 1411 decodes an audio stream supplied from the audio ES buffer 1409B, performs conversion into an analog signal, for example, and supplies the signal to, for example, the connectivity 1321 or the like as a reproduced audio signal.

The multiplexer (MUX) 1412 multiplexes a video stream and an audio stream. A method for this multiplexing (i.e., a format of a bit stream generated from multiplexing) is arbitrary. In addition, during multiplexing, the multiplexer (MUX) 1412 can also add predetermined header information or the like to a bit stream. That is to say, the multiplexer (MUX) 1412 can convert the format of a stream through multiplexing. By multiplexing a video stream and an audio stream, for example, the multiplexer (MUX) 1412 converts the streams into a transport stream that is obit stream of a format for transport. In addition, by multiplexing a video stream and an audio stream, for example, the multiplexer (MUX) 1412 converts the streams into data of a file format for recording (file data).

The demultiplexer (DMUX) 1413 demultiplexes a bit stream obtained by multiplexing a video stream and an audio stream using a method which corresponds to the multiplexing performed by the multiplexer (MUX) 1412. That is to say, the demultiplexer (DMUX) 1413 extracts a video stream and an audio stream from a bit stream read from the stream buffer 1414 (separates the hit stream into the video stream and the audio stream). The demultiplexer (DMUX) 1413 can convert the format of a stream through demultiplexing (inverse conversion to conversion by the multiplexer (MUX) 1412). For example, the demultiplexer (DMUX) 1413 can acquire a transport stream supplied from, for example, the connectivity 1321, the broadband modem 1333, or the like via the stream buffer 1414, and convert the stream into a video stream and an audio stream through demultiplexing. In addition, for example, the demultiplexer (DMUX) 1413 can acquire file data read from various recording media by, for example, the connectivity 1321 via the stream buffer 1414, and convert the data into a video stream and an audio stream through demultiplexing.

The stream buffer 1414 buffers bit streams. For example, the stream buffer 1414 buffers a transport stream supplied from the multiplexer (MUX) 1412, and supplies the stream to, for example, the connectivity 1321, the broadband modem 1333, or the like at a predetermined timing or based on a request from outside or the like.

In addition, for example, the stream buffer 1414 buffers file data supplied from the multiplexer (MUX) 1412, and supplies the data to, for example, the connectivity 1321 or the like at a predetermined timing or based on a request from outside or the like to cause the data to be recorded on any of various kinds of recording media.

Furthermore, the stream buffer 1414 buffers a transport stream acquired via, for example, the connectivity 1321, the broadband modem 1333, or the like, and supplies the stream to the demultiplexer (DMUX) 1413 at a predetermined timing or based on a request from outside or the like.

In addition, the stream buffer 1414 buffers file data read from any of various kinds of recording media via, for example, the connectivity 1321 or the like, and supplies the data to the demultiplexer (DMUX) 1413 at a predetermined timing or based on a request from outside or the like.

Next, an example of an operation of the video processor 1332 having this configuration will be described. For example, a video signal input to the video processor 1332 from the connectivity 1321 or the like is converted into digital image data in a predetermined format such as a YCbCr format of 4:2:2 of in the video input processing unit 1401, and sequentially written in the frame memory 1405. This digital image data is read by the first image enlarging and reducing unit 1402 or the second image enlarging and reducing unit 1403, undergoes format conversion and an enlarging or reducing process in a predetermined format such as a YCbCr format of 4:2:0, and then is written in the frame memory 1405 again. This image data is encoded by the encoding/decoding engine 1407, and written in the video ES buffer 1408A as a video stream.

In addition, an audio signal input to the video processor 1332 from the connectivity 1321 is encoded by the audio encoder 1410, and then written in the audio ES buffer 1409A as an audio stream.

The video stream of the video ES buffer 1408A and the audio stream of the audio ES buffer 1409A are read and multiplexed by the multiplexer (MUX) 1412 to be converted into a transport stream, file data, or the like. The transport stream generated by the multiplexer (MUX) 1412 is buffered in the stream buffer 1414, and then output to an external network via, for example, the connectivity 1321, the broadband modem 1333, or the like. In addition, the file data generated by the multiplexer (MUX) 1412 is buffered in the stream buffer 1414, and output to, for example, the connectivity 1321 (of FIG. 29) to be recorded in any of various kinds of recording media.

In addition, a transport stream input to the video processor 1332 from an external network via, for example, the connectivity 1321, the broadband modem 1333, or the like is buffered in the stream buffer 1414, and then demultiplexed by the demultiplexer (DMUX) 1413. In addition, for example, file data read from any of various kinds of recording media via the connectivity 1321 and input to the video processor 1332 is buffered in the stream buffer 1414, and then demultiplexed by the demultiplexer (DMUX) 1413. That is to say, the transport stream or the file data input to the video processor 1332 is separated into a video stream and an audio stream by the demultiplexer (DMUX) 1413.

The audio stream is supplied to the audio decoder 1411 via the audio ES buffer 1409B to be decoded, and an audio signal is reproduced. In addition, the video stream is written in the video ES buffer 1408B, then sequentially read by the encoding/decoding engine 1407 to be decoded, and written in the frame memory 1405. The decoded image data undergoes an enlarging and reducing process by the second image enlarging and reducing unit 1403, and is written in the frame memory 1405. Then, the decoded image data is read by the video output processing unit 1404, undergoes format conversion in a predetermined format such as the YCbCr format of 4:2:2, and is further converted into an analog signal, and a video signal is reproduced to be output.

When the present technology is applied to the video processor 1332 configured in this manner, the present technology according to each embodiment described above may be applied to the encoding/decoding engine 1407. That is, for example, the encoding/decoding engine 1407 may have functions of the image coding device 100 and the image decoding device 200 according to the above-described embodiment. In this manner, the video processor 1332 can obtain the same effects that were described above with reference to FIGS. 1 to 42.

Also, in the encoding/decoding engine 1407, the present technology (that is, functions of the image coding device and the image decoding device according to each embodiment described above) may be implemented by either or both of hardware such as a logic circuit and software such as an embedded program.

<Other Example of a Configuration of a Video Processor>

FIG. 56 illustrates another example of a schematic configuration of the video processor 1332 to which the present technology is applied. In the case of the example of FIG. 56, the video processor 1332 has functions of encoding and decoding video data in a predetermined scheme.

More specifically, as illustrated in FIG. 56, the video processor 1332 includes a control unit 1511, a display interface 1512, a display engine 1513, an image processing engine 1514, and an internal memory 1515. The video processor 1332 includes a codec engine 1516, a memory interface 1517, a multiplexing and demultiplexing unit (MUX DMUX) 1518, a network interface 1519, and a video interface 1520.

The control unit 1511 controls an operation of each processing unit in the video processor 1332, such as the display interface 1512, the display engine 1513, the image processing engine 1514, and the codec engine 1516.

As illustrated in FIG. 56, for example, the control unit 1511 includes a main CPU 1531, a sub-CPU 1532, and a system controller 1533, The main CPU 1531 executes a program or the like to control an operation of each processing unit in the video processor 1332. The main CPU 1531 generates a control signal according to the program or the like and supplies the control signal to each processing unit (that is, controls the operation of each processing unit). The sub-CPU 1532 serves as an auxiliary role of the main CPU 1531. For example, the sub-CPU 1532 executes an offspring process or a sub-routine of a program or the like executed by the main CPU 1531. The system controller 1533 controls operations of the main CPU 1531 and the sub-CPU 1532, for example, designates programs executed by the main CPU 1531 and the sub-CPU 1532.

The display interface 1512 outputs the image data to, for example, the connectivity 1321 under the control of the control unit 1511. For example, the display interface 1512 converts the image data of digital data into an analog signal and outputs the image data as the reproduced video signal or the image data of the digital data to a monitor device or the like of the connectivity 1321.

The display engine 1513 performs various conversion processes such as format conversion, size conversion, and color gamut conversion on the image data to match a hardware specification of the monitor device or the like displaying the image under the control of the control unit 1511.

The image processing engine 1514 performs predetermined image processing such as filter processing on the image data, for example, to improve image quality under the control of the control unit 1511.

The internal memory 1515 is a memory shared by the display engine 1513, the image processing engine 1514, and the codec engine 1516 and provided inside the video processor 1332. For example, the internal memory 1515 is used to transmit and receive data among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516, as necessary (for example, according to a request). The internal memory 1515 may be realized by any storage device, but the internal memory 1515 is generally used to store data with a small capacity such as parameters or image data in units of blocks in many cases. Therefore, the internal memory 1515 is preferably realized by, for example, a semiconductor memory with a relatively small capacity compared to, for example, the external memory 1312) and a fast response speed, such as a static random access memory (SRAM).

The codec engine 1516 performs a process related to encoding or decoding of the image data. Any encoding and decoding schemes to which the codec engine 1516 corresponds can be used, and the number of schemes may be singular or plural. For example, the codec engine 1516 may include codec functions of a plurality of encoding and decoding schemes, and may encode the image data using the codec function selected therefrom and decode the encoded data.

In the example illustrated in FIG. 56, as functional blocks of processes related to the codec, the codec engine 1516 includes, for example, an MPEG-2 video 1541, an AVC/H.264 1542, an HEVC/H.265 1543, an HEVC/H.265 (scalable) 1544, and an HEVC/H.265 (multi-view) 1545 and includes an MPEG-DASH 1551.

The MPEG-2 video 1541 is a functional block that encodes or decodes the image data in an MPEG-2 scheme. The AVC/H.2641542 is a functional block that encodes or decodes the image data in an AVC scheme. The HEVC/H.265 1543 is a functional block that encodes or decodes the image data in an HEVC scheme. The HEVC/H.265 (scalable) 1544 is a functional block that performs scalable encoding or scalable decoding on the image data in an HEW, scheme. The HEVC/H.265 (multi-view) 1545 is a functional block that performs multi-view encoding or multi-view decoding on the image data in an HEW scheme.

The MPEG-DASH 1551 is a function block that transmits and receives image data using an MPEG-Dynamic Adaptive Streaming over HTTP (MPEG-DASH) scheme. The MPEG-DASH is a technique for streaming a video using Hyper Text Transfer Protocol (HTTP), and has a characteristic in which appropriate data is selected from among a plurality of previously prepared pieces of coded data having different resolutions in units of segments, and is transmitted. The MPEG-DASH 1551 generates a stream compliant with a standard, controls transmission of the stream or the like, and uses the MPEG-2 Video 1541 to the HEVC/H.265 view) 1545 described above for coding and decoding the image data.

The memory interface 1517 is an interface for the external memory 1312. The data supplied from the image processing engine 1514 or the codec engine 1516 is supplied to the external memory 1312 via the memory interface 1517. The data read from the external memory 1312 is supplied to the video processor 1332 (the image processing engine 1514 or the codec engine 1516) via the memory interface 1517.

The multiplexing and demultiplexing unit (MUX DMUX) 1518 multiplexes or demultiplexes various kinds of data related to images such as image data, video signals, and bit streams of encoded data. Any multiplexing and demultiplexing methods can be used. For example, at the time of multiplexing, the multiplexing and demultiplexing unit (MUX DMUX) 1518 can collect a plurality of pieces of data into one piece of data and can also add predetermined header information or the like to the data. At the time of demultiplexing, the multiplexing and demultiplexing unit (MUX DMUX) 1518 divides one piece of data into a plurality of pieces of data and can also add predetermined header information or the like to each of the pieces of divided data. That is, the multiplexing and demultiplexing unit (MUX DMUX) 1518 can convert the format of the data through the multiplexing and the demultiplexing. For example, the multiplexing and demultiplexing unit (MUX DMUX) 1518 can convert data into a transport stream which is a bit stream with a transmission format or data (file data) with a file format for recording by multiplexing the Ni stream. Of course, the reverse conversion can also be performed through the demultiplexing.

The network interface 1519 is, for example, an interface for the broadband modem 1333, the connectivity 1321, or the like. The video interface 1520 is, for example, an interface for the connectivity 1321, the camera 1322, or the like.

Next, an example of an operation of the video processor 1332 will be described. For example, when the transport stream is received from an external network via the connectivity 1321, the broadband modem 1333, or the like, the transport stream is supplied to the multiplexing and demultiplexing unit (MUX DMUX) 1518 via the network interface 1519 to be demultiplexed, and then is decoded by the codec engine 1516. For example, the image data obtained through the decoding of the codec engine 1516 is subjected to predetermined image processing by the image processing engine 1514, is subjected to predetermined conversion by the display engine 1513, and is supplied to, for example, the connectivity 1321 via the display interface 1512, and then the image is displayed on a monitor. For example, the image data obtained through the decoding of the codec engine 1516 is re-encoded by the codec engine 1516, is multiplexed by the multiplexing and demultiplexing unit (MUX DMUX) 1518 to be converted into file data, is output to, for example, the connectivity 1321 via the video interface 1520, and is recorded in various recording media.

Further, for example, the file data of the encoded data read from a recording medium (not illustrated) by the connectivity 1321 or the like and obtained by encoding the image data is supplied to the multiplexing and demultiplexing unit (MUX DMUX) 1518 via the video interface 1520 to be demultiplexed, and then is decoded by the codec engine 1516. The image data obtained through the decoding of the codec engine 1516 is subjected to predetermined image processing by the image processing engine 1514, is subjected to predetermined conversion by the display engine 1513, and is supplied to, for example, the connectivity 1321 via the display interface 1512, and then the image is displayed on a monitor. For example, the image data obtained through the decoding of the codec engine 1516 is re-encoded by the codec engine 1516, is multiplexed by the multiplexing and demultiplexing unit MUX DMUX) 1518 to be converted into a transport stream, is supplied to, for example, the connectivity 1321 or the broadband modem 1333 via the network interface 1519, and is transmitted to another device (not illustrated).

Transmission and reception of the image data or other data between the processing units in the video processor 1332 are performed using, for example, the internal memory 1515 or the external memory 1312. The power management module 1313 controls power supply to, for example, the control unit 1511.

When the present technology is applied to the video processor 1332 configured in this manner, the present technology according to each embodiment described above may be applied to the codec engine 1516. That is, for example, the codec engine 1516 may have function blocks that realize the image coding device 100 and the image decoding device 200 according to the above-described embodiment. In this manner, the video processor 1332 can obtain the same effects that were described above with reference to FIGS. 1 to 42.

Also, in the codec engine 1516, the present technology (that is, functions of the image coding device and the image decoding device according to each embodiment described above) may be implemented by either or both of hardware such as a logic circuit and software such as an embedded program.

The two configurations of the video processor 1332 have been exemplified, but the configuration of the video processor 1332 is arbitrary and may be a configuration other than the two configurations described above. The video processor 1332 may be configured as a single semiconductor chip or may be configured as a plurality of semiconductor chips. For example, a 3-dimensional laminated LSI in which a plurality of semiconductors are laminated may be used. The video processor 1332 may be realized by a plurality of LSIs.

<Application Examples to Devices>

The video set 1300 can be embedded in various devices that process image data. For example, the video set 1300 can be embedded in the television device 900 (FIG. 47), the mobile telephone 920 (FIG. 48), the recording and reproduction device 940 (FIG. 49), the imaging device 960 (FIG. 50), or the like. By embedding the video set 1300, the device can obtain the same advantages as the advantages described with reference to FIGS. 1 to 42.

In addition, the video set 1300 may be embedded in, for example, a terminal device such as the personal computer 1004, the AV instrument 1005, the tablet device 1006, and the mobile telephone 1007 in the data transmission system 1000 of FIG. 51, the broadcast station 1101 and the terminal device 1102 in the data transmission system 1100 of FIG. 52 and the imaging device 1201 and the scalably coded data storage device 1202 in the imaging system 1200 of FIG. 53. When the video net 1300 is embedded, the device can obtain the same effects that were described above with reference to FIGS. 1 to 42.

A part of each configuration of the above-described video set 1300 can also be implemented as a configuration to which the present technology is applied, as long as the part of the configuration includes the video processor 1332. For example, only the video processor 1332 can be implemented as a video processor to which the present technology is applied. For example, the video module 1331 or the processor indicated by the dashed line 1341, as described above, can be implemented as a processor, a module, or the like to which the present technology is applied. Further, for example, the video module 1311, the external 1312, the power management module 1313, and the frontend module 1314 can be combined to be implemented as a video unit 1361 to which the present technology is applied. It is possible to obtain the same advantages as the advantages described with reference to FIGS. 1 to 42 regardless of the configuration.

That is, any configuration can be embedded in various devices processing image data, as in the case of the video set 1300, as long as the configuration includes the video processor 1332. For example, the video processor 1332, the processor indicated by the dashed line 1341, the video module 1311, or the video unit 1361 may be embedded in the television device 900 (FIG. 47), the mobile telephone 920 (FIG. 48), the recording and reproduction device 940 (FIG. 49), the imaging device 960 (FIG. 50), terminal devices such as the personal computer 1004, the AV instrument 1005, the tablet device 1006, and the mobile telephone 1007 in the data transmission system 1000 of FIG. Si, the broadcast station 1101 and the terminal device 1102 in the data transmission system 1100 of FIG. 52, and the imaging device 1201 and the scalably coded data storage device 1202 in the imaging system 1200 of FIG. 53. By embedding any configuration to which the present technology is applied, the device can obtain the same advantages as the advantages described with reference to FIGS. 1 to 42, as in the video set 1300.

In the present specification, the examples in which the various pieces of information are multiplexed in the coding stream and are transmitted from the encoding side to the decoding side have been described. However, the methods of transmitting the information are not limited to the examples. For example, the information may be transmitted or recorded as separate pieces of data associated with the coding bit stream without being multiplexed in the coding bit stream. Here, the term "associated" means that an image (Which may be a part of an image, such as a slice or a block) included in a bit stream and information corresponding to the image can be linked at the time of decoding. That is, the information may be transmitted along a different transmission path from the image (or the bit stream). The information may be recorded in a different recording medium (or a different recording area of the same recording medium) from the image (or the bit stream). Further, the information and the image (or the bit stream) may be mutually associated, for example, in any unit such as a plurality of frames, a single frame, or a part of a frame.

Additionally, the present technology may also be configured as below (1)

An image coding device including:

a coding unit configured to code image data;

a decoding load definition information setting unit configured to set decoding load definition information for defining a magnitude of a load of a decoding process of an independently decodable partial region of an image of the image data; and a transmission unit configured to transmit coded data of the image data generated by the coding unit and the decoding load definition information set by the decoding load definition information setting unit.

(2)

The image coding device according to any of (1), and (3) to (13), wherein the decoding load definition information includes information for defining a magnitude of a load of a decoding process of the partial region according to a level indicating a magnitude of a load of the decoding process.

(3)

The image coding device according to any of (1), (2), and (4) to (13), wherein the decoding load definition information includes information for defining a magnitude of a load of a decoding process of the partial region according to information indicating a size of the partial region.

(4)

The image coding device according to any of (1) to (3), and (5) to (13), wherein the decoding load definition information includes information for defining a magnitude of a load of a decoding process of the partial region according to information indicating a length in a vertical direction and information indicating a length in a horizontal direction of the partial region.

(5)

The image coding device according to any of (1) to (4), and (6) to (13), wherein the decoding load definition information includes information for defining a magnitude of a load of a decoding process of the partial region according to information indicating a maximum input bit rate and a buffer capacity of a virtual reference decoder configured to decode the partial region.

(6)
The image coding device according to any of (1) to (5), and (7) to (13),
wherein the decoding load definition information includes information for defining a magnitude of a load of a decoding process of the partial region according to a level indicating a magnitude of a load of the decoding process common in a plurality of the partial regions.

(7)
The image coding device according to any of (1) to (6), and (8) to (13),
wherein the decoding load definition information includes information for defining a size in a vertical direction and a size in a horizontal direction of the partial region corresponding to each level indicating a magnitude of a load of the decoding process.

(8)
The image coding device according to any of (1) to (7), and (9) to (13),
wherein the decoding load definition information includes information for defining a maximum value of a level indicating a magnitude of a load of the decoding process in the image.

(9)
The image coding device according to any of (1) to (8), and (10) to (13),
wherein the decoding load definition information includes information for defining a magnitude of a load of a decoding process of the partial region according to a level indicating a magnitude of a load of the decoding process, and
wherein the decoding load definition information setting unit defines a parameter of the level for a predetermined region including the partial region and assigns it to definition of the image unit.

(10)
The image coding device according to any of (1) to (9), and (11) to (13),
wherein the decoding load definition information setting unit sets the decoding load definition information for each of the partial regions in supplemental enhancement information (SEI) of the independently decodable partial region.

(11)
The image coding device according to any of (1) to (10), (12), and (13),
wherein the image data includes a plurality of layers, and
wherein the decoding load definition information setting unit sets the e decoding load definition information of the plurality of layers in the SEI.

(12)
The image coding device according to any of (1) to (11), and (13),
wherein the decoding load definition information setting unit further sets information indicating whether the decoding load definition information is set in the SEI or the same decoding load definition information as the decoding load definition information set in the SEI in a sequence parameter set (SPS).

(13)
The image coding device according to any of (1) to (12),
wherein the decoding load definition information includes information indicating a size of the partial region serving as a reference, and a level indicating a magnitude of a load of a decoding process of the partial region.

(14)
An image coding method including:
coding image data;
setting decoding load definition information for defining a magnitude of a load of a decoding process of an independently decodable partial region of an image of the image data; and
transmitting generated coded data of the image data and the set decoding load definition information.

(15)
An image decoding device including:
an acquisition unit configured to acquire coded data of image data and decoding load definition information for defining a magnitude of a load of a decoding process of a partial region of an image of the image data, the partial region being independently decodable;
an analysis unit configured to analyze the decoding load definition information acquired by the acquisition unit;
a control unit configured to control decoding of the coded data acquired by the acquisition unit based on an analysis result of the decoding load definition information by the acquisition unit; and
a decoding unit configured to decode the coded data acquired by the acquisition unit under control of the control unit.

(16)
The image decoding device according to any of (15), and (17) to (27),
wherein the decoding load definition information includes information for defining a magnitude of a load of a decoding process of the partial region according to a level indicating a magnitude of a load of the decoding process.

(17)
The image decoding device according to any of (15), (16), and (18) to (27),
wherein the decoding load definition information includes information for defining a magnitude of a load of a decoding process of the partial region according to information indicating a size of the partial region.

(18)
The image decoding device according to any of (15) to (17), and (9) to (27),
wherein the decoding load definition information includes information for defining a magnitude of a load of a decoding process of the partial region according to information indicating a length in a vertical direction and information indicating a length in a horizontal direction of the partial region.

(19)
The image decoding device according to any of (15) to (18), and (20) to (27),
wherein the decoding load definition information includes information for defining a magnitude of a load of a decoding process of the partial region according to information indicating a maximum input bit rate and a buffer capacity of a virtual reference decoder configured to decode the partial region.

(20)
The image decoding device according to any of (15) to (19), and (21) to (27),
wherein the decoding load definition information includes information for defining a magnitude of a load of a decoding process of the partial region according to a level indicating a magnitude of a load of the decoding process common in a plurality of the partial regions.

(21)
The image decoding device according to any of (15) to (20), and (22) to (27), wherein the decoding load definition information includes information for defining a size in a vertical direction and a size in a horizontal direction of the partial region corresponding to each level indicating a magnitude of a load of the decoding process.

(22)

The image decoding device according to any of (15) to (21), and (23) to (27), wherein the decoding load definition information includes information for defining a maximum value of a level indicating a magnitude of a load of the decoding process in the image.

(23)

The image decoding device according to any of (15) to (27), wherein the decoding load definition information includes information for defining a magnitude of a load of a decoding process of the partial region according to a level indicating a magnitude of a load of the decoding process, and wherein the control unit controls decoding the coding data using a parameter of the level defined for a predetermined region including the partial region and assigned to definition of the image unit (24)

The image decoding device according to any of (15) to (23), and (27), wherein the analysis unit analyzes the decoding load definition information set for each of the partial regions in supplemental enhancement information of the independently decodable partial region.

(25)

The image decoding device according to any of (15) to (24), (26), and (27), wherein the image data includes a plurality of layers, and wherein the analysis unit analyzes the decoding load definition information of the plurality of layers set in the SEI.

(26)

The image decoding device according to any of (15) to (25), and (27), wherein the analysis unit further analyzes information indicating whether the decoding load definition information is set in the SEI or the same decoding load definition information as the decoding load definition information set in the SEI set in a sequence parameter set (SPS).

(27)

The image decoding device according to any of (15) to (26), wherein the decoding load definition information includes information indicating a size of the partial region serving as a reference, and a level indicating a magnitude of a load of a decoding process of the partial region.

(28)

An image decoding method including:

acquiring coded data of image data and decoding load definition information for defining a magnitude of a load of a decoding process of a partial region of an image of the image data;

controlling decoding of the acquired coded data based on the acquired decoding load definition information; and decoding the acquired coded data according to the controlling.

(31)

An image decoding device including:

an acquisition unit configured to acquire coded data of image data and decoding load definition information for defining a magnitude of a load of a decoding process of a partial region of an image of the image data;

a control unit configured to control decoding of the coded data acquired by the acquisition unit based on the decoding load definition information acquired by the acquisition unit; and a decoding unit configured to decode the coded data acquired by the acquisition unit under control of the control unit.

(32)

The image decoding device according to (31), wherein the partial region is independently decodable.

(33)

The image decoding device according to (31) or (32), wherein the decoding load definition information includes information for defining a magnitude of a load of a decoding process of the partial region according to a level indicating a magnitude of a load of the decoding process.

(34)

The image decoding device according to any of (31) to (33), wherein the decoding load definition information includes information for defining a magnitude of a load of a decoding process of the partial region according to information indicating a size of the partial region.

(35)

The image decoding device according to any of (31) to (34), wherein the decoding load definition information includes information for defining a magnitude of a load of a decoding process of the partial region according to information indicating a length in a vertical direction and information indicating a length in a horizontal direction of the partial region.

(36)

The image decoding device according to any of (31) to (35), wherein the decoding load definition information is included in supplemental enhancement information (SEI) of an independently decodable partial region.

(37)

The image decoding device according to any of (31) to (36), wherein the image data includes a plurality of layers, and wherein the decoding load definition information of the plurality of layers is included in the SEI.

(38)

The image decoding device according to any of (31) to (37), wherein the decoding load definition information includes information indicating a size of the partial region serving as a reference, and a level indicating a magnitude of a load of a decoding process of the partial region.

(39)

The image decoding device according to any of (31) to (38), wherein the partial region is a tile.

(40)

The image decoding device according to any of (31) to (39), wherein the partial region is a set of a plurality of tiles.

(41)

The image decoding device according to any of (31) to (40), wherein the decoding load definition information includes information for defining a maximum magnitude of a load of a decoding process among a plurality of partial regions included in a picture of the image data according to a level indicating a magnitude of a load of the decoding process.

(42) The image decoding device according to any of (31) to (41),
wherein the decoding load definition information includes information for defining a magnitude of a load common in a plurality of partial regions included in a picture of the image data according to a level indicating a magnitude of a load of the decoding process.

(43) The image decoding device according to any of (31) to (42),
wherein, when the plurality of partial regions included in the picture have an L shape, a magnitude of the load is defined for a rectangular region including the L shape.

(44) The image decoding device according to any of (31) to (43),
wherein the acquisition unit further acquires information indicating whether the decoding load definition information is set, and when the acquired information indicates that the decoding load definition information is set, acquires the the decoding load definition information.

(45) An image decoding method including:
acquiring coded data of image data and decoding load definition information for defining a magnitude of a load of a decoding process of a partial region of an image of the image data;
controlling decoding of the acquired coded data based on the acquired decoding load definition information; and
decoding the acquired coded data according to the controlling.

REFERENCE SIGNS LIST 100 image coding device
101 base layer image coding unit
102 enhancement layer image coding unit
103 multiplexing unit
104 control unit
128 header information generating unit
148 header information generating unit
151 decoding load related information acquisition unit
152 MCTS SEI generating unit
153 SPS generating unit
200 image decoding device
201 demultiplexing unit
202 base layer image decoding unit
203 enhancement layer image decoding unit
204 control unit
224 header information analyzing unit
244 header information analyzing unit
251 header information acquisition unit
252 SPS analyzing unit
253 MCTS SET analyzing unit
254 level specifying unit
255 providing unit

The invention claimed is:

1. An image decoding device comprising:
a control unit configured to control decoding of coded data, which has been transmitted from an image coding device and received by the image decoding device and in which an image is coded, based on information indicating a size of a partial region of the image and a level indicating a load of a decoding process of the partial region, the information indicating the size of the partial region of the image and the level indicating the load of the decoding process of the partial region both also having been transmitted from the image coding device together with the coded data and received by the image decoding device; and
a decoding unit configured to decode the coded data under control of the control unit,
wherein the partial region is an independently decodable region of the image that is less than an entirety of the image, and the entirety of the image has associated therewith a respective level set for decoding that is different than the level indicating the load of the decoding process of the partial region.

2. The image decoding device according to claim 1,
wherein the control unit controls decoding of the coded data using information for defining a magnitude of the load of the decoding process of the partial region according to the level indicating the load of the decoding process of the partial region.

3. The image decoding device according to claim 1,
wherein the control unit controls decoding of the coded data using information for defining a magnitude of the load of the decoding process of the partial region according to the information indicating the size of the partial region.

4. The image decoding device according to claim 1,
wherein the control unit controls decoding of the coded data using information for defining a magnitude of the load of the decoding process of the partial region according to information indicating a length in a vertical direction and information indicating a length in a horizontal direction of the partial region.

5. The image decoding device according to claim 1, further comprising
an acquisition unit configured to acquire information indicating the size of the partial region and the level indicating a magnitude of the load of the decoding process of the partial region as decoding load definition information indicating a magnitude of the load of the decoding process of the partial region,
wherein the control unit controls decoding of the coded data using the decoding load definition information acquired by the acquisition unit.

6. The image decoding device according to claim 5,
wherein the acquisition unit acquires the decoding load definition information as auxiliary information of the coded data.

7. The image decoding device according to claim 6,
wherein the acquisition unit acquires the decoding load definition information as supplemental enhancement information (SEI) of the independently decodable partial region.

8. The image decoding device according to claim 7,
wherein the coded data includes image data of a plurality of layers, and
wherein the acquisition unit acquires the decoding load definition information of the plurality of layers as the SEI.

9. The image decoding device according to claim 1,
wherein the partial region is a tile.

10. The image decoding device according to claim 1,
wherein the partial region is a set of a plurality of tiles.

11. The image decoding device according to claim 1,
wherein the control unit controls decoding of the coded data using information for defining a maximum magnitude of a load of a decoding process among a plurality of partial regions included in a picture of image data included in the coded data according to a level indicating a magnitude of a load of the decoding process.

12. The image decoding device according to claim 1, wherein the control unit controls decoding of the coded data using information for defining a magnitude of a load common in a plurality of partial regions included in a picture of image data included in the coded data according to a level indicating a magnitude of a load of the decoding process.

13. The image decoding device according to claim 12, wherein, when a plurality of the partial regions included in the picture have an L shape, a the control unit controls decoding of the coded data using information for defining a magnitude of the load for a rectangular region including the L shape.

14. The image decoding device according to claim 1, wherein the control unit controls decoding of the coded data using information indicating whether the decoding load definition information is set.

15. The image decoding device according to claim 1, wherein the coded data includes image data of a plurality of layers,
wherein the entirety of the image is an entire image of a single layer of the plurality of layers, and
wherein the partial region is an independently decodable tile of the single layer.

16. The image decoding device according to claim 1, wherein the level indicating the load of the decoding process of the partial region indicates a magnitude of the load of the decoding process of the partial region.

17. An image decoding method comprising:
receiving, from an image coding device, a coded data in which an image is coded, together with information indicating a size of a partial region of the image and a level indicating a load of a decoding process of the partial region;
controlling, based on the information indicating the size of the partial region of the image and the level indicating the load of the decoding process of the partial region, decoding of the coded data in which the image is coded; and
decoding the coded data according to the control,
wherein the partial region is an independently decodable region of the image that is less than an entirety of the image, and the entirety of the image has associated therewith a respective level set for decoding that is different than the level indicating the load of the decoding process of the partial region.

18. The image decoding method according to claim 17, wherein the level indicating the load of the decoding process of the partial region indicates a magnitude of the load of the decoding process of the partial region.

* * * * *